(12) United States Patent
Stanciu et al.

(10) Patent No.: US 9,268,760 B2
(45) Date of Patent: Feb. 23, 2016

(54) CORRELATION, ASSOCIATION, OR CORRESPONDENCE OF ELECTRONIC FORMS

(71) Applicant: Microsoft Corporation, Redmond, WA (US)

(72) Inventors: Constantin Stanciu, Redmond, WA (US); Patrick H. Halstead, Kirkland, WA (US); Andrey Shur, Redmond, WA (US); Edward G. Essey, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 13/867,334

(22) Filed: Apr. 22, 2013

(65) Prior Publication Data

US 2013/0238967 A1    Sep. 12, 2013

Related U.S. Application Data

(60) Division of application No. 13/161,419, filed on Jun. 15, 2011, now Pat. No. 8,429,522, which is a division of application No. 11/931,730, filed on Oct. 31, 2007, now Pat. No. 7,971,139, which is a continuation of application No. 10/636,475, filed on Aug. 6, 2003, now Pat. No. 7,334,187.

(51) Int. Cl.
*G06F 17/24* (2006.01)
*G06F 17/22* (2006.01)

(52) U.S. Cl.
CPC ............ *G06F 17/243* (2013.01); *G06F 17/227* (2013.01); *G06F 17/2247* (2013.01)

(58) Field of Classification Search
CPC .............. G06F 17/2247; G06F 17/227; G06F 17/2264; G06F 17/272; G06F 17/243; G06F 17/248

See application file for complete search history.

(56) References Cited

U.S. PATENT DOCUMENTS

| | | | |
|---|---|---|---|
| 2,804,878 | A | 9/1957 | Fishwood et al. |
| 3,091,077 | A | 5/1963 | Erickson et al. |
| 3,104,520 | A | 9/1963 | Cazier et al. |
| 3,195,805 | A | 7/1965 | Cholvin et al. |
| 3,196,606 | A | 7/1965 | Cholvin et al. |
| 3,812,942 | A | 5/1974 | Espenschied et al. |

(Continued)

FOREIGN PATENT DOCUMENTS

| | | |
|---|---|---|
| AU | 2006200285 | 1/2011 |
| AU | 2006200483 | 5/2011 |

(Continued)

OTHER PUBLICATIONS

"Advisory Action", U.S. Appl. No. 10/632,297, (Dec. 29, 2006), 3 pages.

(Continued)

*Primary Examiner* — Adam M Queler
(74) *Attorney, Agent, or Firm* — Julie Kane Akhter; Danielle Johnston-Holmes; Micky Minhas

(57) ABSTRACT

Determining correspondence, association, and/or correlation between nodes of electronic forms based on schemas of those forms is described. Importing, merging, and/or annotating data from one electronic form into another electronic form based on correspondence, association, and/or correlation between nodes is also described.

20 Claims, 15 Drawing Sheets

(56) References Cited

U.S. PATENT DOCUMENTS

| | | |
|---|---|---|
| 3,874,828 A | 4/1975 | Herschler et al. |
| 3,961,748 A | 6/1976 | McNabney |
| 4,005,578 A | 2/1977 | McInerney |
| 4,005,579 A | 2/1977 | Lloyd |
| 4,060,340 A | 11/1977 | Yanik et al. |
| 4,089,623 A | 5/1978 | Hofmann, Jr. |
| 4,201,978 A | 5/1980 | Nally |
| 4,256,019 A | 3/1981 | Braddick |
| 4,362,475 A | 12/1982 | Seitz |
| 4,391,184 A | 7/1983 | Yamane et al. |
| 4,396,345 A | 8/1983 | Hutchinson |
| 4,498,147 A | 2/1985 | Agnew et al. |
| 4,514,800 A | 4/1985 | Gruner et al. |
| 4,514,985 A | 5/1985 | Cadeddu |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,783,648 A | 11/1988 | Homma et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 4,972,496 A | 11/1990 | Sklarew |
| 4,975,690 A | 12/1990 | Torres |
| 5,025,484 A | 6/1991 | Yamanari et al. |
| 5,063,600 A | 11/1991 | Norwood |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,257,646 A | 11/1993 | Meyer |
| 5,274,803 A | 12/1993 | Dubin et al. |
| 5,287,448 A | 2/1994 | Nicol et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,325,481 A | 6/1994 | Hunt |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,388,967 A | 2/1995 | Firnhaber et al. |
| 5,388,968 A | 2/1995 | Wood et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,428,738 A | 6/1995 | Carter et al. |
| 5,434,965 A | 7/1995 | Matheny et al. |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,456,582 A | 10/1995 | Firnhaber et al. |
| 5,459,865 A | 10/1995 | Heninger et al. |
| 5,463,726 A | 10/1995 | Price |
| 5,481,722 A | 1/1996 | Skinner |
| 5,497,489 A | 3/1996 | Menne |
| 5,504,898 A | 4/1996 | Klein |
| 5,511,116 A | 4/1996 | Shastry et al. |
| 5,517,655 A | 5/1996 | Collins et al. |
| 5,523,775 A | 6/1996 | Capps |
| 5,535,389 A | 7/1996 | Elder et al. |
| 5,537,596 A | 7/1996 | Yu et al. |
| 5,540,558 A | 7/1996 | Harden et al. |
| 5,542,070 A | 7/1996 | LeBlanc et al. |
| 5,548,745 A | 8/1996 | Egan et al. |
| 5,550,976 A | 8/1996 | Henderson et al. |
| 5,551,035 A | 8/1996 | Arnold et al. |
| 5,555,325 A | 9/1996 | Burger |
| 5,556,271 A | 9/1996 | Zuercher et al. |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,612,719 A | 3/1997 | Beernink et al. |
| 5,613,837 A | 3/1997 | Konishi et al. |
| 5,625,783 A | 4/1997 | Ezekiel et al. |
| 5,627,979 A | 5/1997 | Chang et al. |
| 5,630,126 A | 5/1997 | Redpath |
| 5,630,706 A | 5/1997 | Yang |
| 5,634,113 A | 5/1997 | Rusterholz |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,644,739 A | 7/1997 | Moursund |
| 5,649,099 A | 7/1997 | Theimer et al. |
| 5,655,887 A | 8/1997 | Chou |
| 5,659,729 A | 8/1997 | Nielsen |
| 5,664,133 A | 9/1997 | Malamud et al. |
| 5,664,178 A | 9/1997 | Sinofsky |
| 5,664,938 A | 9/1997 | Yang |
| 5,668,966 A | 9/1997 | Ono et al. |
| 5,669,005 A | 9/1997 | Curbow et al. |
| 5,681,151 A | 10/1997 | Wood |
| 5,682,536 A | 10/1997 | Atkinson et al. |
| 5,689,667 A | 11/1997 | Kurtenbach |
| 5,689,703 A | 11/1997 | Atkinson et al. |
| 5,692,540 A | 12/1997 | Huang |
| 5,704,029 A | 12/1997 | Wright, Jr. |
| 5,706,501 A | 1/1998 | Horikiri et al. |
| 5,717,939 A | 2/1998 | Bricklin et al. |
| 5,720,016 A | 2/1998 | Egashira |
| 5,721,824 A | 2/1998 | Taylor |
| 5,727,129 A | 3/1998 | Barrett et al. |
| 5,734,380 A | 3/1998 | Adams et al. |
| 5,740,439 A | 4/1998 | Atkinson et al. |
| 5,740,455 A | 4/1998 | Pavley et al. |
| 5,742,504 A | 4/1998 | Meyer et al. |
| 5,742,795 A | 4/1998 | Kussel |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |

(56) References Cited

U.S. PATENT DOCUMENTS

| | | |
|---|---|---|
| 5,778,402 A | 7/1998 | Gipson |
| 5,784,555 A | 7/1998 | Stone |
| 5,785,081 A | 7/1998 | Krawczyk et al. |
| 5,787,274 A | 7/1998 | Agrawal et al. |
| 5,790,796 A | 8/1998 | Sadowsky |
| 5,796,403 A | 8/1998 | Adams et al. |
| 5,798,757 A | 8/1998 | Smith |
| 5,799,311 A | 8/1998 | Agrawal et al. |
| 5,801,701 A | 9/1998 | Koppolu et al. |
| 5,801,702 A | 9/1998 | Dolan et al. |
| 5,802,304 A | 9/1998 | Stone |
| 5,802,530 A | 9/1998 | Van Hoff |
| 5,803,715 A | 9/1998 | Kitchener |
| 5,805,165 A | 9/1998 | Thorne, III et al. |
| 5,805,824 A | 9/1998 | Kappe |
| 5,806,079 A | 9/1998 | Rivette et al. |
| 5,815,138 A | 9/1998 | Tsubaki et al. |
| 5,815,830 A | 9/1998 | Anthony |
| 5,818,444 A | 10/1998 | Alimpich et al. |
| 5,819,034 A | 10/1998 | Joseph et al. |
| 5,825,359 A | 10/1998 | Derby et al. |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,870,735 A | 2/1999 | Agrawal et al. |
| 5,873,088 A | 2/1999 | Hayashi et al. |
| 5,875,815 A | 3/1999 | Ungerecht et al. |
| 5,898,434 A | 4/1999 | Small et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,926,796 A | 7/1999 | Walker et al. |
| 5,928,363 A | 7/1999 | Ruvolo |
| 5,929,858 A | 7/1999 | Shibata et al. |
| RE36,281 E | 8/1999 | Zuercher et al. |
| 5,940,075 A | 8/1999 | Mutschler, III et al. |
| 5,947,711 A | 9/1999 | Myers et al. |
| 5,950,010 A | 9/1999 | Hesse et al. |
| 5,950,221 A | 9/1999 | Draves et al. |
| 5,953,731 A | 9/1999 | Glaser |
| 5,956,481 A | 9/1999 | Walsh et al. |
| 5,960,199 A | 9/1999 | Brodsky et al. |
| 5,960,411 A | 9/1999 | Hartman et al. |
| 5,963,208 A | 10/1999 | Dolan et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,441 A | 11/1999 | Jourjine |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,006,241 A | 12/1999 | Purnaveja et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell et al. |
| 6,035,297 A | 3/2000 | Van Huben et al. |
| 6,035,309 A | 3/2000 | Dauerer et al. |
| 6,035,336 A | 3/2000 | Lu et al. |
| 6,044,205 A | 3/2000 | Reed et al. |
| 6,052,531 A | 4/2000 | Waldin, Jr. et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,097,382 A | 8/2000 | Rosen et al. |
| 6,098,081 A | 8/2000 | Heidorn et al. |
| 6,101,512 A | 8/2000 | DeRose et al. |
| 6,105,012 A | 8/2000 | Chang et al. |
| 6,106,570 A | 8/2000 | Mizuhara |
| 6,108,637 A | 8/2000 | Blumenau |
| 6,108,783 A | 8/2000 | Kraweyzk et al. |
| 6,115,044 A | 9/2000 | Alimpich et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,161,107 A | 12/2000 | Stern |
| 6,163,772 A | 12/2000 | Kramer et al. |
| 6,167,521 A | 12/2000 | Smith et al. |
| 6,167,523 A | 12/2000 | Strong |
| 6,178,551 B1 | 1/2001 | Sana et al. |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,247,016 B1 | 6/2001 | Rastogi et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,271,862 B1 | 8/2001 | Yu |
| 6,272,506 B1 | 8/2001 | Bell |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,286,130 B1 | 9/2001 | Poulsen et al. |

(56) References Cited

U.S. PATENT DOCUMENTS

| | | |
|---|---|---|
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,336,797 B1 | 1/2002 | Kazakis et al. |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,385,767 B1 | 5/2002 | Ziebell |
| 6,389,434 B1 | 5/2002 | Rivette et al. |
| 6,393,442 B1 | 5/2002 | Cromarty et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,401,077 B1 | 6/2002 | Godden et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis et al. |
| 6,425,125 B1 | 7/2002 | Fries et al. |
| 6,427,142 B1 | 7/2002 | Zachary et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,434,743 B1 | 8/2002 | Click et al. |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,476,834 B1 | 11/2002 | Doval et al. |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,006 B1 | 12/2002 | Gourdol et al. |
| 6,493,007 B1 | 12/2002 | Pang |
| 6,493,702 B1 | 12/2002 | Adar et al. |
| 6,496,203 B1 | 12/2002 | Beaumont et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chan et al. |
| 6,505,344 B1 | 1/2003 | Blais et al. |
| 6,507,856 B1 | 1/2003 | Chen et al. |
| 6,513,154 B1 | 1/2003 | Porterfield |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| 6,539,464 B1 | 3/2003 | Getov |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,559,966 B1 | 5/2003 | Laverty et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,574,655 B1 | 6/2003 | Libert et al. |
| 6,578,144 B1 | 6/2003 | Gennaro et al. |
| 6,580,440 B1 | 6/2003 | Wagner et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,604,238 B1 | 8/2003 | Lim et al. |
| 6,606,606 B2 | 8/2003 | Starr |
| 6,609,200 B2 | 8/2003 | Anderson et al. |
| 6,611,812 B2 | 8/2003 | Hurtado et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,625,622 B1 | 9/2003 | Henrickson et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,242 B2 | 10/2003 | Bowman-Amuah |
| 6,636,845 B2 | 10/2003 | Chau et al. |
| 6,640,249 B1 | 10/2003 | Bowman-Amuah |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,643,721 B1 | 11/2003 | Sun |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,658,652 B1 | 12/2003 | Alexander et al. |
| 6,661,920 B1 | 12/2003 | Skinner |
| 6,668,369 B1 | 12/2003 | Krebs et al. |

(56) References Cited

U.S. PATENT DOCUMENTS

| | | |
|---|---|---|
| 6,671,805 B1 | 12/2003 | Brown et al. |
| 6,675,202 B1 | 1/2004 | Perttunen |
| 6,678,625 B1 | 1/2004 | Reise et al. |
| 6,678,717 B1 | 1/2004 | Schneider |
| 6,681,370 B2 | 1/2004 | Gounares et al. |
| 6,683,600 B1 | 1/2004 | Lui |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,708,172 B1 | 3/2004 | Wong et al. |
| 6,710,789 B1 | 3/2004 | Sekiguchi et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,732,102 B1 | 5/2004 | Khandekar |
| 6,735,721 B1 | 5/2004 | Morrow et al. |
| 6,738,783 B2 | 5/2004 | Melli et al. |
| 6,745,367 B1 | 6/2004 | Bates et al. |
| 6,748,385 B1 | 6/2004 | Rodkin et al. |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,757,890 B1 | 6/2004 | Wallman |
| 6,760,723 B2 | 7/2004 | Oshinsky et al. |
| 6,763,343 B1 | 7/2004 | Brooke et al. |
| 6,766,526 B1 | 7/2004 | Ellis |
| 6,772,139 B1 | 8/2004 | Smith, III |
| 6,772,165 B2 | 8/2004 | O'Carroll |
| 6,774,926 B1 | 8/2004 | Ellis et al. |
| 6,774,928 B2 | 8/2004 | Bruzzone |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,806,892 B1 | 10/2004 | Plow et al. |
| 6,816,849 B1 | 11/2004 | Halt, Jr. |
| 6,823,478 B1 | 11/2004 | Prologo et al. |
| 6,828,992 B1 | 12/2004 | Freeman et al. |
| 6,829,745 B2 | 12/2004 | Yassin et al. |
| 6,833,925 B1 | 12/2004 | Igoe et al. |
| 6,842,175 B1 | 1/2005 | Schmalstieg et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,084 B1 | 3/2005 | Dobner et al. |
| 6,874,130 B1 | 3/2005 | Baweja et al. |
| 6,874,143 B1 | 3/2005 | Murray |
| 6,876,996 B2 | 4/2005 | Czajkowski et al. |
| 6,883,168 B1 | 4/2005 | James et al. |
| 6,885,748 B1 | 4/2005 | Wang |
| 6,889,359 B1 | 5/2005 | Conner et al. |
| 6,901,403 B1 | 5/2005 | Bata et al. |
| 6,915,294 B1 | 7/2005 | Singh et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,129 B2 | 9/2005 | Marce et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,013,340 B1 | 3/2006 | Burd et al. |
| 7,020,869 B2 | 3/2006 | Abriari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,043,688 B1 | 5/2006 | Tsutsumi et al. |
| 7,051,273 B1 | 5/2006 | Holt et al. |
| 7,058,645 B2 | 6/2006 | Seto et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |
| 7,081,882 B2 | 7/2006 | Sowden et al. |
| 7,086,009 B2 | 8/2006 | Resnick et al. |
| 7,086,042 B2 | 8/2006 | Abe et al. |
| 7,088,374 B2 | 8/2006 | David et al. |
| 7,092,992 B1 | 8/2006 | Yu |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,107,522 B1 | 9/2006 | Morgan et al. |
| 7,107,539 B2 | 9/2006 | Abbott et al. |
| 7,120,863 B1 | 10/2006 | Wang |
| 7,124,167 B1 | 10/2006 | Bellotti et al. |
| 7,124,251 B2 | 10/2006 | Clark et al. |
| 7,130,885 B2 | 10/2006 | Chandra et al. |
| 7,134,083 B1 | 11/2006 | Guerrero |
| 7,143,341 B1 | 11/2006 | Kohli |
| 7,146,564 B2 | 12/2006 | Kim et al. |
| 7,152,027 B2 | 12/2006 | Andrade et al. |
| 7,152,205 B2 | 12/2006 | Day et al. |
| 7,159,011 B1 | 1/2007 | Knight et al. |
| 7,168,035 B1 | 1/2007 | Bell et al. |
| 7,170,499 B1 | 1/2007 | Lapstun et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,197,515 B2 | 3/2007 | Rivers-Moore et al. |
| 7,200,665 B2 | 4/2007 | Eshghi et al. |
| 7,200,816 B2 | 4/2007 | Falk et al. |
| 7,213,200 B2 | 5/2007 | Abe et al. |
| 7,228,541 B2 | 6/2007 | Gupton et al. |
| 7,234,105 B2 | 6/2007 | Bezrukov et al. |
| 7,236,982 B2 | 6/2007 | Zlatanov et al. |
| 7,237,114 B1 | 6/2007 | Rosenberg |
| 7,240,296 B1 | 7/2007 | Matthews et al. |
| 7,249,328 B1 | 7/2007 | Davis |
| 7,251,777 B1 | 7/2007 | Valtchev et al. |
| 7,269,664 B2 | 9/2007 | Hutsch et al. |
| 7,269,788 B2 | 9/2007 | Gharavy |
| 7,272,789 B2 | 9/2007 | O'Brien |
| 7,272,815 B1 | 9/2007 | Eldridge |
| 7,275,216 B2 | 9/2007 | Paoli et al. |
| 7,281,018 B1 | 10/2007 | Begun et al. |
| 7,281,206 B2 | 10/2007 | Schnelle et al. |
| 7,281,245 B2 | 10/2007 | Reynar et al. |
| 7,284,208 B2 | 10/2007 | Matthews |

(56) References Cited

U.S. PATENT DOCUMENTS

| | | |
|---|---|---|
| 7,284,239 B1 | 10/2007 | Young et al. |
| 7,287,218 B1 | 10/2007 | Knotz et al. |
| 7,293,268 B2 | 11/2007 | Masuda et al. |
| 7,295,336 B2 | 11/2007 | Yoshida et al. |
| 7,296,017 B2 | 11/2007 | Larcheveque et al. |
| 7,305,613 B2 | 12/2007 | Oezgen |
| 7,308,646 B1 | 12/2007 | Cohen et al. |
| 7,313,757 B2 | 12/2007 | Bradley et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,178 B1 | 2/2008 | Aulagnier |
| 7,337,391 B2 | 2/2008 | Clarke et al. |
| 7,337,392 B2 | 2/2008 | Lue |
| 7,346,610 B2 | 3/2008 | Ruthfield et al. |
| 7,346,840 B1 | 3/2008 | Ravishankar et al. |
| 7,346,848 B1 | 3/2008 | Ruthfield et al. |
| 7,350,141 B2 | 3/2008 | Kotler et al. |
| 7,360,171 B2 | 4/2008 | Ruthfield et al. |
| 7,370,066 B1 | 5/2008 | Sikchi et al. |
| 7,373,595 B2 | 5/2008 | Jones et al. |
| 7,376,673 B1 | 5/2008 | Chalecki et al. |
| 7,392,522 B2 | 6/2008 | Murray |
| 7,406,660 B1 | 7/2008 | Sikchi et al. |
| 7,412,649 B2 | 8/2008 | Emek et al. |
| 7,424,671 B2 | 9/2008 | Elza et al. |
| 7,428,699 B1 | 9/2008 | Kane et al. |
| 7,430,711 B2 | 9/2008 | Rivers-Moore et al. |
| 7,441,200 B2 | 10/2008 | Savage |
| 7,451,392 B1 | 11/2008 | Chalecki et al. |
| 7,490,109 B1 | 2/2009 | Sikchi et al. |
| 7,490,167 B2 | 2/2009 | Pena et al. |
| 7,496,632 B2 | 2/2009 | Chapman et al. |
| 7,496,837 B1 | 2/2009 | Larcheveque et al. |
| 7,512,896 B2 | 3/2009 | Rockey et al. |
| 7,516,145 B2 | 4/2009 | Sikchi et al. |
| 7,516,399 B2 | 4/2009 | Hsu et al. |
| 7,533,268 B1 | 5/2009 | Catorcini |
| 7,543,228 B2 | 6/2009 | Kelkar |
| 7,549,115 B2 | 6/2009 | Kotler |
| 7,562,215 B2 | 7/2009 | Cummins |
| 7,568,101 B1 | 7/2009 | Catorcini |
| 7,581,177 B1 | 8/2009 | Mollicone et al. |
| 7,584,417 B2 | 9/2009 | Friend |
| 7,610,562 B2 | 10/2009 | Rockey et al. |
| 7,613,996 B2 | 11/2009 | Dallett et al. |
| 7,624,356 B1 | 11/2009 | Rockey et al. |
| 7,653,687 B2 | 1/2010 | Resiman |
| 7,669,116 B2 | 2/2010 | Lopata et al. |
| 7,673,227 B2 | 3/2010 | Kotler |
| 7,673,228 B2 | 3/2010 | Kelkar et al. |
| 7,676,843 B1 | 3/2010 | Stott |
| 7,689,929 B2 | 3/2010 | Ruthfield |
| 7,692,636 B2 | 4/2010 | Kim |
| 7,707,487 B2 | 4/2010 | Easter et al. |
| 7,712,022 B2 | 5/2010 | Smuga |
| 7,712,048 B2 | 5/2010 | Rockey et al. |
| 7,721,190 B2 | 5/2010 | Sikchi |
| 7,725,834 B2 | 5/2010 | Bell |
| 7,739,602 B2 | 6/2010 | Feng et al. |
| 7,743,063 B2 | 6/2010 | James et al. |
| 7,755,786 B2 | 7/2010 | Foehr et al. |
| 7,774,620 B1 | 8/2010 | Stott |
| 7,779,027 B2 | 8/2010 | James |
| 7,809,698 B1 | 10/2010 | Salz et al. |
| 7,818,677 B2 | 10/2010 | Ruthfield |
| 7,865,477 B2 | 1/2011 | Larcheveque |
| 7,900,134 B2 | 3/2011 | Ardeleanu |
| 7,904,801 B2 | 3/2011 | Catorcini et al. |
| 7,913,159 B2 | 3/2011 | Larcheveque |
| 7,925,621 B2 | 4/2011 | Sikchi |
| 7,934,098 B1 | 4/2011 | Hahn et al. |
| 7,937,651 B2 | 5/2011 | Kelkar |
| 7,971,139 B2 | 6/2011 | Stanciu |
| 7,979,856 B2 | 7/2011 | Murray |
| 8,001,459 B2 | 8/2011 | Rivers-Moore |
| 8,010,515 B2 | 8/2011 | Mirzad |
| 8,074,217 B2 | 12/2011 | James |
| 8,078,960 B2 | 12/2011 | Chalecki |
| 8,117,552 B2 | 2/2012 | Paoli |
| 8,200,975 B2 | 6/2012 | O'Connor |
| 8,429,522 B2 | 4/2013 | Stanciu et al. |
| 8,487,879 B2 | 7/2013 | Kim et al. |
| 8,819,072 B1 | 8/2014 | Cupala et al. |
| 8,892,993 B2 | 11/2014 | Sikchi et al. |
| 8,918,729 B2 | 12/2014 | Fortini et al. |
| 9,210,234 B2 | 12/2015 | Rivers-Moore et al. |
| 2001/0003828 A1 | 6/2001 | Peterson et al. |
| 2001/0007109 A1 | 7/2001 | Lange |
| 2001/0013947 A1 | 8/2001 | Van Der Linden et al. |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0027472 A1 | 10/2001 | Guan |
| 2001/0037345 A1 | 11/2001 | Kiernan et al. |
| 2001/0044850 A1 | 11/2001 | Raz et al. |
| 2001/0047372 A1 | 11/2001 | Gorelik et al. |
| 2001/0051907 A1 | 12/2001 | Kumar et al. |
| 2001/0051928 A1 | 12/2001 | Brody |
| 2001/0052121 A1 | 12/2001 | Masuda et al. |
| 2001/0054004 A1 | 12/2001 | Powers |
| 2001/0056411 A1 | 12/2001 | Lindskog et al. |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk et al. |
| 2002/0010855 A1 | 1/2002 | Reshef et al. |
| 2002/0013788 A1 | 1/2002 | Pennell et al. |
| 2002/0019812 A1 | 2/2002 | Board et al. |
| 2002/0019941 A1 | 2/2002 | Chan et al. |
| 2002/0023111 A1 | 2/2002 | Arora et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0026462 A1 | 2/2002 | Shotton et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0035617 A1 | 3/2002 | Lynch et al. |
| 2002/0040469 A1 | 4/2002 | Pramberger |
| 2002/0049790 A1 | 4/2002 | Ricker et al. |
| 2002/0052769 A1 | 5/2002 | Navani et al. |
| 2002/0053021 A1 | 5/2002 | Rice et al. |
| 2002/0054115 A1 | 5/2002 | Mack et al. |
| 2002/0054126 A1 | 5/2002 | Gamon |
| 2002/0054128 A1 | 5/2002 | Lau et al. |
| 2002/0057297 A1 | 5/2002 | Grimes et al. |
| 2002/0059566 A1 | 5/2002 | Delcambre et al. |
| 2002/0065798 A1 | 5/2002 | Bostleman et al. |
| 2002/0065847 A1 | 5/2002 | Furukawa et al. |
| 2002/0065950 A1 | 5/2002 | Katz et al. |
| 2002/0070973 A1 | 6/2002 | Croley |
| 2002/0072951 A1 | 6/2002 | Lee et al. |
| 2002/0078074 A1 | 6/2002 | Cho et al. |
| 2002/0078103 A1 | 6/2002 | Gorman et al. |
| 2002/0083145 A1 | 6/2002 | Perinpanathan |
| 2002/0083148 A1 | 6/2002 | Shaw et al. |
| 2002/0083318 A1 | 6/2002 | Larose |
| 2002/0085033 A1 | 7/2002 | Robinson et al. |
| 2002/0091738 A1 | 7/2002 | Rohrabaugh et al. |
| 2002/0099952 A1 | 7/2002 | Lambert et al. |
| 2002/0100027 A1 | 7/2002 | Binding et al. |
| 2002/0103711 A1 | 8/2002 | Karas et al. |
| 2002/0107885 A1 | 8/2002 | Brooks et al. |
| 2002/0111699 A1 | 8/2002 | Melli et al. |
| 2002/0111932 A1 | 8/2002 | Roberge et al. |
| 2002/0112224 A1 | 8/2002 | Cox |
| 2002/0123993 A1 | 9/2002 | Chau et al. |
| 2002/0124172 A1 | 9/2002 | Manahan |
| 2002/0129056 A1 | 9/2002 | Conant |

(56) References Cited

U.S. PATENT DOCUMENTS

| | | |
|---|---|---|
| 2002/0133484 A1 | 9/2002 | Chau et al. |
| 2002/0143815 A1 | 10/2002 | Sather |
| 2002/0143856 A1 | 10/2002 | Sastri et al. |
| 2002/0147726 A1 | 10/2002 | Yehia et al. |
| 2002/0147748 A1 | 10/2002 | Huang |
| 2002/0147929 A1 | 10/2002 | Rose |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156905 A1 | 10/2002 | Weissman |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178187 A1 | 11/2002 | Rasmussen et al. |
| 2002/0178380 A1 | 11/2002 | Wolf et al. |
| 2002/0184188 A1 | 12/2002 | Mandyam et al. |
| 2002/0184213 A1 | 12/2002 | Lau et al. |
| 2002/0184219 A1 | 12/2002 | Preisig et al. |
| 2002/0184401 A1 | 12/2002 | Kadel, Jr. et al. |
| 2002/0184485 A1 | 12/2002 | Dray et al. |
| 2002/0184491 A1 | 12/2002 | Morgan et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0194388 A1 | 12/2002 | Boloker et al. |
| 2002/0196281 A1 | 12/2002 | Audleman et al. |
| 2002/0196288 A1 | 12/2002 | Emrani |
| 2002/0197593 A1 | 12/2002 | Sutton |
| 2002/0198891 A1 | 12/2002 | Li et al. |
| 2002/0198935 A1 | 12/2002 | Crandall et al. |
| 2003/0002526 A1 | 1/2003 | Dias et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0014406 A1 | 1/2003 | Faieta et al. |
| 2003/0018668 A1 | 1/2003 | Britton et al. |
| 2003/0020746 A1 | 1/2003 | Chen et al. |
| 2003/0023639 A1 | 1/2003 | Chen et al. |
| 2003/0023641 A1 | 1/2003 | Gorman et al. |
| 2003/0023674 A1 | 1/2003 | Hildebrand |
| 2003/0023953 A1 | 1/2003 | Lucassen et al. |
| 2003/0025693 A1 | 2/2003 | Haley |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0028762 A1 | 2/2003 | Trilli et al. |
| 2003/0029911 A1 | 2/2003 | Kitayama |
| 2003/0033037 A1 | 2/2003 | Yuen et al. |
| 2003/0033179 A1 | 2/2003 | Katz et al. |
| 2003/0033606 A1 | 2/2003 | Puente et al. |
| 2003/0037021 A1 | 2/2003 | Krothappalli et al. |
| 2003/0037303 A1 | 2/2003 | Bodlaender et al. |
| 2003/0038788 A1 | 2/2003 | Demartines et al. |
| 2003/0038846 A1 | 2/2003 | Hori et al. |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0058286 A1 | 3/2003 | Dando |
| 2003/0061386 A1 | 3/2003 | Brown et al. |
| 2003/0061567 A1 | 3/2003 | Brown et al. |
| 2003/0067497 A1 | 4/2003 | Pichon |
| 2003/0069881 A1 | 4/2003 | Huttunen |
| 2003/0074279 A1 | 4/2003 | Viswanath |
| 2003/0084424 A1 | 5/2003 | Reddy et al. |
| 2003/0085918 A1 | 5/2003 | Beaumont et al. |
| 2003/0093755 A1 | 5/2003 | O'Carroll |
| 2003/0101414 A1 | 5/2003 | Liu et al. |
| 2003/0103071 A1 | 6/2003 | Lusen |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135553 A1 | 7/2003 | Pendakur |
| 2003/0135825 A1 | 7/2003 | Gertner et al. |
| 2003/0140132 A1 | 7/2003 | Champagne et al. |
| 2003/0140160 A1 | 7/2003 | Raz et al. |
| 2003/0142072 A1 | 7/2003 | Lapstun et al. |
| 2003/0145018 A1 | 7/2003 | Hitchcock et al. |
| 2003/0149737 A1 | 8/2003 | Lambert et al. |
| 2003/0149934 A1 | 8/2003 | Worden |
| 2003/0154464 A1 | 8/2003 | Ullmann et al. |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0172113 A1 | 9/2003 | Cameron et al. |
| 2003/0182268 A1 | 9/2003 | Lai |
| 2003/0182327 A1 | 9/2003 | Ramanujam et al. |
| 2003/0182463 A1 | 9/2003 | Valk |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0197733 A1 | 10/2003 | Beauchamp et al. |
| 2003/0200254 A1 | 10/2003 | Wei |
| 2003/0200506 A1 | 10/2003 | Abe et al. |
| 2003/0204481 A1 | 10/2003 | Lau |
| 2003/0204511 A1 | 10/2003 | Brundage |
| 2003/0204814 A1 | 10/2003 | Elo et al. |
| 2003/0205615 A1 | 11/2003 | Marappan |
| 2003/0206170 A1 | 11/2003 | Bickmore |
| 2003/0210428 A1 | 11/2003 | Bevlin et al. |
| 2003/0212664 A1 | 11/2003 | Breining et al. |
| 2003/0212902 A1 | 11/2003 | van der Made |
| 2003/0212988 A1 | 11/2003 | Tsai et al. |
| 2003/0217053 A1 | 11/2003 | Bachman et al. |
| 2003/0218620 A1 | 11/2003 | Lai et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri et al. |
| 2003/0225829 A1 | 12/2003 | Pena et al. |
| 2003/0226111 A1 | 12/2003 | Wirts et al. |
| 2003/0226132 A1 | 12/2003 | Tondreau et al. |
| 2003/0229716 A1 | 12/2003 | Holland |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora |
| 2004/0002950 A1 | 1/2004 | Brennan et al. |
| 2004/0003031 A1 | 1/2004 | Brown et al. |
| 2004/0003341 A1 | 1/2004 | alSafadi et al. |
| 2004/0003353 A1 | 1/2004 | Rivera et al. |
| 2004/0003389 A1 | 1/2004 | Reynar et al. |
| 2004/0006744 A1 | 1/2004 | Jones et al. |
| 2004/0010752 A1 | 1/2004 | Chan et al. |
| 2004/0010753 A1 | 1/2004 | Salter |
| 2004/0015778 A1 | 1/2004 | Britton et al. |
| 2004/0015783 A1 | 1/2004 | Lennon et al. |
| 2004/0024720 A1 | 2/2004 | Fairweather |
| 2004/0024842 A1 | 2/2004 | Witt |
| 2004/0030991 A1 | 2/2004 | Hepworth et al. |
| 2004/0031052 A1 | 2/2004 | Wannamaker et al. |
| 2004/0032611 A1 | 2/2004 | Daly et al. |
| 2004/0039881 A1 | 2/2004 | Shoebridge et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0046787 A1 | 3/2004 | Henry et al. |
| 2004/0046789 A1 | 3/2004 | Inanoria |

(56) References Cited

U.S. PATENT DOCUMENTS

| | | |
|---|---|---|
| 2004/0047643 A1 | 3/2004 | Jackelen et al. |
| 2004/0054966 A1 | 3/2004 | Busch et al. |
| 2004/0059754 A1 | 3/2004 | Barghout et al. |
| 2004/0060006 A1 | 3/2004 | Lindblad et al. |
| 2004/0073565 A1 | 4/2004 | Kaufman et al. |
| 2004/0073868 A1 | 4/2004 | Easter et al. |
| 2004/0073924 A1 | 4/2004 | Pendakur |
| 2004/0078756 A1 | 4/2004 | Napper et al. |
| 2004/0083426 A1 | 4/2004 | Sahu |
| 2004/0083431 A1 | 4/2004 | Graham et al. |
| 2004/0088320 A1 | 5/2004 | Perry |
| 2004/0088647 A1 | 5/2004 | Miller et al. |
| 2004/0088652 A1 | 5/2004 | Abe et al. |
| 2004/0093296 A1 | 5/2004 | Phelan et al. |
| 2004/0093596 A1 | 5/2004 | Koyano |
| 2004/0107367 A1 | 6/2004 | Kisters |
| 2004/0111418 A1 | 6/2004 | Nguyen et al. |
| 2004/0117439 A1 | 6/2004 | Levett et al. |
| 2004/0117769 A1 | 6/2004 | Lauzon et al. |
| 2004/0119763 A1 | 6/2004 | Mizobuchi et al. |
| 2004/0123277 A1 | 6/2004 | Schrader et al. |
| 2004/0128296 A1 | 7/2004 | Krishnamurthy et al. |
| 2004/0139400 A1 | 7/2004 | Allam et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0168119 A1 | 8/2004 | Liu et al. |
| 2004/0172442 A1 | 9/2004 | Ripley |
| 2004/0181543 A1 | 9/2004 | Wu et al. |
| 2004/0181711 A1 | 9/2004 | Johnson et al. |
| 2004/0186762 A1 | 9/2004 | Beaven et al. |
| 2004/0189708 A1 | 9/2004 | Larcheveque et al. |
| 2004/0189716 A1 | 9/2004 | Paoli et al. |
| 2004/0193465 A1 | 9/2004 | Sangroniz et al. |
| 2004/0194035 A1 | 9/2004 | Chakraborty |
| 2004/0196266 A1 | 10/2004 | Matsuura et al. |
| 2004/0199572 A1 | 10/2004 | Hunt et al. |
| 2004/0199577 A1 | 10/2004 | Burd et al. |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205644 A1 | 10/2004 | Shaughnessy et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0212586 A1 | 10/2004 | Denny |
| 2004/0215665 A1 | 10/2004 | Edgar et al. |
| 2004/0216084 A1 | 10/2004 | Brown et al. |
| 2004/0220912 A1 | 11/2004 | Manikutty et al. |
| 2004/0221238 A1 | 11/2004 | Cifra et al. |
| 2004/0221245 A1 | 11/2004 | Chickles et al. |
| 2004/0225749 A1 | 11/2004 | Pavlik et al. |
| 2004/0230676 A1 | 11/2004 | Spivack et al. |
| 2004/0237030 A1 | 11/2004 | Malkin |
| 2004/0237120 A1 | 11/2004 | Lewin et al. |
| 2004/0260593 A1 | 12/2004 | Abraham-Fuchs et al. |
| 2004/0261019 A1 | 12/2004 | Imamura et al. |
| 2004/0261032 A1 | 12/2004 | Olander et al. |
| 2004/0268229 A1 | 12/2004 | Paoli et al. |
| 2004/0268259 A1 | 12/2004 | Rockey et al. |
| 2004/0268260 A1 | 12/2004 | Rockey et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027676 A1 | 2/2005 | Eichstaedt |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0033657 A1 | 2/2005 | Herrington et al. |
| 2005/0033728 A1 | 2/2005 | James et al. |
| 2005/0038711 A1 | 2/2005 | Marlelo |
| 2005/0044524 A1 | 2/2005 | Murray |
| 2005/0050066 A1 | 3/2005 | Hughes |
| 2005/0055627 A1 | 3/2005 | Lloyd et al. |
| 2005/0060324 A1 | 3/2005 | Johnson et al. |
| 2005/0060647 A1 | 3/2005 | Doan et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076022 A1 | 4/2005 | Wu et al. |
| 2005/0076049 A1 | 4/2005 | Qubti et al. |
| 2005/0080756 A1 | 4/2005 | Hitchcock et al. |
| 2005/0080801 A1 | 4/2005 | Kothandaraman et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108262 A1 | 5/2005 | Fawcett, Jr. et al. |
| 2005/0108624 A1 | 5/2005 | Carrier |
| 2005/0108633 A1 | 5/2005 | Sahota et al. |
| 2005/0114757 A1 | 5/2005 | Sahota et al. |
| 2005/0114764 A1 | 5/2005 | Gudenkauf et al. |
| 2005/0119910 A1 | 6/2005 | Schneider |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149511 A1 | 7/2005 | Ruthfield |
| 2005/0149512 A1 | 7/2005 | Ruthfield |
| 2005/0149726 A1 | 7/2005 | Joshi et al. |
| 2005/0159136 A1 | 7/2005 | Rouse et al. |
| 2005/0160398 A1 | 7/2005 | Bjornson et al. |
| 2005/0165615 A1 | 7/2005 | Minar |
| 2005/0171746 A1 | 8/2005 | Thalhammer-Reyero |
| 2005/0177803 A1 | 8/2005 | Ruthfield et al. |
| 2005/0182645 A1 | 8/2005 | Ehlis et al. |
| 2005/0183006 A1 | 8/2005 | Rivers-Moore et al. |
| 2005/0198086 A1 | 9/2005 | Moore et al. |
| 2005/0198125 A1 | 9/2005 | Macleod Beck et al. |
| 2005/0198247 A1 | 9/2005 | Perry et al. |
| 2005/0200907 A1 | 9/2005 | Kitayama et al. |
| 2005/0210263 A1 | 9/2005 | Levas et al. |
| 2005/0216439 A1 | 9/2005 | Kawakita |
| 2005/0216452 A1 | 9/2005 | Teague |
| 2005/0216837 A1 | 9/2005 | Washburn |
| 2005/0219226 A1 | 10/2005 | Liu et al. |
| 2005/0223063 A1 | 10/2005 | Chang et al. |
| 2005/0223320 A1 | 10/2005 | Brintzenhofe et al. |
| 2005/0228887 A1 | 10/2005 | Wang |
| 2005/0234890 A1 | 10/2005 | Enzler et al. |
| 2005/0240620 A1 | 10/2005 | Danner et al. |
| 2005/0240876 A1 | 10/2005 | Myers et al. |
| 2005/0246304 A1 | 11/2005 | Knight et al. |
| 2005/0256933 A1 | 11/2005 | Millington et al. |
| 2005/0257148 A1 | 11/2005 | Goodman et al. |
| 2005/0262112 A1 | 11/2005 | Moore |
| 2005/0268100 A1 | 12/2005 | Gasparini et al. |
| 2005/0268217 A1 | 12/2005 | Garrison |
| 2005/0268222 A1 | 12/2005 | Cheng |
| 2005/0289147 A1 | 12/2005 | Kahn et al. |
| 2005/0289468 A1 | 12/2005 | Kahn et al. |
| 2006/0004703 A1 | 1/2006 | Spivack et al. |
| 2006/0004910 A1 | 1/2006 | Burd et al. |
| 2006/0010386 A1 | 1/2006 | Khan |
| 2006/0020586 A1 | 1/2006 | Prompt et al. |
| 2006/0020883 A1 | 1/2006 | Kothari et al. |
| 2006/0026500 A1 | 2/2006 | Qa'Im-maqami' |
| 2006/0026534 A1 | 2/2006 | Ruthfield et al. |

(56) References Cited

U.S. PATENT DOCUMENTS

| | | |
|---|---|---|
| 2006/0031757 A9 | 2/2006 | Vincent |
| 2006/0036995 A1 | 2/2006 | Chickles et al. |
| 2006/0041593 A1 | 2/2006 | Borthakur et al. |
| 2006/0041838 A1 | 2/2006 | Khan |
| 2006/0053293 A1 | 3/2006 | Zager et al. |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0074981 A1 | 4/2006 | Mauceri |
| 2006/0075245 A1 | 4/2006 | Meier |
| 2006/0080657 A1 | 4/2006 | Goodman |
| 2006/0085409 A1 | 4/2006 | Rys et al. |
| 2006/0095507 A1 | 5/2006 | Watson |
| 2006/0101037 A1 | 5/2006 | Brill et al. |
| 2006/0101051 A1 | 5/2006 | Carr et al. |
| 2006/0107206 A1 | 5/2006 | Koskimies |
| 2006/0107224 A1 | 5/2006 | Friend et al. |
| 2006/0129583 A1 | 6/2006 | Catorcini et al. |
| 2006/0129917 A1 | 6/2006 | Volk et al. |
| 2006/0129978 A1 | 6/2006 | Abriari et al. |
| 2006/0136422 A1 | 6/2006 | Matveief et al. |
| 2006/0143220 A1 | 6/2006 | Spencer, Jr. |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0161845 A1 | 7/2006 | Kahn et al. |
| 2006/0173865 A1 | 8/2006 | Fong |
| 2006/0173985 A1 | 8/2006 | Moore |
| 2006/0184393 A1 | 8/2006 | Ewin et al. |
| 2006/0191662 A1 | 8/2006 | Deibl et al. |
| 2006/0195413 A1 | 8/2006 | Davis et al. |
| 2006/0200443 A1 | 9/2006 | Kahn et al. |
| 2006/0200740 A1 | 9/2006 | Kahn et al. |
| 2006/0200754 A1 | 9/2006 | Kablesh et al. |
| 2006/0203081 A1 | 9/2006 | Pulitzer |
| 2006/0206589 A1 | 9/2006 | Lentini et al. |
| 2006/0206803 A1 | 9/2006 | Smith |
| 2006/0218403 A1 | 9/2006 | Sauve et al. |
| 2006/0230363 A1 | 10/2006 | Rapp |
| 2006/0242663 A1 | 10/2006 | Gogerty |
| 2006/0248468 A1 | 11/2006 | Constantine et al. |
| 2006/0253459 A1 | 11/2006 | Kahn et al. |
| 2006/0253489 A1 | 11/2006 | Kahn et al. |
| 2006/0265518 A1 | 11/2006 | Owens et al. |
| 2006/0271839 A1 | 11/2006 | Gottlieb et al. |
| 2006/0282552 A1 | 12/2006 | Bhesiania et al. |
| 2006/0288011 A1 | 12/2006 | Gandhi et al. |
| 2006/0288329 A1 | 12/2006 | Gandhi |
| 2007/0005611 A1 | 1/2007 | Takasugi et al. |
| 2007/0005978 A1 | 1/2007 | O'Connor |
| 2007/0011156 A1 | 1/2007 | Maron |
| 2007/0011665 A1 | 1/2007 | Gandhi et al. |
| 2007/0036433 A1 | 2/2007 | Teutsch |
| 2007/0050446 A1 | 3/2007 | Moore |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0088554 A1 | 4/2007 | Harb et al. |
| 2007/0094589 A1 | 4/2007 | Paoli |
| 2007/0100836 A1 | 5/2007 | Eichstaedt et al. |
| 2007/0100877 A1 | 5/2007 | Paoli et al. |
| 2007/0100967 A1 | 5/2007 | Smith et al. |
| 2007/0101280 A1 | 5/2007 | Paoli et al. |
| 2007/0101313 A1 | 5/2007 | Bodin et al. |
| 2007/0118538 A1 | 5/2007 | Ahern et al. |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208759 A1 | 9/2007 | von Koch et al. |
| 2007/0208769 A1 | 9/2007 | Boehm et al. |
| 2007/0245251 A1 | 10/2007 | Kim et al. |
| 2007/0276768 A1 | 11/2007 | Pallante |
| 2008/0021916 A1 | 1/2008 | Schnelle et al. |
| 2008/0027896 A1 | 1/2008 | Anjur |
| 2008/0028340 A1 | 1/2008 | Davis |
| 2008/0040635 A1 | 2/2008 | Larcheveque |
| 2008/0052287 A1 | 2/2008 | Stanciu |
| 2008/0126402 A1 | 5/2008 | Sitchi et al. |
| 2008/0134162 A1 | 6/2008 | James |
| 2008/0162498 A1 | 7/2008 | Omoigui |
| 2008/0189335 A1 | 8/2008 | Sikchi |
| 2008/0195483 A1 | 8/2008 | Moore |
| 2008/0222514 A1 | 9/2008 | Rivers-Moore |
| 2009/0013266 A1 | 1/2009 | Gandhi |
| 2009/0019063 A1 | 1/2009 | Gandhi |
| 2009/0043798 A1 | 2/2009 | Tan et al. |
| 2009/0044103 A1 | 2/2009 | Chalecki et al. |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2009/0177961 A1 | 7/2009 | Fortini |
| 2010/0125778 A1 | 5/2010 | Kelkar et al. |
| 2010/0229110 A1 | 9/2010 | Rockey et al. |
| 2010/0281313 A1 | 11/2010 | White et al. |
| 2011/0173560 A1 | 7/2011 | Larcheveque |
| 2011/0239101 A1 | 9/2011 | Rivers-Moore |
| 2011/0246868 A1 | 10/2011 | Stanciu |
| 2011/0296290 A1 | 12/2011 | Ruthfield et al. |
| 2012/0066044 A1 | 3/2012 | Honnef et al. |
| 2013/0238967 A1 | 9/2013 | Stanciu et al. |
| 2013/0271409 A1 | 10/2013 | Kim |
| 2013/0275865 A1 | 10/2013 | Kim |
| 2015/0052424 A1 | 2/2015 | Sikchi et al. |

FOREIGN PATENT DOCUMENTS

| | | |
|---|---|---|
| CA | 2533147 | 7/2013 |
| CN | 1536483 | 10/2004 |
| CN | 1636208 | 7/2005 |
| EP | 0173123 | 3/1986 |
| EP | 0841615 | 5/1998 |
| EP | 0961197 | 12/1999 |
| EP | 1076290 | 2/2001 |
| EP | 1221661 | 7/2002 |
| EP | 1997023 | 12/2008 |
| EP | 2325745 | 5/2011 |
| GB | 2325539 | 11/1998 |
| JP | 63085960 | 4/1988 |
| JP | 401173140 | 7/1989 |
| JP | 3191429 | 8/1991 |
| JP | 4225466 | 8/1992 |
| JP | 04290126 | 10/1992 |
| JP | 5314152 | 11/1993 |
| JP | 6014105 | 1/1994 |
| JP | 406014105 | 1/1994 |
| JP | 6139241 | 5/1994 |
| JP | 6180697 | 6/1994 |
| JP | 6180698 | 6/1994 |
| JP | 08263246 | 10/1996 |
| JP | 08263247 | 10/1996 |
| JP | 09016801 | 1/1997 |
| JP | 09134273 | 5/1997 |
| JP | 09146736 | 6/1997 |
| JP | 09190327 | 7/1997 |
| JP | 09251370 | 9/1997 |
| JP | 09292967 | 11/1997 |
| JP | 10011255 | 1/1998 |
| JP | 10097559 | 4/1998 |
| JP | 10171662 | 6/1998 |
| JP | 10207805 | 8/1998 |
| JP | 10232754 | 9/1998 |
| JP | 10240434 | 9/1998 |
| JP | 10260765 | 9/1998 |
| JP | 2000029713 | 1/2000 |
| JP | 2000132436 | 5/2000 |
| JP | 2002183652 | 6/2002 |
| JP | 2003173288 | 6/2003 |
| JP | 2003296235 | 10/2003 |
| JP | 2003316769 | 11/2003 |
| JP | 2003337648 | 11/2003 |

(56) References Cited

FOREIGN PATENT DOCUMENTS

| | | |
|---|---|---|
| JP | 2004501450 | 1/2004 |
| JP | 2004054749 | 2/2004 |
| JP | 2004341675 | 12/2004 |
| JP | 2008547117 | 12/2008 |
| JP | 4833490 | 9/2011 |
| RU | 2413987 | 3/2011 |
| TW | 200506661 | 2/2004 |
| TW | I224742 | 12/2004 |
| TW | I428827 | 3/2014 |
| WO | WO-9414115 | 6/1994 |
| WO | WO-9427227 | 11/1994 |
| WO | WO-9924945 | 5/1999 |
| WO | WO-9956207 | 11/1999 |
| WO | WO-0126018 | 4/2001 |
| WO | WO-0144934 | 6/2001 |
| WO | WO-0157720 | 8/2001 |
| WO | WO-0198888 | 12/2001 |
| WO | WO-0198927 | 12/2001 |
| WO | WO-0198949 | 12/2001 |
| WO | WO-2005089336 | 9/2005 |

OTHER PUBLICATIONS

"Advisory Action", U.S. Appl. No. 10/723,188, (Feb. 21, 2007), 5 pages.
"Final Office Action", U.S. Appl. No. 09/599,813, (Feb. 8, 2005), 27 pages.
"Final Office Action", U.S. Appl. No. 09/599,813, (May 5, 2006), 46 pages.
"Final Office Action", U.S. Appl. No. 10/632,297, (Sep. 8, 2006), 31 pages.
"Final Office Action", U.S. Appl. No. 10/723,188, (Nov. 3, 2006), 33 pages.
"Final Office Action", U.S. Appl. No. 12/028,651, (Jul. 26, 2011), 9 pages.
"Final Office Action", U.S. Appl. No. 13/159,239, (Dec. 11, 2013),38 pages.
"Foreign Notice of Allowance", JP Application No. 2002-503701, (Jul. 6, 2012),6 pages.
"Foreign Notice of Allowance", TW Application No. 95103951, (Nov. 6, 2013), 4 pages.
"Foreign Office Action", CN Application No. 01813162.X, (Feb. 16, 2007), 4 pages.
"Foreign Office Action", CN Application No. 01813162.X, (May 9, 2008), 3 pages.
"Foreign Office Action", CN Application No. 01813162.X, (Oct. 12, 2007), 7 pages.
"Foreign Office Action", CN Application No. 201110365026.2, (Oct. 21, 2013),18 Pages.
"Foreign Office Action", EP Application No. 01937375.2, (Sep. 5, 2006), 4 pages.
"Foreign Office Action", EP Application No. 01939034.3, (Nov. 5, 2007), 3 pages.
"Foreign Office Action", JP Application No. 2002-503701, (Aug. 10, 2010),11 pages.
"International Search Report", Application No. PCT/US01/15226, (Apr. 3, 2003), 4 pages.
"International Search Report", Application No. PCT/US01/15576, (Feb. 24, 2003), 2 pages.
"Non-Final Office Action", U.S. Appl. No. 09/599,813, (Jan. 24, 2006), 22 pages.
"Non-Final Office Action", U.S. Appl. No. 09/599,813, (Feb. 18, 2004), 23 pages.
"Non-Final Office Action", U.S. Appl. No. 09/599,813, (Aug. 10, 2005), 25 pages.
"Non-Final Office Action", U.S. Appl. No. 09/599,813, (Aug. 19, 2004),18 pages.
"Non-Final Office Action", U.S. Appl. No. 10/632,297, (Mar. 20, 2006), 23 pages.
"Non-Final Office Action", U.S. Appl. No. 10/632,297, (May 25, 2007), 22 pages.
"Non-Final Office Action", U.S. Appl. No. 10/723,188, (Apr. 16, 2008),16 pages.
"Non-Final Office Action", U.S. Appl. No. 10/723,188, (Jun. 14, 2006), 25 pages.
"Non-Final Office Action", U.S. Appl. No. 10/953,933, (Jul. 9, 2007), 26 pages.
"Non-Final Office Action", U.S. Appl. No. 11/056,439, (May 23, 2070), 5 pages.
"Non-Final Office Action", U.S. Appl. No. 11/056,500, (Sep. 4, 2008), 7 pages.
"Notice of Allowance", U.S. Appl. No. 09/599,813, (Sep. 19, 2006), 9 pages.
"Notice of Allowance", U.S. Appl. No. 10/632,297, (Nov. 14, 2007), 7 pages.
"Notice of Allowance", Application No. 10/953,933, (Mar. 14, 2008), 8 pages.
"Notice of Allowance", U.S. Appl. No. 11/056,439, (Feb. 5, 2008), 8 pages.
"Notice of Allowance", U.S. Appl. No. 11/056,439, (Sep. 18, 2007),12 pages.
"Notice of Allowance", U.S. Appl. No. 11/103,836, (Oct. 18, 2007), 6 pages.
"Final Office Action", U.S. Appl. No. 13/159,239, Oct. 23, 2014, 42 pages.
"Final Office Action", U.S. Appl. No. 13/207,125, Nov. 6, 2014, 27 Pages.
"Supplemental Notice of Allowance", U.S. Appl. No. 12/061,613, Nov. 17, 2014, 2 pages.
GAJIC, "Understanding ViewState and Postback Processing in asp. net applications", Retrieved from <http://web.archive.org/web/20050918075312/http://delphi.about.com/library/weekly/aa051705a.htm> on Oct. 23, 2014, Sep. 18, 2005, 3 pages.
"Non-Final Office Action", U.S. Appl. No. 13/051,741, Mar. 12, 2015, 11 pages.
"Non-Final Office Action", U.S. Appl. No. 14/530,237, Apr. 13, 2015, 15 pages.
"Non-Final Office Action", U.S. Appl. No. 13/159,239, Apr. 2, 2015, 9 pages.
"Final Office Action", U.S. Appl. No. 12/061,613, Jan. 30, 2014, 17 pages.
"Final Office Action", U.S. Appl. No. 13/051,741, Feb. 6, 2014, 11 pages.
"Final Office Action", U.S. Appl. No. 13/915,364, Jan. 28, 2014, 21 pages.
"Foreign Office Action", BR Application No. PI0111797-1, Feb. 11, 2014, 7 Pages.
"Notice of Allowance", U.S. Appl. No. 12/028,651, Feb. 20, 2014, 8 Pages.
U.S. Appl. No. 60/191,662, Moore, Reagan W.
"About Microsoft Word", Microsoft Word 2000, published 1983-1999, and Microsoft Excel 2000 (see Screen Shot "About Microsoft Excel") Published 1988-1999, 3 pages.
"Adobe GoLive 5.0: User Guide," Adobe Systems, 2000, Chapter 12., (2000),11 pages.
"Advisory Action", U.S. Appl. No. 10/185,048, (Jun. 20, 2006), 3 Pages.
"Advisory Action", U.S. Appl. No. 10/185,048, (Sep. 16, 2005), 3 Pages.
"Advisory Action", U.S. Appl. No. 10/632,437, (Aug. 23, 2006), 3 pages.
"Advisory Action", U.S. Appl. No. 10/898,657, (Mar. 25, 2008), 3 pages.
"Advisory Action", U.S. Appl. No. 10/916,692, (Dec. 10, 2008), 3 Pages.
"Advisory Action", U.S. Appl. No. 10/942,528, (Oct. 26, 2009), 3 pages.
"Advisory Action", U.S. Appl. No. 11/036,910, (Sep. 10, 2009), 3 pages.
"Advisory Action", U.S. Appl. No. 11/276,584, (Apr. 17, 2009), 3 pages.
"Altova Tools for XPath 1.0/2.0", Retrieved from <<http://www.altova.comdev_portal_xpath.html>>, (2005), 12 pages.

(56) References Cited

OTHER PUBLICATIONS

"Applicants' Statement Regarding a Non-Public Use", (May 31, 2006),1 page.
"Architecture for a Dynamic Information Area Control", *IBM Technical Disclosure Bulletin*, IBM Corp. New York, US, vol. 37, No. 10, Oct. 1, 1994, pp. 245-246, XP000475650 ISSN: 0018-8689, (Oct. 1, 1994), pp. 245-246.
"Attensa Outlook—Getting Started", www.attensa.com, (2005), pp. 1-33.
"Blogdigger—Add Feed Form", Internet Resource, Retrieved from <http://web.archive.org/web/20050618015745/http://www.blogdigger.com/add.jsp> on Nov. 13, 2008 1 of> on Nov. 13, 2008, 1 page.
"Bradbury Software FeedDemon 1.0", (May 26, 2004), 3 pages.
"Copying the Search Form to Custom Pages in Windows SharePoint Services-based Web Sites", Retrieved from <www.sharepointcustomization.com/resources/tipstricks/04wss-searchbox-tip.htm> (Feb. 11, 2009) Microsoft Corp,(2003),1 page.
"Copying the Search Form to Services-based Web Sites", *Cybook, Inc.*, the whole document, (Jul. 26, 2004),1 page.
"Dreamweaver Technote, Changes in Copying and Pasting in Dreamweaver 4", *Macromedia, Inc.*, (Mar. 12, 2001), 3 pages.
"Dreamweaver Technote: Changes in copying and pasting in Dreamweaver 4", http://store1.adobe.com/cfusion/knowledgebase/index.cfm?id=tn_15152, (Mar. 2001), 2 pages.
"Enter Key", Retrieved from: <http://systems.webopedia.com/TERM/Enter_key.html> on Dec. 20, 2006, (Sep. 1, 1996), 1 page.
"EP Office Action", Application No. 06111546.5, (Oct. 15, 2008), 5 pages.
"EP Search Report", Application No. 07751586.4, (Aug. 13, 2009), 9 pages.
"EP Search Report", Application Serial No. 07750552.7, EESR,(Sep. 30, 2009), 6 pages.
"EP Search Report", EP Application No. 00306806, (Jul. 16, 2003), 3 pages.
"EP Search Report", EP Application No. 05112241.4, (Mar. 18, 2010),10 pages.
"EP Search Report", EP Application No. 97307138, (Mar. 21, 2003), 3 pages.
"European Search Report", EP Application No. 06111546.5, (Nov. 9, 2006), 5 pages.
"European Search Report", EP Application No. 10012887.5, (Jul. 4, 2011),12 pages.
"European Search Report", European Application No. 10012887.5-2211, Jul. 4, 2011, 11 pages.
"Excel Developer Tip: Determining the Data Type of a Cell", Retrieved from <http://jwalk.com/ss/excel/tips/tip62.htm>, (May 13, 1998),1 page.
"Extended European Search Report", EP Application No. 10012887.5, (Jul. 4, 2011), 11 pages.
"Feed Splicing, Part 1", Retrieved from: <http://blogs.feedburner.com/feedburner/archives/2004/07/feed_splicing_part_i.php> on Jul. 14, 2004, 5 pages.
"Feed Splicing, Part 2", Retrieved from <http://blogs.feedburner.com/feedburner/archives/2004/08feed_splicing_part_ii.php> on Dec. 8, 2008, (Aug. 16, 2004), 5 pages.
"FeedBurner", Retrieved from <http://www.feedburner.com> on Dec. 8, 2008, (Feb. 25, 2004),1 Page.
"Final Office Action", U.S. Appl. No. 09/599,086, (Mar. 6, 2008), 47 pages.
"Final Office Action", U.S. Appl. No. 09/599,086, (May 10, 2007), 41 pages.
"Final Office Action", U.S. Appl. No. 09/599,086, (May 25, 2004), 23 pages.
"Final Office Action", U.S. Appl. No. 09/599,086, (Jul. 5, 2006),34 pages.
"Final Office Action", U.S. Appl. No. 09/599,086, (Aug. 8, 2005), 27 pages.
"Final Office Action", U.S. Appl. No. 09/599,299, (Apr. 20, 2004), 23 pages.
"Final Office Action", U.S. Appl. No. 09/599,812, (Aug. 12, 2003), 38 pages.
"Final Office Action", U.S. Appl. No. 10/178,291, (Dec. 19, 2005), 21 pages.
"Final Office Action", U.S. Appl. No. 10/185,048, (Mar. 13, 2006),14 Pages.
"Final Office Action", U.S. Appl. No. 10/185,048, (Jun. 3, 2005),14 Pages.
"Final Office Action", U.S. Appl. No. 10/402,640, (Aug. 28, 2009),17 pages.
"Final Office Action", U.S. Appl. No. 10/402,640, (Sep. 10, 2007),16 pages.
"Final Office Action", U.S. Appl. No. 10/609,274, (Oct. 3, 2008), 50 pages.
"Final Office Action", U.S. Appl. No. 10/609,274, (Oct. 31, 2007), 41 pages.
"Final Office Action", U.S. Appl. No. 10/632,437, (Jan. 25, 2008), 25 pages.
"Final Office Action", U.S. Appl. No. 10/632,437, (Jun. 1, 2006) ,21 pages.
"Final Office Action", U.S. Appl. No. 10/723,188, (Jan. 9, 2009), 20 pages.
"Final Office Action", U.S. Appl. No. 10/723,863, (Sep. 19, 2007), 34 Pages.
"Final Office Action", U.S. Appl. No. 10/770,240, (Apr. 13, 2011),17 pages.
"Final Office Action", U.S. Appl. No. 10/770,240, (Jun. 26, 2009),15 pages.
"Final Office Action", U.S. Appl. No. 10/770,240, (Jun. 29, 2007), 28 pages.
"Final Office Action", U.S. Appl. No. 10/781,586, (Aug. 9, 2007), 20 pages.
"Final Office Action", U.S. Appl. No. 10/846,428, (Mar. 3, 2008), 23 pages.
"Final Office Action", U.S. Appl. No. 10/857,689, (Jan. 6, 2009),17 pages.
"Final Office Action", U.S. Appl. No. 10/857,689, (Jan. 15, 2008),15 pages.
"Final Office Action", U.S. Appl. No. 10/876,418, (May 22, 2008),14 pages.
"Final Office Action", U.S. Appl. No. 10/876,433, (Nov. 14, 2008), 31 pages.
"Final Office Action", U.S. Appl. No. 10/897,647, (Mar. 6, 2008), 25 pages.
"Final Office Action", U.S. Appl. No. 10/897,647, (Jul. 14, 2009), 36 pages.
"Final Office Action", U.S. Appl. No. 10/898,656, (Nov. 15, 2007),16 pages.
"Final Office Action", U.S. Appl. No. 10/898,657, (Jan. 3, 2008), 21 pages.
"Final Office Action", U.S. Appl. No. 10/916,692, (Oct. 2, 2008),10 Pages.
"Final Office Action", U.S. Appl. No. 10/916,692, (Nov. 16, 2009),10 pages.
"Final Office Action", U.S. Appl. No. 10/938,476, (Jun. 20, 2011),19 pages.
"Final Office Action", U.S. Appl. No. 10/942,528, (Sep. 17, 2009), 27 pages.
"Final Office Action", U.S. Appl. No. 10/955,087, (May 16, 2008),13 pages.
"Final Office Action", U.S. Appl. No. 10/955,666, (Oct. 14, 2009), 24 pages.
"Final Office Action", U.S. Appl. No. 10/955,666, (Oct. 31, 2008), 24 pages.
"Final Office Action", U.S. Appl. No. 10/955,666, (Aug. 30, 2007),19 pages.
"Final Office Action", U.S. Appl. No. 10/976,451, (Jul. 2, 2009),13 pages.
"Final Office Action", U.S. Appl. No. 10/976,451, (Apr. 6, 2011),10 pages.
"Final Office Action", U.S. Appl. No. 10/976,451, (Jul. 27, 2010),12 pages.

(56) References Cited

OTHER PUBLICATIONS

"Final Office Action", U.S. Appl. No. 10/977,198, (Aug. 19, 2009),15 pages.
"Final Office Action", U.S. Appl. No. 10/977,198, (Sep. 3, 2008),13 pages.
"Final Office Action", U.S. Appl. No. 10/977,198, (Oct. 11, 2007),10 pages.
"Final Office Action", U.S. Appl. No. 10/988,718, (Jan. 30, 2008),15 pages.
"Final Office Action", U.S. Appl. No. 10/988,718, (Dec. 22, 2008),17 pages.
"Final Office Action", U.S. Appl. No. 10/988,732, (Nov. 12, 2010), 37 pages.
"Final Office Action", U.S. Appl. No. 10/988,732, (Nov. 13, 2009), 33 pages.
"Final Office Action", U.S. Appl. No. 10/988,732, (Dec. 10, 2008), 29 pages.
"Final Office Action", U.S. Appl. No. 11/012,472, (Mar. 23, 2010),10 pages.
"Final Office Action", U.S. Appl. No. 11/036,910, (May 26, 2010), 9 pages.
"Final Office Action", U.S. Appl. No. 11/044,106, (Apr. 13, 2009),16 pages.
"Final Office Action", U.S. Appl. No. 11/056,500, (Apr. 16, 2009),10 pages.
"Final Office Action", U.S. Appl. No. 11/072,087, (Nov. 16, 2009), 9 pages.
"Final Office Action", U.S. Appl. No. 11/095,254, (Dec. 22, 2008), 9 pages.
"Final Office Action", U.S. Appl. No. 11/107,347, (Apr. 2, 2009),11 pages.
"Final Office Action", U.S. Appl. No. 11/107,347, (Mar. 22, 2010),11 pages.
"Final Office Action", U.S. Appl. No. 11/158,398, (Oct. 15, 2010),11 pages.
"Final Office Action", U.S. Appl. No. 11/158,398, (Feb. 25, 2009),12 pages.
"Final Office Action", U.S. Appl. No. 11/158,398, (Mar. 22, 2010),11 pages.
"Final Office Action", U.S. Appl. No. 11/158,911, (Oct. 15, 2010),13 pages.
"Final Office Action", U.S. Appl. No. 11/158,911, (Oct. 28, 2009),10 pages.
"Final Office Action", U.S. Appl. No. 11/158,936, (Jun. 26, 2009),16 pages.
"Final Office Action", U.S. Appl. No. 11/158,936, (Jul. 19, 2010),14 pages.
"Final Office Action", U.S. Appl. No. 11/170,521, (Sep. 8, 2009),12 pages.
"Final Office Action", U.S. Appl. No. 11/170,521, (Jun. 29, 2010),13 pages.
"Final Office Action", U.S. Appl. No. 11/203,818, (Apr. 14, 2009), 25 pages.
"Final Office Action", U.S. Appl. No. 11/203,937, (May 7, 2009), 8 pages.
"Final Office Action", U.S. Appl. No. 11/218,149, (Nov. 16, 2009),18 pages.
"Final Office Action", U.S. Appl. No. 11/218,149, (May 19, 2010),17 pages.
"Final Office Action", U.S. Appl. No. 11/226,044, (Apr. 20, 2009), 21 pages.
"Final Office Action", U.S. Appl. No. 11/227,550, (Jan. 19, 2010),12 pages.
"Final Office Action", U.S. Appl. No. 11/227,550, (Aug. 19, 2010),12 pages.
"Final Office Action", U.S. Appl. No. 11/234,767, (Jan. 26, 2010), 23 pages.
"Final Office Action", U.S. Appl. No. 11/234,767, (Mar. 10, 2011), 28 pages.
"Final Office Action", U.S. Appl. No. 11/234,767, (Jun. 10, 2009),23 pages.
"Final Office Action", U.S. Appl. No. 11/276,536, (Apr. 23, 2010), 20 pages.
"Final Office Action", U.S. Appl. No. 11/276,584, (Oct. 29, 2009),12 pages.
"Final Office Action", U.S. Appl. No. 11/295,178, (Dec. 24, 2009), 38 pages.
"Final Office Action", U.S. Appl. No. 11/295,178, (Jul. 30, 2010), 43 pages.
"Final Office Action", U.S. Appl. No. 11/557,931, (Feb. 26, 2010), 8 pages.
"Final Office Action", U.S. Appl. No. 11/567,140, (Aug. 19, 2010),10 pages.
"Final Office Action", U.S. Appl. No. 11/927,296, (Jul. 7, 2011),12 pages.
"Final Office Action", U.S. Appl. No. 12/061,613, (Apr. 28, 2011),11 pages.
"Final Office Action", U.S. Appl. No. 12/061,613, (Aug. 30, 2012),14 pages.
"Final Office Action", U.S. Appl. No. 12/126,532, (Oct. 14, 2011), 25 pages.
"Final Office Action", U.S. Appl. No. 12/694,836, (Apr. 24, 2013), 36 pages.
"Final Office Action", U.S. Appl. No. 12/694,836, (Aug. 29, 2012), 27 pages.
"First Office Action", Chinese Application No. 200780007512.9, (Jan. 15, 2010), 7 pages.
"First Office Action", Chinese Application No. 200780008302.1, (Jan. 8, 2010),15 pages.
"flaggeditems.png", Print screen from Internet Search, Retreived from <http://web.archive.org/web/20050623095655/http://ranchero.com/images/nnw2/flaggeditems.png> on Nov. 13, 2008, 1 page.
"Foreign Decision of Grant", Russian Application No. 2006103267, (Aug. 13, 2010), 18 pages.
"Foreign Decision of Grant", Russian Application No. 2006105526, (Nov. 8, 2010), 16 pages.
"Foreign Notice of Allowance", Application No. JP2006-060050, (Dec. 1, 2011), 6 pages.
"Foreign Notice of Allowance", Australian Application No. AUS2006200285, (Sep. 23, 2010), 3 pages.
"Foreign Notice of Allowance", Canadian Application No. 2408527, (Apr. 17, 2012), 1 page.
"Foreign Notice of Allowance", Canadian Application No. 2412611, (Sep. 19, 2011), 1 page.
"Foreign Notice of Allowance", Canadian Application No. 2533147, (Mar. 11, 2013), 1 page.
"Foreign Notice of Allowance", Japanese Application No. 2002-504581, (Sep. 16, 2011), 6 pages.
"Foreign Notice of Allowance", Mexican Application No. PA/a/2005/012067, (Nov. 13, 2009), 3 pages.
"Foreign Office Action", Application Serial No. 07750552.7, (Nov. 17, 2009), 6 pages.
"Foreign Office Action", Application Serial No. 2,412,611, (Feb. 9, 2009), 6 pages.
"Foreign Office Action", Application Serial No. 2002-503702, Final Notice of Rejection,(Jun. 5, 2009), 16 pages.
"Foreign Office Action", Application Serial No. 200610003709.2, (Jan. 9, 2009), 8 pages.
"Foreign Office Action", Application Serial No. 200680018421.0, (Jan. 9, 2009),10 pages.
"Foreign Office Action", Application Serial No. PA/a/2006/002493, (Sep. 14, 2009), 2 pages.
"Foreign Office Action", Australian Application No. 2006200483, (Aug. 27, 2010),1 page.
"Foreign Office Action", Australian Application No. 2006262540, (Oct. 8, 2010),1 page.
"Foreign Office Action", Australian Patent Application No. 2006200285, (May 20, 2010), 2 pages.
"Foreign Office Action", Canadian Application No. 2,408,313, (Jun. 18, 2012), 7 pages.

(56) References Cited

OTHER PUBLICATIONS

"Foreign Office Action", Canadian Application No. 2408313, (Oct. 26, 2010), 5 pages.
"Foreign Office Action", Canadian Application No. 2408527, (Sep. 27, 2011), 3 pages.
"Foreign Office Action", Canadian Application No. 2412611, (Oct. 26, 2010), 2 pages.
"Foreign Office Action", Canadian Application No. 2533147, (Jan. 25, 2013), 2 pages.
"Foreign Office Action", Chinese Application No. 200610051544.X, (Dec. 4, 2009), 9 pages.
"Foreign Office Action", Chinese Application No. 200610051554.X, (Jul. 10, 2009), 11 pages.
"Foreign Office Action", Chinese Application No. 200610051554.X, (Jun. 25, 2010), 10 pages.
"Foreign Office Action", Chinese Application No. 200680018421.0, (Jun. 24, 2010), 11 pages.
"Foreign Office Action", Chinese Application No. 200680018421.0, (Sep. 3, 2010), 9 pages.
"Foreign Office Action", Chinese Application No. 200680021415.0, (Jun. 8, 2010), 10 pages.
"Foreign Office Action", EP Application No. 01935325.9, (Jul. 20, 2010), 6 pages.
"Foreign Office Action", EP Application No. 05112241.4, (Dec. 23, 2010), 6 pages.
"Foreign Office Action", European Patent Application No. 01935325.9, (Jun. 20, 2011), 5 pages.
"Foreign Office Action", European Patent Application No. 01939368.5, (Feb. 25, 2010), 3 pages.
"Foreign Office Action", European Patent Application No. 01939034.3, (Nov. 5, 2007), 3 pages.
"Foreign Office Action", Japanese Application 2002-504575, (Dec. 14, 2010), 4 pages.
"Foreign Office Action", Japanese Application No. 2002-503700, (May 10, 2011), 5 pages.
"Foreign Office Action", Japanese Application No. 2002-503700, (Aug. 30, 2011), 4 pages.
"Foreign Office Action", Japanese Application No. 2002-503701, (May 31, 2011), 10 pages.
"Foreign Office Action", Japanese Application No. 2002-503701, (Mar. 16, 2012), 3 pages.
"Foreign Office Action", Japanese Application No. 2002-504581, (Dec. 17, 2010), 24 pages.
"Foreign Office Action", Japanese Application No. 2002-504581, (May 27, 2011), 6 pages.
"Foreign Office Action", Japanese Application No. 2002-530701, (Aug. 10, 2010), 11 pages.
"Foreign Office Action", Japanese Application No. 2006-060050, (Aug. 26, 2011), 4 pages.
"Foreign Office Action", Japanese Application No. 2006-071589, (Mar. 29, 2011), 9 pages.
"Foreign Office Action", Korean Application No. 10-2006-0003894, (Jun. 12, 2012), 4 pages.
"Foreign Office Action", Korean Application No. 10-2006-0012016, (Oct. 30, 2012), 6 pages.
"Foreign Office Action", Korean Application No. 10-2012-0054230, (Aug. 19, 2012), 9 pages.
"Foreign Office Action", Malaysian Application No. PI 20060743, (Jun. 8, 2012), 3 pages.
"Foreign Office Action", Mexican Patent Application No. PA/a/2006/002493, (Sep. 14, 2009), 5 pages.
"Foreign Office Action", Russian Application No. 2006103267, (Apr. 20, 2010), 10 pages.
"Foreign Office Action", Russian Application No. 2006105526, (Apr. 15, 2010), 10 pages.
"Foreign Office Action", Russian Application No. 2006105526, (Aug. 24, 2010), 5 pages.
"Foreign Office Action", Taiwan Application No. 095103951, (Nov. 8, 2012), 15 pages.

"Google Reader: beta feed reader", Retrieved from <http://www.consumingexperience.com/2005/10/google-reader-beta-feed-reader.html,(Oct. 7, 2005), 8 pages.
"Google Reader: Reviewer's Guide", Available at: <http://www.google.com/press/guides/reader_overview.pdf>, (Oct. 16, 2005), pp. 1-5.
"HP Blade Server BH Series Operating System Guide", Hewlett-Packard,(Jul. 2002), pp. 1-69.
"Intention to Grant", European Patent Application No. 01935325.9, (Dec. 7, 2012), 7 pages.
"Introduction to RSS", Retrieved from: <http://www.webreference.com/authoring/languages/xml/rss/intro.> on Jan. 28, 2008, (Mar. 27, 2000),3 Pages.
"Issue Notification", U.S. Appl. No. 10/610,504, (Mar. 9, 2007),1 Page.
"Issue Notification", U.S. Appl. No. 10/955,087, (Mar. 18, 2009),1 page.
"Issue Notification", U.S. Appl. No. 10/988,718, (Aug. 12, 2009),1 page.
"Issue Notification", U.S. Appl. No. 11/095,254, (Feb. 10, 2010),1 page.
"Issue Notification", U.S. Appl. No. 11/276,585, (Jan. 21, 2009),1 page.
"JP Notice of Publication", Application Serial No. 2008-558275, (Aug. 6, 2009), 2 pages.
"JP Notice of Publication", Application Serial No. 2008-558294, (Aug. 13, 2009), 2 pages.
"Kalsey_Blogfeed", *Internet Article*, Retrieved from <http://web.archive.org/web/20050515005125/http://www.kalsey.com/tools/blogfeed/> on Nov. 13, 2008, pp. 1-3.
"Lotus Notes Release 5, Step by Step", *Lotus Development Corporation*, (1999), 224 pages.
"mainWindow2.png", *Print Screen from Internet Article*, Retrieved from <http://web.archive.org/web/20050623095300/http://ranchero.com/images/nnw2/mainWindow2.png> on Nov. 13, 2008,1 page.
"Manual of Patent Office Practice", *Computer-Implemented Inventions*, Chapter 16.09.02, Data Structures, (Oct. 2010), 3 pages.
"Microsoft Computer Dictionary 5th Edition", *Entry for "Stack," Microsoft Press*, ISBN 0-7356-1495-4, (May 1, 2002), p. 495.
"Microsoft Computer Dictionary", *Microsoft Corporation, Microsoft Press, Fifth Edition*, (Jun. 1, 2001), p. 149.
"Microsoft Visual Basic 5.0 Programmer's Guide", *Microsoft Press*, (1997), pp. 42-43, 54-58, 578-579.
"Microsoft Word 2000 Screenshots", (2000), pp. 11-17.
"Microsoft Word 2000 Screenshots", Word,(2000), pp. 1-17.
"Microsoft Word 2000", Screenshots,(1999), pp. 1-5.
"Mott Porous Metal. The Most Reliable Means of Restricting Gas Flow", *Mott Corporation Webpage*, retrieved from <<http://www.mottcorp.com/industry/oem/oem_flowres.htm>> on Aug. 23, 2004, 4 pages.
"NetNewsWire_helpbook_faq", *Internet Search FAQ sheet*, Retrieved from <http://web.archive.org/web/20050623234918/http://ranchero.com/netnewswire/helpBook/faq.html> on Nov. 13, 2008, pp. 1-3.
"Netscape Communicator 4.61 for OS/2 Warp", Netscape Communication Corporation, Software 1999, The Whole software release & Netscape—Version 4.61 {en}—010615, Netscape Screenshot,(Oct. 2, 2002),1 page.
"Netscape Window", *Netscape Screenshot*, (Oct. 2, 2002), 1 page.
"Non Final Office Action", U.S. Appl. No. 09/599,086, (Jan. 30, 2006), 33 pages.
"Non Final Office Action", U.S. Appl. No. 09/599,086, (Oct. 28, 2003), 21 pages.
"Non Final Office Action", U.S. Appl. No. 09/599,086, (Oct. 31, 2007), 48 pages.
"Non Final Office Action", U.S. Appl. No. 09/599,086, (Nov. 13, 2006), 33 pages.
"Non Final Office Action", U.S. Appl. No. 09/599,086, (Nov. 14, 2008), 55 pages.
"Non Final Office Action", U.S. Appl. No. 09/599,086, (Mar. 3, 2005), 25 pages.

(56) References Cited

OTHER PUBLICATIONS

"Non Final Office Action", U.S. Appl. No. 09/599,806, (Mar. 12, 2003), 7 pages.
"Non Final Office Action", U.S. Appl. No. 09/599,806, (Aug. 17, 2004), 5 pages.
"Non Final Office Action", U.S. Appl. No. 09/599,809, (May 13, 2009), 17 pages.
"Non Final Office Action", U.S. Appl. No. 10/178,291, (Nov. 26, 2004), 21 pages.
"Non Final Office Action", U.S. Appl. No. 10/178,291, (Apr. 29, 2004), 14 pages.
"Non Final Office Action", U.S. Appl. No. 10/178,291, (Jun. 27, 2005), 22 pages.
"Non Final Office Action", U.S. Appl. No. 10/395,505, (Sep. 11, 2006), 8 pages.
"Non Final Office Action", U.S. Appl. No. 10/402,640, (Oct. 6, 2006), 15 pages.
"Non Final Office Action", U.S. Appl. No. 10/402,640, (Feb. 12, 2008), 16 pages.
"Non Final Office Action", U.S. Appl. No. 10/402,640, (Apr. 25, 2007), 16 pages.
"Non Final Office Action", U.S. Appl. No. 10/402,640, (Sep. 8, 2008), 16 pages.
"Non Final Office Action", U.S. Appl. No. 10/609,274, (Jan. 17, 2007), 43 pages.
"Non Final Office Action", U.S. Appl. No. 10/609,274, (Apr. 2, 2008), 43 pages.
"Non Final Office Action", U.S. Appl. No. 10/632,437, (Dec. 16, 2005), 22 pages.
"Non Final Office Action", U.S. Appl. No. 10/632,437, (Jul. 26, 2007), 19 pages.
"Non Final Office Action", U.S. Appl. No. 10/632,437, (Sep. 10, 2008), 28 pages.
"Non Final Office Action", U.S. Appl. No. 10/770,240, (Oct. 29, 2010), 14 pages.
"Non Final Office Action", U.S. Appl. No. 10/770,240, (May 1, 2008), 30 pages.
"Non Final Office Action", U.S. Appl. No. 10/770,240, (May 13, 2010), 15 pages.
"Non Final Office Action", U.S. Appl. No. 10/770,240, (Aug. 24, 2004), 25 pages.
"Non Final Office Action", U.S. Appl. No. 10/770,240, (Aug. 24, 2006), 25 pages.
"Non Final Office Action", U.S. Appl. No. 10/857,689, (Jun. 11, 2009), 20 pages.
"Non Final Office Action", U.S. Appl. No. 10/857,689, (Dec. 17, 2009), 19 pages.
"Non Final Office Action", U.S. Appl. No. 10/857,689, (Jun. 13, 2007), 23 pages.
"Non Final Office Action", U.S. Appl. No. 10/857,689, (Jul. 18, 2008), 18 pages.
"Non Final Office Action", U.S. Appl. No. 10/876,433, (Apr. 24, 2009), 24 pages.
"Non Final Office Action", U.S. Appl. No. 10/876,433, (May 12, 2008), 26 pages.
"Non Final Office Action", U.S. Appl. No. 10/897,647, (Nov. 14, 2008), 28 pages.
"Non Final Office Action", U.S. Appl. No. 10/897,647, (Sep. 6, 2007), 21 pages.
"Non Final Office Action", U.S. Appl. No. 10/898,656, (Apr. 18, 2008), 17 pages.
"Non Final Office Action", U.S. Appl. No. 10/898,656, (Jul. 13, 2007), 13 pages.
"Non Final Office Action", U.S. Appl. No. 10/898,657, (Jul. 18, 2007), 18 pages.
"Non Final Office Action", U.S. Appl. No. 10/898,657, (Sep. 8, 2008), 24 pages.
"Non Final Office Action", U.S. Appl. No. 10/916,692, (Apr. 30, 2009), 9 pages.
"Non Final Office Action", U.S. Appl. No. 10/939,588, (Feb. 18, 2009), 29 pages.
"Non Final Office Action", U.S. Appl. No. 10/942,528, (Mar. 6, 2009), 28 pages.
"Non Final Office Action", U.S. Appl. No. 10/955,087, (Nov. 19, 2007), 22 pages.
"Non Final Office Action", U.S. Appl. No. 10/955,665, (Apr. 2, 2009), 15 pages.
"Non Final Office Action", U.S. Appl. No. 10/955,666, (May 7, 2009), 24 pages.
"Non Final Office Action", U.S. Appl. No. 10/955,666, (Dec. 26, 2006), 20 pages.
"Non Final Office Action", U.S. Appl. No. 10/955,666, (Feb. 4, 2008), 20 pages.
"Non Final Office Action", U.S. Appl. No. 10/976,451, (Feb. 23, 2009), 12 pages.
"Non Final Office Action", U.S. Appl. No. 10/977,198, (Jan. 10, 2008), 10 pages.
"Non Final Office Action", U.S. Appl. No. 10/977,198, (Feb. 2, 2009), 15 pages.
"Non Final Office Action", U.S. Appl. No. 10/977,198, (Mar. 9, 2007), 9 pages.
"Non Final Office Action", U.S. Appl. No. 10/988,718, (Jan. 25, 2007), 13 pages.
"Non Final Office Action", U.S. Appl. No. 10/988,718, (Jul. 21, 2008), 18 pages.
"Non Final Office Action", U.S. Appl. No. 10/988,718, (Jul. 26, 2007), 21 pages.
"Non Final Office Action", U.S. Appl. No. 10/988,720, (Apr. 2, 2009), 14 pages.
"Non Final Office Action", U.S. Appl. No. 10/990,152, (May 28, 2009), 16 pages.
"Non Final Office Action", U.S. Appl. No. 11/036,910, (Oct. 2, 2008), 7 pages.
"Non Final Office Action", U.S. Appl. No. 11/095,254, (Jun. 8, 2009), 8 pages.
"Non Final Office Action", U.S. Appl. No. 11/158,911, (Jun. 30, 2009), 9 pages.
"Non Final Office Action", U.S. Appl. No. 11/170,521, (Jan. 21, 2009), 10 pages.
"Non final Office Action", U.S. Appl. No. 11/234,767, (Feb. 26, 2009), 22 pages.
"Non Final Office Action", U.S. Appl. No. 11/276,536, (Jan. 9, 2009), 33 pages.
"Non Final Office Action", U.S. Appl. No. 11/276,536, (May 28, 2009), 18 pages.
"Non Final Office Action", U.S. Appl. No. 11/276,584, (Jun. 25, 2009), 11 pages.
"Non Final Office Action", U.S. Appl. No. 11/295,178, (May 27, 2009), 29 pages.
"Non Final Office Action", U.S. Appl. No. 11/567,140, (Feb. 18, 2011), 8 pages.
"Non Final Office Action", U.S. Appl. No. 12/126,532, (Mar. 24, 2011), 23 pages.
"Non Final Office Action", U.S. Appl. No. 12/249,973), (Apr. 12, 2011), 8 pages.
"Non-Final Office Action", U.S. Appl. No. 09/599,299, (Oct. 28, 2003), 32 pages.
"Non-Final Office Action", U.S. Appl. No. 09/599,299, (Aug. 12, 2004), 12 pages.
"Non-Final Office Action", U.S. Appl. No. 09/599,812, (Feb. 27, 2003), 20 pages.
"Non-Final Office Action", U.S. Appl. No. 09/599,812, (Feb. 5, 2004), 35 pages.
"Non-Final Office Action", U.S. Appl. No. 10/011,150, (May 19, 2005), 7 pages.
"Non-Final Office Action", U.S. Appl. No. 10/185,048, (Dec. 8, 2004), 14 Pages.
"Non-Final Office Action", U.S. Appl. No. 10/402,640, (Dec. 30, 2009), 16 pages.
"Non-Final Office Action", U.S. Appl. No. 10/402,640, (Apr. 30, 2010), 4 pages.

(56) References Cited

OTHER PUBLICATIONS

"Non-Final Office Action", U.S. Appl. No. 10/610,504, (Mar. 9, 2006),12 Pages.
"Non-Final Office Action", U.S. Appl. No. 10/723,863, (Feb. 8, 2007), 30 Pages.
"Non-Final Office Action", U.S. Appl. No. 10/723,863, (Aug. 23, 2006),16 Pages.
"Non-Final Office Action", U.S. Appl. No. 10/723,863, (Nov. 6, 2007), 7 Pages.
"Non-Final Office Action", U.S. Appl. No. 10/781,586, (Jan. 9, 2008), 22 pages.
"Non-Final Office Action", U.S. Appl. No. 10/781,586, (Oct. 20, 2006), 21 pages.
"Non-Final Office Action", U.S. Appl. No. 10/846,428, (Oct. 15, 2008), 23 pages.
"Non-Final Office Action", U.S. Appl. No. 10/846,428, (Jul. 19, 2007),19 pages.
"Non-Final Office Action", U.S. Appl. No. 10/854,961, (Nov. 15, 2006) ,21 pages.
"Non-Final Office Action", U.S. Appl. No. 10/876,418, (Sep. 13, 2007),14 pages.
"Non-Final Office Action", U.S. Appl. No. 10/916,692, (Apr. 1, 2008), 9 Pages.
"Non-Final Office Action", U.S. Appl. No. 10/916,692, (Apr. 5, 2010), 6 pages.
"Non-Final Office Action", U.S. Appl. No. 10/939,588, (Aug. 27, 2009), 28 pages.
"Non-Final Office Action", U.S. Appl. No. 10/939,588, (Feb. 18, 2009), 29 pages.
"Non-Final Office Action", U.S. Appl. No. 10/955,665, (Sep. 11, 2008),16 pages.
"Non-Final Office Action", U.S. Appl. No. 10/976,451, (Oct. 29, 2009),14 pages.
"Non-Final Office Action", U.S. Appl. No. 10/976,451, (Nov. 10, 2010), 9 pages.
"Non-Final Office Action", U.S. Appl. No. 10/976,451, (Apr. 9, 2010),11 pages.
"Non-Final Office Action", U.S. Appl. No. 10/976,451, (Jul. 23, 2012), 9 pages.
"Non-Final Office Action", U.S. Appl. No. 10/988,732, (Apr. 1, 2008), 27 pages.
"Non-Final Office Action", U.S. Appl. No. 10/988,732, (May 26, 2010), 36 pages.
"Non-Final Office Action", U.S. Appl. No. 10/988,732, (Jun. 11, 2009), 30 pages.
"Non-Final Office Action", U.S. Appl. No. 11/012,472, (Oct. 6, 2009), 8 pages.
"Non-Final Office Action", U.S. Appl. No. 11/012,472, (Jul. 1, 2010), 9 pages.
"Non-Final Office Action", U.S. Appl. No. 11/036,910, (Jun. 1, 2009), 8 pages.
"Non-Final Office Action", U.S. Appl. No. 11/036,910, (Nov. 13, 2009), 9 pages.
"Non-Final Office Action", U.S. Appl. No. 11/036,910, (Aug. 19, 2010), 8 pages.
"Non-Final Office Action", U.S. Appl. No. 11/044,106, (Sep. 24, 2009),17 pages.
"Non-Final Office Action", U.S. Appl. No. 11/095,254, (Apr. 17, 2008), 8 pages.
"Non-Final Office Action", U.S. Appl. No. 11/107,347, (Sep. 17, 2009), 9 pages.
"Non-Final Office Action", U.S. Appl. No. 11/107,347, (Jul. 9, 2010),16 pages.
"Non-Final Office Action", U.S. Appl. No. 11/158,398, (Sep. 8, 2009), 9 pages.
"Non-Final Office Action", U.S. Appl. No. 11/158,398, (May 13, 2010),10 pages.
"Non-Final Office Action", U.S. Appl. No. 11/158,911, (Jun. 10, 2010),11 pages.
"Non-Final Office Action", U.S. Appl. No. 11/158,936, (Jan. 12, 2010),12 pages.
"Non-Final Office Action", U.S. Appl. No. 11/170,521, (Dec. 17, 2009),11 pages.
"Non-Final Office Action", U.S. Appl. No. 11/170,521, (Aug. 3, 2011),16 pages.
"Non-Final Office Action", U.S. Appl. No. 11/218,149, (Jan. 14, 2010),15 Pages.
"Non-Final Office Action", U.S. Appl. No. 11/218,149, (Sep. 20, 2010),15 pages.
"Non-Final Office Action", U.S. Appl. No. 11/227,550, (Aug. 3, 2009),10 pages.
"Non-Final Office Action", U.S. Appl. No. 11/227,550, (Mar. 10, 2010),12 pages.
"Non-Final Office Action", U.S. Appl. No. 11/234,767, (Aug. 12, 2009),24 pages.
"Non-Final Office Action", U.S. Appl. No. 11/234,767, (Nov. 26, 2010), 28 pages.
"Non-Final Office Action", U.S. Appl. No. 11/276,536, (Oct. 7, 2009),15 pages.
"Non-Final Office Action", U.S. Appl. No. 11/276,536, (Sep. 15, 2010),13 pages.
"Non-Final Office Action", U.S. Appl. No. 11/276,584, (Dec. 28, 2009),12 pages.
"Non-Final Office Action", U.S. Appl. No. 11/276,584, (Jul. 26, 2010),14 pages.
"Non-Final Office Action", U.S. Appl. No. 11/295,178, (May 26, 2010), 45 pages.
"Non-Final Office Action", U.S. Appl. No. 11/557,931, (Oct. 20, 2009), 27 pages.
"Non-Final Office Action", U.S. Appl. No. 11/567,140, (May 18, 2010), 8 pages.
"Non-Final Office Action", U.S. Appl. No. 11/567,149, (Sep. 8, 2009), 5 pages.
"Non-Final Office Action", U.S. Appl. No. 11/927,296, (Mar. 4, 2011),19 pages.
"Non-Final Office Action", U.S. Appl. No. 12/021,894, (Dec. 31, 2009),10 pages.
"Non-Final Office Action", U.S. Appl. No. 12/028,651, (Jan. 3, 2011),16 pages.
"Non-Final Office Action", U.S. Appl. No. 12/061,613, (Mar. 16, 2012), 12 pages.
"Non-Final Office Action", U.S. Appl. No. 12/061,613, (Sep. 28, 2010) ,9 pages.
"Non-Final Office Action", U.S. Appl. No. 12/234,449, (Oct. 27, 2010), 8 pages.
"Non-Final Office Action", U.S. Appl. No. 12/234,449, (Jun. 1, 2010), 8 pages.
"Non-Final Office Action", U.S. Appl. No. 12/694,836, (Mar. 9, 2012), 30 pages.
"Non-Final Office Action", U.S. Appl. No. 12/722,414, (Aug. 15, 2012), 27 pages.
"Non-Final Office Action", U.S. Appl. No. 13/051,741, (Apr. 24, 2013),11 pages.
"Non-Final Office Action", U.S. Appl. No. 13/161,419, (Aug. 15, 2012),7 pages.
"Non-Final Office Action", U.S. Appl. No. 11/234,767, (Aug. 12, 2009), 24 Pages.
"Notice of Acceptance", Australian Application No. 2006200483, (Dec. 17, 2010), 3 pages.
"Notice of Allowance", U.S. Appl. No. 10/876,433, (Nov. 10, 2009),13 pages.
"Notice of Allowance", U.S. Appl. No. 09/599,086, (Aug. 17, 2009), 59 pages.
"Notice of Allowance", U.S. Appl. No. 09/599,299, (Nov. 30, 2004), 7 pages.
"Notice of Allowance", U.S. Appl. No. 09/599,806, (Jan. 21, 2005), 9 pages.
"Notice of Allowance", U.S. Appl. No. 09/599,812, (Aug. 3, 2004),12 pages.
"Notice of Allowance", U.S. Appl. No. 10/011,150, (Dec. 16, 2005), 4 pages.

(56) References Cited

OTHER PUBLICATIONS

"Notice of Allowance", U.S. Appl. No. 10/178,291, (Feb. 6, 2006), 7 pages.
"Notice of Allowance", U.S. Appl. No. 10/395,505, (Oct. 4, 2006), 8 pages.
"Notice of Allowance", U.S. Appl. No. 10/402,640, (Jun. 15, 2010), 6 pages.
"Notice of Allowance", U.S. Appl. No. 10/404,312, (Jan. 12, 2009), 8 pages.
"Notice of Allowance", U.S. Appl. No. 10/610,504, (Sep. 6, 2006), 4 Pages.
"Notice of Allowance", U.S. Appl. No. 10/632,437, (May 21, 2009), 15 pages.
"Notice of Allowance", U.S. Appl. No. 10/723,863, (Jun. 30, 2008), 9 Pages.
"Notice of Allowance", U.S. Appl. No. 10/781,586, (May 9, 2008), 6 pages.
"Notice of Allowance", U.S. Appl. No. 10/846,428, (Apr. 29, 2009), 10 pages.
"Notice of Allowance", U.S. Appl. No. 10/854,961, (Jun. 14, 2007), 12 pages.
"Notice of Allowance", U.S. Appl. No. 10/857,689, (May 14, 2010), 9 pages.
"Notice of Allowance", U.S. Appl. No. 10/876,418, (Dec. 31, 2008), 8 pages.
"Notice of Allowance", U.S. Appl. No. 10/897,647, (Jan. 19, 2010), 13 pages.
"Notice of Allowance", U.S. Appl. No. 10/898,656, (Jan. 2, 2009), 9 pages.
"Notice of Allowance", U.S. Appl. No. 10/898,657, (Jun. 11, 2009), 20 pages.
"Notice of Allowance", U.S. Appl. No. 10/916,692, (Jun. 14, 2010), 6 pages.
"Notice of Allowance", U.S. Appl. No. 10/939,588, (Mar. 10, 2010), 10 pages.
"Notice of Allowance", U.S. Appl. No. 10/942,528, (Dec. 3, 2009), 8 pages.
"Notice of Allowance", U.S. Appl. No. 10/955,087, (Dec. 11, 2008), 10 pages.
"Notice of Allowance", U.S. Appl. No. 10/955,665, (Nov. 3, 2009), 8 pages.
"Notice of Allowance", U.S. Appl. No. 10/976,451, (Feb. 4, 2013), 9 pages.
"Notice of Allowance", U.S. Appl. No. 10/988,718, (Apr. 9, 2009), 13 pages.
"Notice of Allowance", U.S. Appl. No. 10/988,720, (Sep. 17, 2009), 18 pages.
"Notice of Allowance", U.S. Appl. No. 10/990,152, (Dec. 21, 2009), 6 pages.
"Notice of Allowance", U.S. Appl. No. 11/012,472, (Nov. 24, 2010), 6 pages.
"Notice of Allowance", U.S. Appl. No. 11/036,910, (Dec. 7, 2010), 7 pages.
"Notice of Allowance", U.S. Appl. No. 11/044,106, (Mar. 15, 2010), 7 pages.
"Notice of Allowance", U.S. Appl. No. 11/056,500, (Dec. 2, 2009), 17 pages.
"Notice of Allowance", U.S. Appl. No. 11/072,087, (Feb. 23, 2010), 4 pages.
"Notice of Allowance", U.S. Appl. No. 11/095,254, (Nov. 18, 2009), 8 pages.
"Notice of Allowance", U.S. Appl. No. 11/107,347, (Dec. 13, 2010), 11 pages.
"Notice of Allowance", U.S. Appl. No. 11/167,514, (Mar. 11, 2009), 6 pages.
"Notice of Allowance", U.S. Appl. No. 11/170,521, (Jan. 19, 2012), 7 pages.
"Notice of Allowance", U.S. Appl. No. 11/203,937, (Aug. 3, 2009), 7 pages.
"Notice of Allowance", U.S. Appl. No. 11/203,937, (Aug. 31, 2009), 2 pages.
"Notice of Allowance", U.S. Appl. No. 11/203,937, Supplemental, (Sep. 15, 2009), 2 pages.
"Notice of Allowance", U.S. Appl. No. 11/218,149, (Feb. 11, 2011), 7 pages.
"Notice of Allowance", U.S. Appl. No. 11/295,178, (Mar. 22, 2011), 20 pages.
"Notice of Allowance", U.S. Appl. No. 11/557,931, (May 5, 2010), 7 pages.
"Notice of Allowance", U.S. Appl. No. 11/567,140, (Oct. 11, 2011), 11 pages.
"Notice of Allowance", U.S. Appl. No. 11/872,703, (Jan. 27, 2010), 19 pages.
"Notice of Allowance", U.S. Appl. No. 11/872,703, (May 14, 2010), 18 pages.
"Notice of Allowance", U.S. Appl. No. 11/927,296, (Aug. 8, 2011), 7 pages.
"Notice of Allowance", U.S. Appl. No. 11/931,730, (Feb. 2, 2011), 7 pages.
"Notice of Allowance", U.S. Appl. No. 12/021,894, (Oct. 29, 2010), 9 pages.
"Notice of Allowance", U.S. Appl. No. 12/028,651, (Jan. 3, 2013), 7 pages.
"Notice of Allowance", U.S. Appl. No. 12/249,973, (Sep. 28, 2011), 9 pages.
"Notice of Allowance", U.S. Appl. No. 13/161,419, (Dec. 7, 2012), 5 pages.
"Notice of Re-Examination", Application Serial No. 01813138.7, (Mar. 11, 2009), 27 pages.
"Notice of Reexamination", Chinese Application No. 01813138.7, (Apr. 22, 2011), 14 pages.
"OLE Open Doc and Network", Retrieved from http://www.pcwebopedia.com on May 9, 2006, Webopedia entries, (May 16, 1998), 7 pages.
"OMG XML Metadata Interchange (XMI) Specification", Retrieved from: <http://www.omg.org/cgi-bin/doc?formal/02-01-01.pdf> on Dec. 2, 2009, Version 1.2, (Jan. 2002), 268 pages.
"PCT Search Report and Written Opinion", Application No. PCT/US06/23336, (Oct. 29, 2007), 8 pages.
"PCT Search Report", PCT Application No. PCT/IB98/01392, (Apr. 9, 1999), 3 pages.
"PCT Search Report", PCT Application No. PCT/IB99/02003, (Nov. 28, 2000), 3 pages.
"PCT Search Report", PCT Application No. PCT/US01/15581, (Jan. 29, 2003), 3 pages.
"PCT Search Report", PCT Application No. PCT/US99/09620, (Sep. 22, 1999), 3 pages.
"Persistence.png", *Print Screen From Internet Article*, Retrieved from <http://web.archive.org/web/20050623095937/http://ranchero.com/images.nnw2/persistence.png> on Nov. 13, 2008, 1 page.
"Protecting Commerical Secure Web Servers from Key-Finding Threats", *nCipher, Inc.*, Available at <www.ncipher.com/uploads/resources/pcws.pdf>, (1999), 12 pages.
"Ranchero Software_Editing LiveJournal Logs", *Internet Article*, Retrieved from <http://web.archive.org/web/20051217022724/http://ranchero.com/netnewswire/tips/livejournalconfig.php> on Nov. 13, 2008, pp. 1-3.
"Ranchero Software_NetNewsWfaq", *Internet Search Engine FAQ sheet*, Retrieved from <http://web.archive.org/web/20030201120948/http://ranchero.com/netnewswire/faq.php> on Nov. 13, 2008, pp. 1-4.
"Ranchero Software_NetNewsWire 2.0 Change Notes", *Internet Article*, Retrieved from <http://web.archive.org/web/20051024203943/http://ranchero.com/netnewswire/changenotes/netnewswire20.php> Nov. 13, 2008, 3 pages.
"Ranchero Software_Smart Lists", *Internet Article*, Retrieved from <http://web.archive.org/web/20050602084724/http://ranchero.com/netnewswire/features/smartLists.php> on Nov. 13, 2008, pp. 1-2.
"Ranchero Software_Subscription Sharing", *Internet Article*, Retrieved from <http://web.archive.org/web/20050811083741/http://ranchero.com/netnewswire/features/sharing.php> on Nov. 13, 2008, pp. 1-3.

(56) References Cited

OTHER PUBLICATIONS

"Ranchero Software Search Engine Subscriptions", *On-line Article*, Retrieved from <http://web.archive.org/web/20050714082710/http://ranchero.com/netnewswire/features/searchEngineSubscriptions.php> on Nov. 13, 2008, pp. 1-2.

"Ranchero Software: NetNewsWire", Internet Article, Retrieved from <http://web.archive.org/web/20051003204517/ranchero.com/netnewswire/> on Nov. 13, 2008,(2005), 5 pages.

"Ranchero Software: What's New in NetNewsWire 2.0", *Web article*, retrieved from <http://web.archive.org/web/20050618014501/http://ranchero.com/netnewswire/whatsnew/netnewswire20.php> on Nov. 13, 2008, pp. 1-3.

"Ranchero Software_Flagged Items", *Internet Article*, Retrieved from <http://web.archive.org/web/20050612083011/http://ranchero.com/netnewswire/features/flaggeditems.php> on Nov. 13, 2008, 1 page.

"Rancho Software_Features Chart", *Internet Article*, Retrieved from <http://web.archive.org/web/20050609010027/http://ranchero.com/netnewswire/featureschart20.php> on Nov. 13, 2008, pp. 1-3.

"Resizing Controls Dynamically", Microsoft Visual Basic 5.0 Programmer's Guide 1997, pp. 578-579.

"Restriction Requirement", U.S. Appl. No. 09/599,806, (Mar. 3, 2003), 5 pages.

"Restriction Requirement", U.S. Appl. No. 10/011,150, (Dec. 15, 2004), 5 pages.

"Restriction Requirement", U.S. Appl. No. 10/402,640, (Aug. 29, 2006), 5 pages.

"Restriction Requirement", U.S. Appl. No. 10/770,240, (Jan. 26, 2009), 7 pages.

"Restriction Requirement", U.S. Appl. No. 10/781,586, (Jun. 26, 2006), 5 pages.

"Restriction Requirement", U.S. Appl. No. 11/012,472, (Jun. 9, 2009), 7 pages.

"Restriction Requirement", U.S. Appl. No. 11/095,254, (Nov. 1, 2007), 8 pages.

"Restriction Requirement", U.S. Appl. No. 11/227,550, (Apr. 2, 2009), 8 pages.

"RSS 2.0 Specification", (Jul. 15, 2003), 8 pages.

"RSS Submissions", *Internet Article*, Retrieved from <http://web.archive.org/web/20050619014308/http://www.rss-specifications.com/rss-submission.htm> on Nov. 13, 2008, pp. 1-3.

"Search Engine Subscriptions", *Internet Article*, Retrieved from <http://web.archive.org/web/20051217013212/http://ranchero.com/netnewswire/helpBook/searchEngineSubs.html> on Nov. 13, 2008, 1 page.

"SearchFeed.png", *Print Screen in article*, Retrieved from <http://web.archive.org/web/20050623095831/http://ranchero.com/images/nnw2/searchFeed.png> on Nov. 13, 2008, 1 page.

"Searching.png", *Print Screen from article*, Retrieved from <http://web.archive.org/web/20050623095422/http://ranchero.com/images/nnw2/searching.png> on Nov. 13, 2008, 1 page.

"smartList.png", *Print Screen from Internet Article*, Retrieved from <http://web.archive.org/web/20050623095628/http://ranchero.com/images/nnw2/smartList.png> on Nov. 13, 2008, 1 page.

"SmartUpdate Developer's Guide", Retrieved from http://developer.netscapte.com:80/docs/manuals/communicator/jarman/index.htm on Dec. 8, 2000, Netscape Communications Corp,(Mar. 11, 1999), 83 pages.

"Stack Algorithm for Extracting Subtree from Serialized Tree", *IBM Technical Disclosure Bulletin*, TDB-ACC-No. NN94033, (Mar. 1, 1994), 2 pages.

"Store and Organize Related Project Files in a Binder", *Getting results with Microsoft Office*, (1990), pp. 109-112.

"Streamlining Content Creation", Ixia Soft Jun. 6, 2002, pp. 1-16.

"Subscribing and Unsubscribing", *Internet Article*, Retrieved from <http://web.archive.org/web/20060915152527/http://ranchero.com/netnewswire/helpBook/subUnsub.html> on Nov. 13, 2008, pp. 1-2.

"Summons to Attend Oral Proceedings", European Patent Application No. 01935325.9, (Sep. 7, 2012), 9 pages.

"Supplemental Notice of Allowance", U.S. Appl. No. 10/395,505, (Aug. 24, 2007), 2 pages.

"Supplemental Notice of Allowance", U.S. Appl. No. 10/781,586, (Jul. 18, 2008), 3 pages.

"Supplemental Notice of Allowance", U.S. Appl. No. 10/781,586, (Jun. 4, 2008), 2 pages.

"Supplemental Notice of Allowance", U.S. Appl. No. 10/955,665, (Feb. 4, 2010), 2 pages.

"Supplemental Notice of Allowance", U.S. Appl. No. 10/955,665, (Nov. 27, 2009), 2 pages.

"Supplemental Notice of Allowance", U.S. Appl. No. 10/955,665, (Mar. 5, 2010), 2 pages.

"Supplemental Notice of Allowance", U.S. Appl. No. 10/955,665, (Dec. 30, 2009), 2 pages.

"Supplemental Notice of Allowance", U.S. Appl. No. 10/976,451, (Apr. 22, 2013), 2 pages.

"Supplemental Notice of Allowance", U.S. Appl. No. 10/990,152, (Apr. 19, 2010), 2 pages.

"Supplemental Notice of Allowance", U.S. Appl. No. 11/036,910, (Jan. 5, 2011), 2 pages.

"Supplemental Notice of Allowance", U.S. Appl. No. 11/044,106, (May 13, 2010), 6 pages.

"Supplemental Notice of Allowance", U.S. Appl. No. 11/044,106, (May 19, 2010), 5 pages.

"Supplemental Notice of Allowance", U.S. Appl. No. 11/072,087, (Apr. 19, 2010), 2 pages.

"Supplemental Notice of Allowance", U.S. Appl. No. 11/107,347, (Jun. 10, 2011), 10 pages.

"Supplemental Notice of Allowance", U.S. Appl. No. 11/218,149, (Apr. 5, 2011), 2 pages.

"Supplemental Notice of Allowance", U.S. Appl. No. 11/218,149, (Jun. 6, 2011), 2 pages.

"Supplemental Notice of Allowance", U.S. Appl. No. 11/931,730, (Mar. 2, 2011), 2 pages.

"Supplemental Notice of Allowance", U.S. Appl. No. 11/931,730, (Apr. 22, 2011), 2 pages.

"Supplemental Notice of Allowance", U.S. Appl. No. 11/931,730, (May 6, 2011), 2 pages.

"Supplemental Notice of Allowance", U.S. Appl. No. 12/021,894, (Jan. 12, 2011), 6 pages.

"Supplemental Notice of Allowance", U.S. Appl. No. 12/021,894, (Feb. 8, 2011), 6 pages.

"Supplemental Notice of Allowance", U.S. Appl. No. 13/161,419, (Feb. 25, 2013), 2 pages.

"Supplemental Notice of Allowance", U.S. Appl. No. 13/161,419, (Mar. 25, 2013), 3 pages.

"Supplementary European Search Report", Application No. 04779161.1, (Jul. 14, 2011), 4 pages.

"Syncing", *Internet Article*, Retrieved from <http://web.archive.org/web/20051217023557/http://ranchero.com/netnewswire/helpBook/syncing.html> on Nov. 13, 2008, 1 page.

"syncing.png", *Print Screen from article*, retrieved from <http://web.archive.org/web/20050623095327/http://ranchero.com/images/nnw2/syncing.png> on Nov. 13, 2008, 2 pages.

"Syndic8.com—Documents1", *Internet Article*, Retrieved from <http://web.archive.org/web/20050513214756/http://www.syndic8.com/documents/howto/> on Nov. 13, 2008, pp. 1-3.

"Syndic8.com—Documents2", *Internet Article*, Retrieved from <http://web.archive.org/web/20050622035505/http://www.syndic8.com/documents/howto/> on Nov. 13, 2008, pp. 1-3.

"Syndic8.com—HowToUse", *Internet Article*, Retrieved from <http://web.archive.org/web/20050619233841/http://www.syndic8.com/howto.php> on Nov. 13, 2008, pp. 1-4.

"Taiwan Search Report", Taiwan Application No. 095103951, (Nov. 8, 2012),1 page.

"TEI: P4 Guidelines", *TEI Consortium*, (Mar. 2002), 199 pages.

"Text Encoding Initiative", *TEI Consortium*, (Mar. 2002), 1 page.

"The Feed Thickens", Retrieved from: <http://blog.flickr.net/en/2004/07/14/the-feed-thickens/>, (Jul. 14, 2004), 2 pages.

"The History of Notes and Domino", *developerWorks Technical Resource Portal*, Retrieved from: <http://www.ibm.com/developerworks/lotus/library/ls-NDHistory/> on Jul. 9, 2010,(Nov. 14, 2007),18 pages.

(56) References Cited

OTHER PUBLICATIONS

U.S. Appl. No. 60/191,662, filed Mar. 23, 2000, 133 pages.
"Whitehill Composer Software product", Retrieved from www.xml.com/pub/p/221 on Apr. 8, 2004, Whitehill Technologies, Inc.,(Apr. 8, 2004), 2 pages.
"XForm 1.0", W3C,(Jul. 16, 2001), 179 pages.
"XML Forms Architecture (XFA)", Retrieved from http://xml.coverpages.org/xfa.html on Aug. 17, 2006, Cover Pages Technology Reports,,(Jun. 16, 1999), p. 1.
"Yahoo! Publisher's Guide to RSS : Submit your RSS Feed", *Internet Article*, Retrieved from <http://web.archive.org/web/20051216153612/http://uk.promotions.yahoo.com/publisher/submit.html> on Nov. 13, 2008, pp. 1-3.
"Yahoo! Search Services and Tools", *Internet Search Screen*, Retrieved from <http://web.archive.org/web/20051001065344/http://search.yahoo.com/mrss/submit> on Nov. 13, 2008, 1 page.
Acklen, Laura et al., "Special Edition, Using Corel WordPerfect 9", Retrieved from: <http://www.netlibrary.com/nlreader/nlreader.dll?bookid=15973&filename=Cover.html> on Nov. 23, 2004, Que Corporation,,(Jun. 1999), 65 pages.
Adams, Susie et al., "BizTalk Unleashed", Sams publishing, 2002, first printing Mar. 2001, pp. 1-2, 31-138.
Alschuler, Liora "A Tour of XMetal", Retrieved from: <http://www.xml.com/pub/a/SeyboldReport/ip031102.html> on Feb. 5, 2003, XML.com, Online! XPOO2230081,(Jul. 14, 1999), 3 pages.
Altova, "Altova Tools for XPath 1.0/2.0", Retrieved from: <http://www.altova.comdev_portal_xpath.html> on Nov. 7, 2007, Altova,(Nov. 7, 2007),12 pages.
Altova, "www.xmlspy.com Spy 4 You User and Reference Manual Version 4.4", available at <http://v44.sw.altova.com/SpyManual44.pdf>,(May 24, 2002), pp. 1-605.
Altova, "XML Spy 4.0 Manual", *1998-2001 Altova Inc. & Altova GmbH*, (Sep. 10, 2001), pp. 1-90, 343-362.
Altova, "XmlSpy 2004 Enterprise Edition Manual", Altova,(May 17, 2004), pp. 1-25, 220-225.
Altova, et al., "User and Reference Manual Version 4.4", www.xmlspy.com, (May 24, 2007), pp. 1-565.
Altova, et al., "XML Spy, XML Integrated Development Environments", Altova Inc.,(2002), pp. 1-18.
Anat, Eyal et al., "Integrated and Customizing Heterogeneous E-Commerce Applications". *The VLDB Journal—The International Journal on Very Large Data Bases*, vol. 10, Issue 1, (Aug. 2001), pp. 16-38.
Anonymous, "The Evolution of RSS", (Online); XP002546010; Internet; Retrieved from the Internet: URL:http://web.archive.org/web/20041011055544/http://www.webreference.com/authoring/languages/xml/rss/1/7.html,(Oct. 11, 2004),1 page.
Asche, Ruediger R., "Multithreading for Rookies", *Microsoft Developer Network Technology Group*, Retrieved Apr. 17, 2002 from http://msdn.microsoft.com/library/en-us/dndllpro/html/msdn_threads.asp?frame=true, (Sep. 24, 1993),13 pages.
Attardi, G et al., "The LOA Customizable Media Aggregator", *Automated Production of Cross Media Content for Multi-Channel Distribution*, 2005. Axmedis 2005. First International Conference on Florence, Italy 30-02 Nov. 2005, Piscataway, NJ, USA, IEEE, Nov. 30, 2005. XP010892440 ISBN: 978-0-7695-2348-4, (Nov. 30, 2005), 9 pages.
Au, Irene et al., "Netscape Communicator's Collapsible Toolbars", *CHI 98, Human Factors in Computing Systems, Conference Proceedings*, LA, CA, (Apr. 18-23, 1998),12 pages.
Ayers, Danny et al., "Beginning RSS and Atom Programming", Wiley Publishing, Inc.,(2005), pp. 1-54.
Baldwin, J F., et al., "A Mass Assignment Based ID3 Algorithm for Decision Tree Introduction", *International Journal of Intelligent Systems*, vol. 12, No. 7, (1997), pp. 523-548.
Barker, et al., "Creating In-Line Objects Within an Integrated Editing Environment", IBM Technical Disclosure Bulletin, vol. 27, No. 5,(Oct. 1984), p. 2962.
Battle, Steven A., et al., "Flexible Information Presentation with XML", *The Institution of Electrical Engineers*, (1998), 6 pages.

Beauchemin, Dave "Using InfoPath to Create Smart Forms", Retrieved from: <http:/www.microsoft.com/office/infopath/prodinfo/using.mspx> on Jan. 21, 2007, (Mar. 27, 2003), 6 pages.
Begun, Andrew et al., "Support and Troubleshooting for XML Schemas in InfoPath 2003", Retrieved from: <http://msdn2.microsoft.com/en-us/library/aa168241(office.11,d=printer).aspx> on Feb. 24, 2009, Microsoft Office InfoPath 2003 Technical Articles,(Aug. 2004),12 pages.
Ben-Natan, Ron et al., "Internet Platform for Creating and Supporting Communities", U.S. Appl. No. 60/203,081, filed May 9, 2000, 31 pages.
Benzinger, Brian "Google Reader Reviewed", Retrieved from: <http://www.solutionwatch.com/250/google-reader-reviewed> on Jun. 17, 2009, (Oct. 7, 2005),5 pages.
Berg, A "Naming and Binding: Monikers", *Inside OLE*, Chapter 9, Harmony Books, (1995), pp. 431-490.
Blair, Eric "Review: NetNewsWire 2.0", Retrieved from: <http://www.atpm.com/11.06/netnewswire.shtml> on Nov. 11, 2008, (Jun. 2, 2005),12 pages.
Borland, Russell "Running Microsoft Word 97", *Microsoft Press*, (Jan. 1997), pp. 314-315, 338, 361-362, 390, and 714-719.
Brabrand, Claus et al., "Power Forms: Declaritive Client-Side Form Field Validation", *World Wide Web Journal*, vol. 3, No. 4, Available at <www.brics.dk/~brabrand/powerforms.pdf >,(2000), pp. 1-20.
Brabrand, Claus et al., "PowerForms: Declaritive Client-Side Form Field Validation", *BRICS, Department of Computer Science*, University of Aarus, Denmark, World Wide Web, vol. 3, No. 4,(2000), pp. 205-214.
Bradley, Neil "The XML Companion, Third Edition", Retrieved from: <http://proquest.safaribooksonline.com0201770598> on Jan. 19, 2008, Published by Addison Wesley Professional,(Dec. 12, 2001), pp. 1-18.
Bray, Tim et al., "Extensible Markup Language (XML) 1.0", *W3C Recommendation*, Available at <http://www.textuality.com/sgml-erb/WD-xml.html>,(Feb. 10, 1998), 37 Pages.
Brogden, William "Arbortext Adept 8 Editor Review", Retrieved from: <www.xml.com/pub/a/1999/09/adept/AdeptRvw.htm> on Feb. 5, 2003, O'Reilly xml.com, Online!,(Sep. 22, 1999), 4 pages.
Burch, Barbara "Notes R5 Technical Overview", Retrieved from: <http://www.ibm.com/developerworks/lotus/library/1s-Notes_R5_Technical_Overview> on Aug. 13, 2010, (Apr. 1, 1999),14 pages.
Chan, Chee-Yong et al., "Efficient Filtering of XML Documents with XPath Expressions", The VLDB Journal (2002) 11,(Jun. 1, 2002), pp. 354-379.
Chen, Ya B., et al., "Designing Valid XML Views", S. Spaccapietra, S.T. March, and Y. Kambayashi (Eds.): ER 2002, *LNCS 2503*, Copyright: Springer-Verlag Berlin Heidelberg 2002, pp. 463-477.
Chen, Ya Bing et al., "Designing Valid XML Views", *Proceedings of the 21st International Conference on Conceptual Modeling, Lecture Notes in Computer Science*; vol. 2503, Available at http://citeseerx.ist.psu.edu/viewdoc/download;jsessionid=35490F03A4996C3741777B50D90D8EDF?doi=10.1.1.66.1006&rep=rep1&type=pdf>,(2002), pp. 1-16.
Chen, Yi et al., "XK Validator: A Constraint Validator for XML", *CIKM 02*, ACM1-58113-492-04-02-011, (Nov. 4-Sep. 2002), pp. 446-452.
Chen, Yi et al., "XKvalidator: A Constraint Validator for XML", *CIKM '02*, Nov. 4-9, 2002, McLean, VA, USA, Copyright 2002, ACM, ISBN 1-58113-492-4/02/011,(Nov. 4-Sep. 2002), pp. 446-452.
Chien, et al., "Efficient Management of Multiversion Documents by Object Referencing", Proceedings of the 27th VLDB Conference,(2001), pp. 291-300.
Chien, Shu-Yao et al., "Efficient Schemes for Managing Multiversion XML Documents", *The VLDB Journal 2002*, (Dec. 19, 2002), pp. 332-353.
Chien, Shu-Yao et al., "Storing and Querying Multiversion XML Documents using Durable Node Numbers", IEEE,(2002), pp. 232-241.
Chien, Shu-Yoa et al., "Efficient Schemes for Managing Multiversion XML Documents", VLDB Journal,(2002), pp. 332-353.

(56) References Cited

OTHER PUBLICATIONS

Chien, Shu-Yoa et al., "XML Document Versioning", SIGMOD Record, vol. 30, No. 3,,(Sep. 2001), pp. 46-53.
Chuang, Tyng-Ruey "Generic Validation of Structural Content with Parametric Modules", *ICFP 2001 International Conference on Functional Programming*, vol. 36, No. 10, Available at <http://citeseerx.ist.psu.edu/viewdoc/download?doi=10.1.1.7.6412&rep=rep1&type=pdf>,(Sep. 3, 2001),12 pages.
Ciancarini, Paolo A., et al., "Managing Complex Documents Over the WWW: A Case Study for XML", *Transactions on Knowledge and Data Engineering*, vol. 11, No. 4, Available at <http://citeseerx.ist.psu.edu/viewdoc/download?doi=10.1.1.18.1679&rep=rep1&type=pdf>,(Jul. 1999), pp. 629-638.
Clapp, D "The NeXT Application Kit Part 1: Non-Responsive Classes", *The NeXT Bible* Chapter 16, (1990), pp. 275-293.
Clark, James "XSL Transformation (XSLT), Version 1.0", Retrieved from: <www.w3.org/TR/1999/REC-xslt19991116> on Oct. 26, 2009, WC3,(Nov. 16, 1999), 57 pages.
Clark, James et al., "XML Path Language (XPath)", Retrieved from: <www.w3.org/TR/1999/RCE-xpath-19991116> on Oct. 26, 2009, Version 1.0,(Nov. 16, 1999), 32 pages.
Clark, Peter "From Small Beginnings", *Knowledge Management*, (Nov. 2001), pp. 28-30.
Cloete, I et al., "CID3: An Extension of ID3 for Attributes with Ordered Domains", *South African Computer Journal*, vol. 4, (1991), pp. 10-16.
Cover. Robin "XML Forms Architecture (XFA)", *Cover Pages*. Retrieved from "http://xml.coverpages.org/xfa.html" on Aug. 17, 2006, (Apr. 19, 2000), 4 pages.
Davidow, Ari "XML Editors: Allegations of Functionality in Search of Reality", Retrieved from: <http://www.ivritype.com/xml/> on Feb. 9, 2009, SP002230082,(Oct. 12, 1999), 16 pages.
Dayton, Linnea et al., "Photo Shop 5/5.5 WOW! Book", *2000, Peachpit Press*, (2000), pp. 8-17.
Dilascia, Paul et al., "Sweeper", *Microsoft interactive developer*, vol. 1., No. 1, (1996), 28 pages.
Dodds, Leigh "Toward an XPath API", Retrieved from: <http://www.xml.com/lpt/a/742> on Nov. 7, 2007, (Mar. 7, 2001), 3 pages.
Dorward, Sean et al., "Unix Variants", *Unix Review*, vol. 10, No. 4, (Apr. 1992), pp. 29-31.
Dubinko, et al., "XForms 1.0", Retrieved from: http://www.w3.org/TR/2001/WD-xforms-20011207 (One big file, diff-marked HTML, Zip archive) on May. 22, 2007, Section 1-12.2.3 & Appendices A-G,(Dec. 7, 2001), 64 pages.
Dubinko, et al., "XForms 1.0", *W3C Recommendation*, Retrieved from: <www.w3.org.TR/2003/REC-xforms-20031014/> on Feb. 29, 2012,(Oct. 14, 2003), 35 pages.
Dubinko, Micah "XForms and Microsoft InfoPath", Retrieved from: <http://www.xml.com/lpt/a/1311> on Feb. 24, 2009, (Oct. 29, 2003), 6 pages.
Dubinko, Micah et al., "XForms 1.0 W3C Working Draft", Retrieved from: <http://www.w3.org/TR/2001/WD-xforms-20011207/index-all.html> on Nov. 19, 2009, W3C,(Dec. 7, 2001), 88 pages.
Duce, et al., "Web 2D Graphics File Formats", *Google 2003*, (2003), pp. 43-65.
Ducharme, "InfoPath and XForms", *InfoWorld*, Available at <http://www.weblog.infoworld.com/udell2003/02/26.html>,(Feb. 26, 2003), pp. 1-3.
Ducharme, Bob et al., "InfoPath and XForms", Retrieved from: http://jonudell.net/udell/2003-02-26-infopath-and-xforms.html (Mar. 4, 2010), (Feb. 26, 2003), 2 pages.
Dyck, Timothy "XML Spy Tops as XML Editor", *eWeek*, vol. 19, No. 47,, (Nov. 25, 2002), 3 pages.
Esposito, Dino "Cutting Edgo No. 8", *Microsoft Internet Developer*, (Jan. 18, 2000), 13 pages.
Fukuhara, Yasuji "Clarisworks, Introduction to Business Document Construction, No. 4, Estimate", *NIKKEI MAC*, No. 14; Japan, (May 17, 1994),18 pages.
Gill, Kathy E., "Blogging, RSS and the Information Landscape: A Look at Online News", *In Proceedings of WWW 2005*, (2005), 7 pages.
Grosso, Paul et al., "XML Fragment Interchange", Retrieved from: <http://www.w3.org/TR/xml-fragment> on Sep. 14, 2007, W3C,(Feb. 2001), 28 pages.
Halberg, et al., "Using Microsoft Excel 97", Que Corporation,,(1997), pp. 1-9, 18-25, 85-89, 98-101, 106-113, 124-127, 144-147, 190-201, 209-210, 213-227, 581-590, 632-633, 650-655, 712-714.
Hall, Richard S., "Agent-based Software Configuration and Development", *Thesis of the University of Colorado*, Available at <http://www.doc.ic.ac.uk/~alw/edu/theses/hall-phd-0599.pdf>,(May 1, 1999), 182 pages.
Hall, Richard S., "Evaluating Software Deployment Languages and Schema", In Proceedings of International Conference on Software Maintenance,(Nov. 1998), 9 pages.
Hall, Richard S., et al., "Specifying the Deployable Software Description Format in XML", *CU-SERL-207-99*, Software Engineering Research Laboratory, University of Colorado at Boulder,(Mar. 31, 1999),17 pages.
Hammersley, Ben "Content Syndication with RSS", *Chapter 9: Using Feeds; Chapter 10: Directories, Web Aggregators, and Desktop Readers*, O'Reilly books,(Mar. 2003), 24 pages.
Hammersley, Ben "Developing Feeds with RSS and Atom", *O'Reilly books*, O'Reilly Media, Inc.,(Apr. 2005),10 pages.
Han, Richard et al., "Websplitter: A Unified XML Framework for Multi-Device Collaborative Web Browsing", *ACM Conference on Computer Supported Cooperative Work*, (2000),10 pages.
Hardy, Matthew R., et al., "Mapping and Displaying Structural Transformations Between XML and PDF", *Proceedings of the 2002 ACM symposium on Document engineering*, Electronic Publishing Research Group, School of Computer Science & IT, University of Nottingham, UK(Nov. 2002), pp. 95-102.
Haukeland, Jan-Henrick "Tsbiff-tildeslash biff—Version 1.2.1", http://web.archive.org/web/19990912001527/http://www.tildeslash.com/tsbiff/., (Jun. 1999), 2 pages.
Herzberg, Amir et al., "Protecting (even) Naive Web Users, or: Preventing Spoofing and Establishing Credentials of Web Sites", *Bar Ilan University*, Available at <www.cs.bu.ac.il/~herzea/papers/ecommerce/trusted credentials area.pdf>,(Jul. 18, 2004), 26 pages.
Herzner, Wolfgang et al., "CDAM—Compound Document Access and Management. An Object-Oriented Approach", *ACM SIGOIS Bulletin*, vol. 12, Issue 1, Multimedia Systems Interaction and Applications, Chapter 3,,(Jul. 1991),18 pages.
Hoffman, Michael "Architecture of Microsoft Office InfoPath 2003", Retrieved from: <http://msdn2.microsoft.com/en-us/library/aa219024(office.11,d=printer).aspx> on Jan. 21, 2007, Microsoft Office InfoPath 2003 Technical Articles,(Jun. 2003),18 pages.
Honkala, Mikko et al., "Multimodal Interaction with XForms", *ICWE '06*, (Nov. 14, 2006), pp. 201-208.
Howlett, Scott et al., "A New Function for SQL Server 2000", *MSDN Magazine*, No. 1, (Mar. 2000), 9 pages.
Hu, Zhenjiang et al., "A Programmable Editor for Developing Structured Documents based on Bidirectional Transformations", *PEPM '04*, (Aug. 2004),pp. 178-189.
Huier, Zhang et al., "Design and Implementation of RSS-based Science and Technology Information Syndication System", *Library of Chinese Academy of Sciences*, (Jul. 2005), pp. 1-15.
Hwang, Kai et al., "Micro-Firewalls for Dynamic Network Security with Distributed Intrusion Detection", *IEEE International Symposium on Network Computing and Applications 2001*, (2001), pp. 68-79.
Idle, et al., "Outline of the International Standard Linquistic Annotation Framework", *Proceedings of the ACL 2003 workshop on Linguistic Annotation*, (Jul. 2003), 5 pages.
Iwantani, Kaori et al., "Perfect Manual of Clarisworks 4.0 for Macintosh", *1st Edition*, Japan, (Jul. 22, 1997), 33 pages.
Kaiya, Haruniko et al., "Specifying Runtime Environments and Functionalities of Downloadable Components under the Sandbox Model", *International Symposium on Principles of Software Evolution 2000*, (2000), pp. 138-142.

(56) References Cited

OTHER PUBLICATIONS

Kanemoto, Hirotaka et al., "An Efficiently Updatable Index Scheme for Structured Documents", *DEXA '98*, (1998), pp. 991-996.

Kath, Randy "Managing Virtual Memory in Win32", *Microsoft Developer Network Technology Group*, Retrieved Apr. 17, 2002 from http://msdn.microsoft.comilibrary/en-us/dngenlib/html/msdn_virtmm.asp?frame=true, (Jan. 20, 1993), 9 pages.

Kay, Michael "XSL Transformations (XSLT) Version 2.0", *W3C Working Draft*, Available at <http://www.w3.org/TR/2005/WD-xslt20-20050404>,(Apr. 2005), 357 pages.

Kim, Sang-Kyun et al., "Immediate and Partial Validation Mechanism for the Conflict Resolution of Update Operations in XML Databases", *WAIM 2002, LNCS 2419, 2002, Springer-Verlag Berlin Heidelberg*, (2002), pp. 387-396.

Klarlund, Nils et al., "DSD: A Schema Language for XML", *ACM, FSMP Portland Oregon*, (2000), pp. 101-111.

Kobayashi, M. et al., "An Update on BTRON—specification OS Development", *Proceedings of the 8thTRON Project Symposium*, 1991, 0-8186-2475-2/91,(1991), pp. 132-140.

Komatsu, Naohisa et al., "A Proposal on Digital Watermark in Document Image Communication and its Application to Realizing a Signature", *Electronics and Communication in Japan, Part I: Communications*, vol. 73, No. 5, (May 1990), pp. 22-33.

Kutay, Ali et al., "Methods and Systems for Accessing, Organizing, Presenting and Viewing Data", U.S. Appl. No. 60/209,713, Kutay et al., filed Jun. 5, 2000, 345 pages.

Leblond, et al., "PC Magazine Guide to Quattro Pro for Windows", Ziff-Davis Press,(1993), pp. 9-11, 42-61.

Lehtonen, Miro et al., "A Dynamic User Interface for Document Assembly", *DocEng '02*, Department of Computer Science, University of Helsinki,(Nov. 2002),pp. 134-141.

Mansfield, Ron "Excel 97 for Busy People", Osborne/McGraw-Hill,,(Jan. 27, 1997), pp. 48-50.

Matsushita, Noriko "Step-up Training of Clarisworks (Tabulation), Successful Use of Spreadsheet and Tabulation", *Mac People*, vol. 4, No. 19, (Oct. 1, 1998), 5 pages.

McCright, John S., "New Tool Kit to Link Groove with Microsoft SharePoint", Retrieved from: <http://www.eweek.com/c/a/Enterprise-Applications/New-Tool-Kit-to-Link-Groove-With-Microsoft-SharePoint/> on Dec. 28, 2009, (Jul. 29, 2002), 3 pages.

Mehta, Manish et al., "SLIQ: A Fast Scalable Classifier for Data Mining", available at <<http://www.dbis.informatik.hu-berlin.de/dbisold/lehre/WS0405/KDD/paper/MAR96.pdf>>, (Mar. 1996),15 pages.

Mengel, A et al., "MATE Dialogue Annotation Guidelines", http://www.ims.uni-stuttgart.de/projekte/mate/mdag, (Jan. 8, 2000),64 pages.

Moats, R. "A URN Namespace for IETF Documents", *RFC 2648*, (Aug. 1999), pp. 1-30.

Moats, R. "URN Syntax", *RFC 2141*, (May 1997), pp. 1-8.

Musgrave, S "Networking Technology—Impact and Opportunities", *Survey and Statistical Computing 1996, Proceedings of the Second ASC International Conference*, London, UK,, (Sep. 1996), pp. 369-378.

Nelson, Joe "Client-side Form Validation Using JavaScript", *Developer Advisory*, (Sep. 21, 2001), pp. 1-9.

Nelson, Mark "Validation with MSXML and XML Schema", *Windows Developer Magazine*, (Jan. 1, 2002), 5 pages.

Noore, Afzel "A Secure Conditional Access System using Digital Signature and Encryption", *International Conference on Consumer Electronics*, (Jun. 2003), pp. 220-221.

Pacheco, Xavier et al., "Delphi 5 Developer's Guide", *Chapter 31, Section: Data Streaming*, Sams Publishing.,(1999), 4 pages.

Pike, Rob et al., "Plan 9 From Bell Labs", AT&T Bell Laboratories, UKUUG, Summer 1990, 10 pages.

Pike, Rob et al., "The Use of Name Spaces in Plan 9", *Operating Systems Review*, vol. 27, No. 2, (Apr. 1993), pp. 72-76.

Prevelakis, Vassilis et al., "Sandboxing Applications", *FREENIX Track: 2001 Usenix Annual Technical Conference*, (2001), pp. 119-126.

Prosise, Jeff "Programming Microsoft Net", retrieved from: <http://academic.safaribooksonline.com/print?xmlid=0-7356-1376-1/IDAVO3T> on Mar. 3, 2011, Microsoft Press,(May 15, 2002), 24 pages.

Rado, Dave "How to create a template that makes it easy for users to 'fill in the blanks' without doing any programming,", Retrieved from http://world.mvps.org/FAQS/Customization/FillInTheBlanks.htm, (Apr. 2004),pp. 1-2.

Raggett, "HTML Tables", Retrieved from: <http:www.//is-edu.homuns.edu.vn/WebLib/books/Web/Tel/html3-tables.html> on Aug. 6, 2006, W3C Internet Draft,(Jul. 7, 1995), pp. 1-12.

Rapaport, Lowell "Get More From SharePoint", *Transform Magazine*, vol. 11, No. 3, (Mar. 2002), 2 pages.

Reagan, Moore W., et al., "Collection-Based Persistent Digital Archives", U.S. Appl. No. 60/191,662, filed Mar. 23, 2000, 133 pages.

Rees, Michael J., "Evolving the Browser Towards a Standard User Interface Architecture", *Third Australian User Interfaces Conference (AUIC2002)*, School of Information Technology, Bond University, Australia,(2001), pp. 1-7.

Reilly, Douglas J., "Programming Microsoft Web Forms", retrieved from: <http://academic.safaribooksonline.com/print?xmlid=0735621799/systemdotwebdotuidotweb> on Mar. 3, 2011, Microsoft Press,(Nov. 2, 2005), 52 pages.

Rogge, Boris et al., "Validating MPEG-21 Encapsulated Functional Metadata", *IEEE 2002*, ISBN 0-7803-7304-9/02,(2002), pp. 209-212.

Sato, T. et al., "XFIG Version 3.2 Patchlevel 2 Users Manual Edition 1.0", Available at http://tinf2.vub.ac.be/~dvermeir/manuals/xfig/lib/X11/xfig/html/index.html, (Jul. 2, 1998), 37 pages.

Schmalstieg, Dieter et al., "Using Transparent Props for Interaction with the Virtual Table", *Proceedings of the 1999 symposium on Interactive 3D graphics.*, available at <http://citeseerx.ist.psu.edu/viewdoc/summary?doi=10.1.1.35.8236>,(Apr. 26, 1999),8 pages.

Schmid, Mathew et al., "Protecting Data from Malicious Software", *18th Annual Security Applications Conference*, (2002), pp. 199-208.

Sebastiani, F "A Tutorial on Automated Text Categorisation", In Analia Amandi and Ricardo Zunino, editors, *Proceedings of ASAI-99, 1st Argentinean Symposium on Artificial Intellligence*, Buenos Aires, AR, (1999), pp. 7-35.

Senda, Akihiro "Word 2000, Conservative-Looking but 'Attentive' New Function", *NIKKEI PC 21*, vol. 4, No. 8; Japan, (Aug. 1, 1999), 4 pages.

Singh, Darshan "Microsoft InfoPath 2003 by Example", Retrieved from: <http://www.perfectxml.com/InfoPath.asp> on Jan. 21, 2007, (Apr. 20, 2003), 19 pages.

Sollins, et al., "Functional Requirements for Uniform Resource Names", *RFC 1737*, (Dec. 1994), pp. 1-7.

Staneck, W "Internal and External Media", *Electronic Publishing Unleashed*, Chapter 22,(1995), pp. 510-542.

StylusStudio, "StylusStudio: XPath Tools", 2004-2007, StylusStudio,(Nov. 7, 2007), 8 pages.

Sun, Qibin et al., "A Robust and Secure Media Signature Scheme for JPEG Images", *Proceedings of 2002 IEEE Workshop on Multimedia Processing*, (Dec. 2002), pp. 296-299.

Sutanthavibul, Supoj et al., "XFIG Version 3.2. Patchlevel 2 (Jul. 2, 1998) Users Manual (Edition 1.0)", Retrieved from: <www.ice.mtu.edu/online_docs/sfig332/> on Jan. 28, 2003, Internet Document XP002229137,(Jul. 2, 1998), 60 pages.

Tomimori, Hiroyuki et al., "An Efficient and Flexible Access Control Framework for Java Programs in Mobile Terminals", Proceeding of 22nd Int'l Conference on Distributed Computing Systems Workshops,(2002), pp. 777-782.

Trupin, J "The Visual Programmer", Microsoft Systems Journal,(Apr. 1996),pp. 103-105.

Usdin, Tommie et al., "XML: Not a Silver Bullet, but a Great Pipe Wrench", *Standard View* vol. 6, No. 3, (Sep. 2, 1998), pp. 125-132.

Van Hoff, Arthur et al., "The Open Software Description Format", Retrieved from: <www.w3.org/TR/NOTE-OSD> on May 18, 2009, (Aug. 13, 1997),10 pages.

(56) References Cited

OTHER PUBLICATIONS

Varlamis, Iraklis et al., "Bridging XML-Schema and relational database. A System for generating and manipulating relational databases using valid XML documents", DocEng 01, ACM 1-58113-432-0/01/0011,(Nov. 9, 2001), pp. 105-114.
Vasters, Clemens F., "BizTalk Server 2000 A Beginner's Guide", Osborne/McGraw-Hill,(2001), pp. 1-2, pp. 359-402.
VeriSign Inc., "Licensing VeriSign Certificates: Securing Multiple Web Server and Domain Configurations", *White Paper*, Available at <www.msctrustgate.com/pdf/licensing.pdf>,(Nov. 2, 2001),15 pages.
Villard, et al., "An Incremental XSLT Transformation Processor for XML Document Manipulation", http://www2002.org/CDROM/refereed/321, Printed on May 18, 2007,(May 2002), 25 pages.
W3C, "XForms 1.0", retrieved from <file:///HI/NPL/W3C XForms1_0—Working Draft 20010216.thm> on Apr. 5, 2011,(Feb. 16, 2001), 4 pages.
Watt, Andrew "Microsoft Office Infopath 2003 Kick Start", Retrieved from: <http://proquuest.safaribooksonline.com/067232623X> on Mar. 12, 2008, Published by Sams, Print ISBN-10:0-672-32623-X,(Mar. 24, 2004), 57 pages.
Webopedia, "Definition of Network", Retrieved from: <http://www.webopedia.com/TERM/n/network.html>, (Sep. 1, 1996), 2 pages.
Webopedia, "Definition of OLE", Retrieved from: <http://www.webopedia.com/TERM/O/OLE.html>, (May 16, 1998), 3 pages.
Webopedia, "Definition of OpenDoc", Retrieved from: <http://www.webopedia.com/TERM/O/OpenDoc.html>, (Sep. 18, 1997), 3 pages.
Williams, Sara et al., "The Component Object Model: A Technical Overview", Microsoft Corp,(Oct. 1994), pp. 1-14.
Wong, Raymond K., et al., "Managing and Querying Multi-Version XML Data with Update Logging", *DocEng '02*, (Nov. 8-Sep. 2002), 8 pages.
Zaki, Mohammed J., et al., "Parallel Classification for Data Mining on Shared-Memory Multiprocessors", *ACM*, (Mar. 1999), pp. 1-8.
Zdonik, S "Object Management Systems Concepts", ACM,(1984),pp. 13-19.
Zdonik, Stanley B., "Object Management System Concepts", *Supporting Integrated Office Workstation Applications, Doctoral Thesis*, Massachusetts Institute of Technology, (1983), 262 pages.
"Advisory Action", U.S. Appl. No. 12/061,613, May 20, 2014, 3 pages.
"Advisory Action", U.S. Appl. No. 12/061,613, Jul. 23, 2014, 3 pages.
"AppleWorks", Retrieved from: <http://en.wikipedia.org/wiki/AppleWorks> on Jul. 4, 2014, Jul. 3, 2014, 6 pages.
"European Search Report", EP Application No. 12152133.0, Jul. 14, 2014, 10 pages.
"Foreign Office Action", BR Application No. PI0111797-1, May 5, 2014, 4 Pages.
"Non-Final Office Action", U.S. Appl. No. 13/159,239, Apr. 25, 2014, 38 pages.
"Non-Final Office Action", U.S. Appl. No. 13/207,125, Jun. 6, 2014, 17 Pages.
Simpson, "WordPerfect 6 for Windows Instant Reference", SYBEX, Alameda, CA, US, ISBN: 978-0-78-211383-9, Jan. 1994, 14 pages.
"Foreign Notice of Allowance", CA Application No. 2,800,037, Aug. 25, 2014, 1 Page.
"Foreign Office Action", CN Application No. 201110365026.2, Jun. 5, 2014, 18 Pages.
"Foreign Office Action", EP Application No. 01939368.5, Jul. 16, 2014, 9 Pages.
"Notice of Allowance", U.S. Appl. No. 12/028,651, Jul. 24, 2014, 7 Pages.
"Notice of Allowance", U.S. Appl. No. 12/061,613, Aug. 7, 2014, 11 pages.
"Foreign Office Action", European Application No. 06101267.0, (Apr. 24, 2013),7 pages.
"Non-Final Office Action", U.S. Appl. No. 12/061,613, (Jun. 17, 2013),15 pages.
"Non-Final Office Action", U.S. Appl. No. 13/159,239, (May 23, 2013), 34 pages.
"Supplemental Notice of Allowance", U.S. Appl. No. 10/976,451, (May 22, 2013), 2 pages.
"Supplemental Notice of Allowance", U.S. Appl. No. 10/976,451, (Jun. 18, 2013), 2 pages.
"Final Office Action", U.S. Appl. No. 12/694,836, (Sep. 16, 2013), 35 pages.
"Foreign Office Action", Canadian Office Action 2,800,037, (Sep. 30, 2013), 2 Pages.
"Non-Final Office Action", U.S. Appl. No. 13/915,364, (Sep. 17, 2013),19 pages.
"Foreign Office Action", EP Application No. 06111546.5, Jul. 13, 2015, 6 pages.
"Non-Final Office Action", U.S. Appl. No. 13/915,364, Jul. 29, 2015, 28 pages.
"Non-Final Office Action", U.S. Appl. No. 13/915,399, Jun. 19, 2015, 13 pages.
"Notice of Allowance", U.S. Appl. No. 13/051,741, Aug. 28, 2015, 13 pages.
"Notice of Allowance", U.S. Appl. No. 13/159,239, Jul. 29, 2015, 7 pages.
"Notice of Allowance", U.S. Appl. No. 14/530,237, Sep. 14, 2015, 5 pages.
"Final Office Action", U.S. Appl. No. 13/915,399, Oct. 7, 2015, 23 pages.
"Final Office Action", U.S. Appl. No. 13/915,364, Oct. 27, 2015, 30 pages.

CORRELATION, ASSOCIATION, OR CORRESPONDENCE OF ELECTRONIC FORMS

RELATED APPLICATIONS

This application is a divisional of and claims priority to U.S. patent application Ser. No. 13/161,419 filed Jun. 15, 2011, which is a divisional of and claims priority to U.S. patent application Ser. No. 11/931,730 filed Oct. 31, 2007, which is a continuation of and claims priority to U.S. patent application Ser. No. 10/636,475, filed on Aug. 6, 2003, the disclosures of which are incorporated by reference herein.

BACKGROUND

Extensible markup language (XML) is increasingly becoming the preferred format for transferring data. XML is a tag-based hierarchical language that is extremely rich in terms of the data that it can be used to represent. For example, XML can be used to represent data spanning the spectrum from semi-structured data (such as one would find in a word-processing document) to generally structured data (such as that which is contained in a table). XML is well-suited for many types of communication including business-to-business and client-to-server communication.

Data represented in XML is often created and retained in electronic documents, such as electronic forms. An electronic form that is written in XML typically is governed by an XML schema (XSD) and can be altered by applying an eXtensible Style-sheet Language Transformation (XSLT) file on the form. For more information on XML, XSLT, and XSD (schemas), the reader is referred to the following documents which are the work of, and available from the W3C (World Wide Web consortium): XML Schema Part 2: Datatypes; XML Schema Part 1: Structures; and XSL Transformations (XSLT) Version 1.0; and XML 1.0 Second Edition Specification.

With so much information being described and transferred through XML, it is increasingly important to have ways to aggregate, or import information from one XML document into another. A manager, for instance, may want to study how his or her salespeople are performing. The manager can study dozens of XML documents, such as purchase orders filled out by the salespeople, and manually order, categorize, and add up the totals to determine how each salesperson is performing. With aggregation, however, the manager can have pertinent data from all of the purchase orders imported into one, summary document. This summary document can be organized to show how much each salesperson sold, when it was sold, and so on. Thus, aggregation can allow people to more easily and efficiently analyze and organize information.

Aggregation, however, can be very difficult to perform. To properly aggregate forms, a programmer commonly needs a thorough understanding of each of the electronic form's schemas. Even with this understanding, the programmer often contends with resulting, aggregated forms that are not valid according to their schemas. These and other complexities typically require a programmer with a high degree of skill to spend a significant amount of time to aggregate data from one electronic form into another.

For these reasons, aggregating XML documents, though useful, can be difficult, time consuming, and require a high degree of skill.

SUMMARY

Determining correspondence, association, and/or correlation between nodes of electronic forms based on schemas of those forms is described. Importing, merging, and/or annotating data from one electronic form into another electronic form based on correspondence, association, and/or correlation between nodes is also described.

BRIEF DESCRIPTION OF THE DRAWINGS

The same numbers are used throughout the disclosure and figures to reference like components and features.

DETAILED DESCRIPTION

Figure 1:
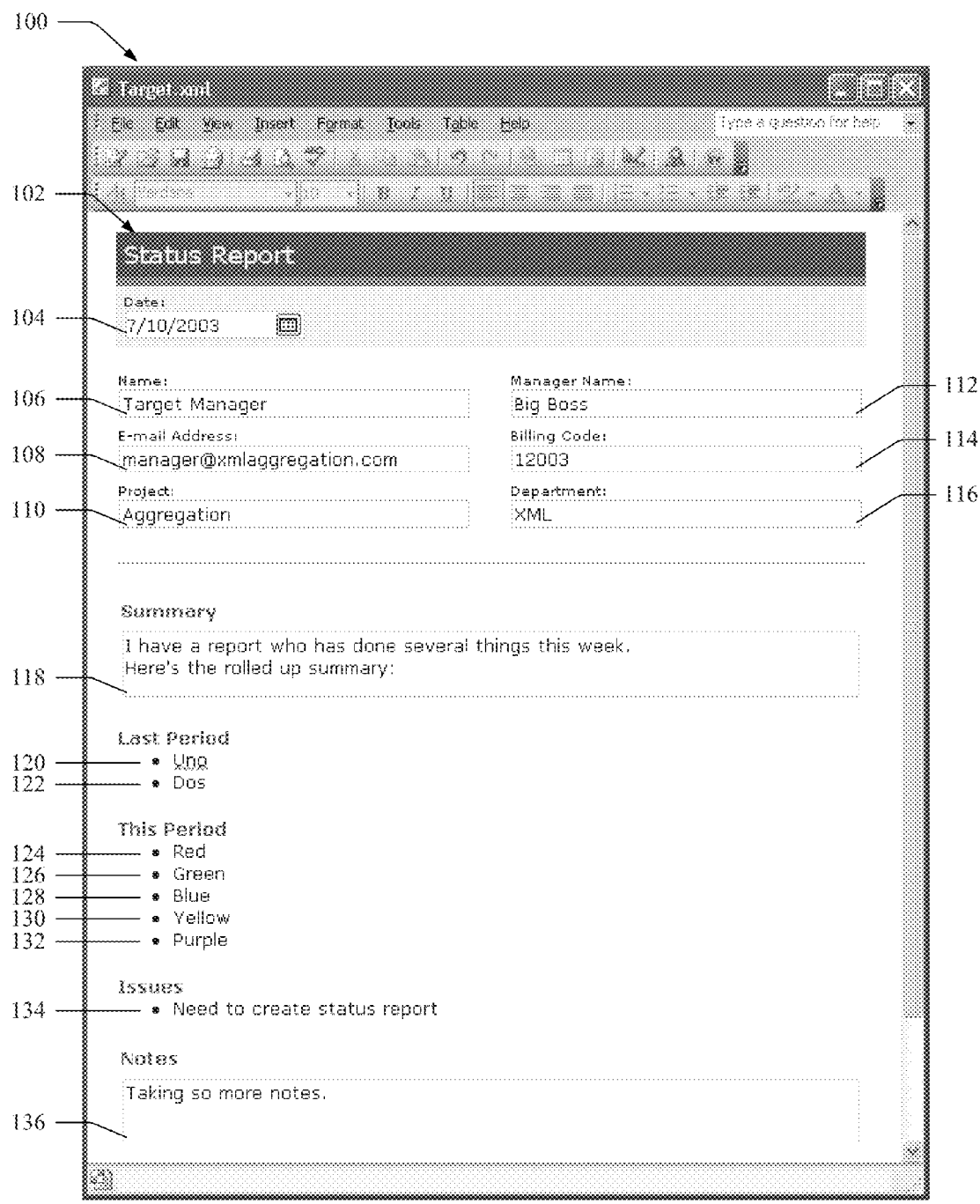
FIG. 1 illustrates a screen shot showing an exemplary target electronic form into which a user can select to have data imported from another electronic form.

The following disclosure describes an easy and simple way for a user to import data from one electronic form into another electronic form. For sufficiently similar electronic forms, a user can import data from one or many forms (called "sources") into another electronic form (called the "target") without needing special skills, such as that of programming transformation files. The system and method enables a user to import data from a source electronic form into a similar target electronic form simply by selecting the source and the target. By so doing, a user can combine data from many forms into one form, or simply import data from one form into another form. This allows the user to see data from one or many source forms in a target form without having to key-in data from the source forms into the target form. It also allows the user to aggregate the data into a target form that combines, alters, adjusts, or otherwise makes analysis and presentation of data simple and easy. As used herein, data can include numbers, text, rich text, dates/times, code (such as a portion of an electronic form written in XML), information (such as numbers and text) within code, a node or nodes of a hierarchical electronic form or information within those nodes, and the like.

For dissimilar source and target electronic forms, the following disclosure describes a way for a user to easily and simply import data from a source form into a target form. For these dissimilar source and target electronic forms, the system and method can annotate the source form to aid an import engine in importing data from the source into the target. This annotation can be performed by applying a transformation file on the source to annotate it. The transformation file can be re-used on similar sources for aggregation with a similar target, thereby reducing the time and effort spent by a designer in creating transformation files.

In at least these two ways, the disclosed system and method enables a user to easily import data from one electronic form into another. In cases where the source electronic form and the target electronic form are similar, an importation engine can import the data without annotating the source form by applying a transformation file. In cases where the source electronic form and the target electronic form are dissimilar, the importation engine can import the data with aid provided by applying a transformation file.

Example Showing Data Aggregation

FIGS. 1 through 5 show, from a user's perspective, a user importing data from a source electronic form into a target electronic form. These exemplary screen shots show an example of what a user can see when importing data.

The target and source electronic forms shown in these figures are governed by substantially similar schemas. For this reason, an import engine (described further below) does not, in this example, annotate or otherwise use a transformation file to aid in importing data from the source electronic form to the target electronic form.

FIG. 1 sets forth an exemplary screen shot 100 showing an example of a target electronic form, here a manager's status report 102. This manager's report 102 contains data-entry fields, which in this example contain data. The manager's report 102 includes the following data-entry fields: a date field 104; a manager's name field 106 (containing the name of the manager, "Target Manager"); a manager's email address field 108; a project field 110; a manager's boss's name field 112; a billing code field 114; a department field 116; a summary field 118; last period fields (an uno field 120 and a dos field 122); this period fields (a red field 124, a green field 126, a blue field 128, a yellow field 130, and a purple field 132); an issues field 134; and a notes field 136.

With this manager's report 102 selected, the user can then select a source electronic form to aggregate into the manager's report 102.

Figure 2:
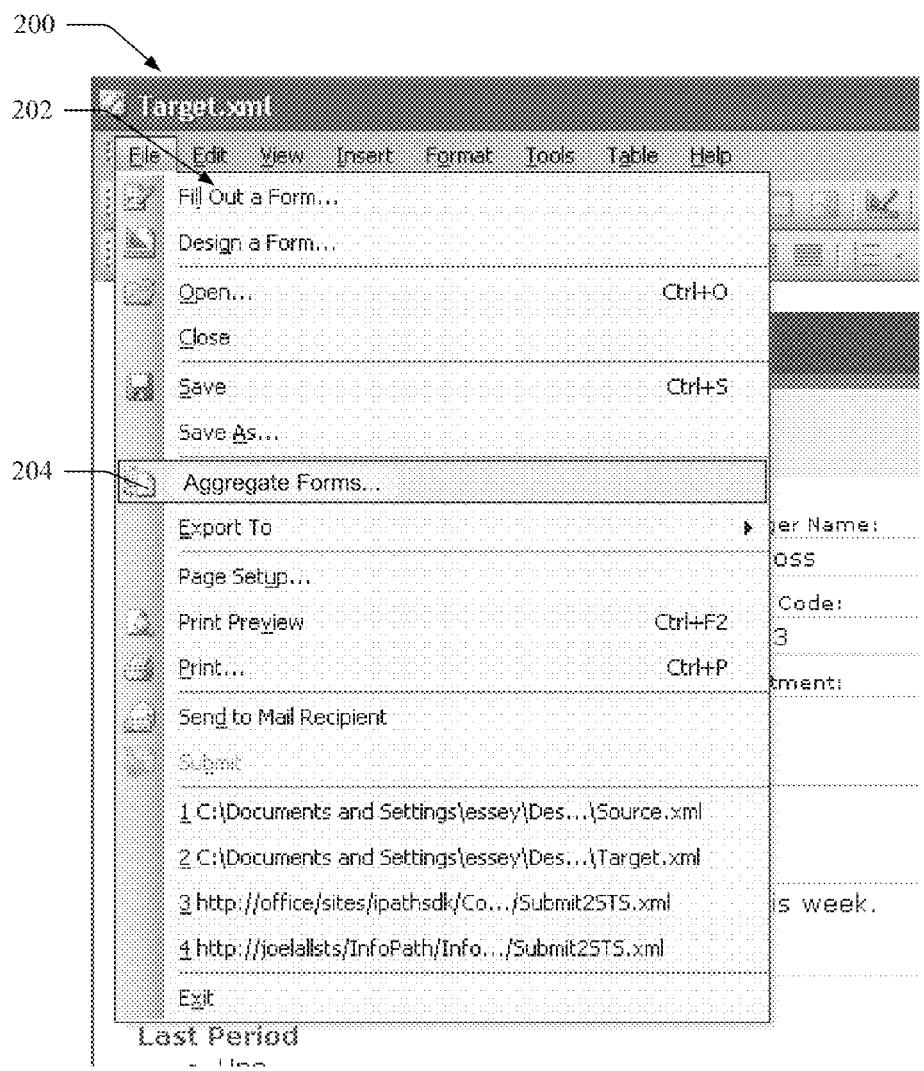
FIG. 2 illustrates a partial screen shot showing a menu by which a user can select to import data from one electronic form into another electronic form.

FIG. 2 sets forth a portion of an exemplary screen shot 200 showing an example of an options menu 202. Here the user has selected to aggregate forms, shown at reference numeral 204.

Once this selection is made, a menu of various electronic forms can be presented from which the user chooses an electronic form to aggregate into the manager's report 102.

Figure 3:
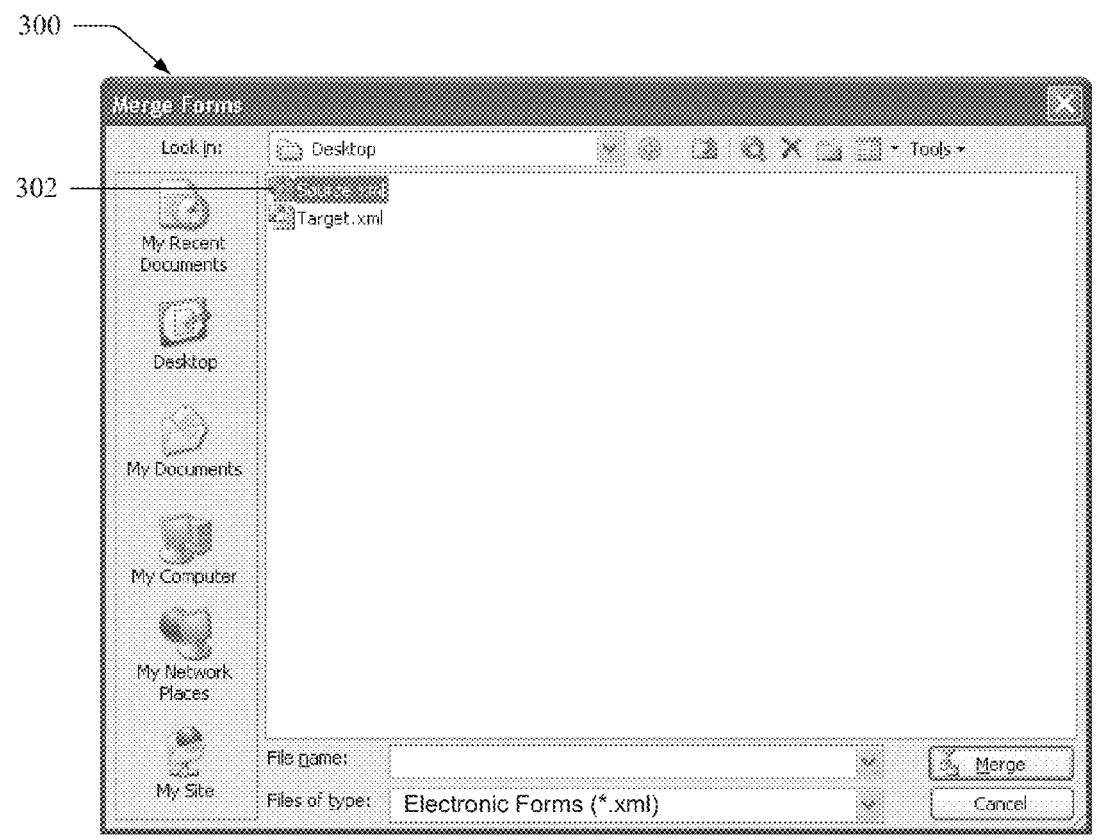
FIG. 3 illustrates a database selection screen showing electronic forms from which a user can select.

FIG. 3 sets forth a database selection menu 300 showing electronic forms from which a user can select. Here the user can (and has) selected an electronic form entitled "Source.xml" to aggregate into the manager's report 102. The source electronic form is shown at reference numeral 302.

Once this selection is made, the selected electronic form can be presented (though this is not necessary).

Figure 4:
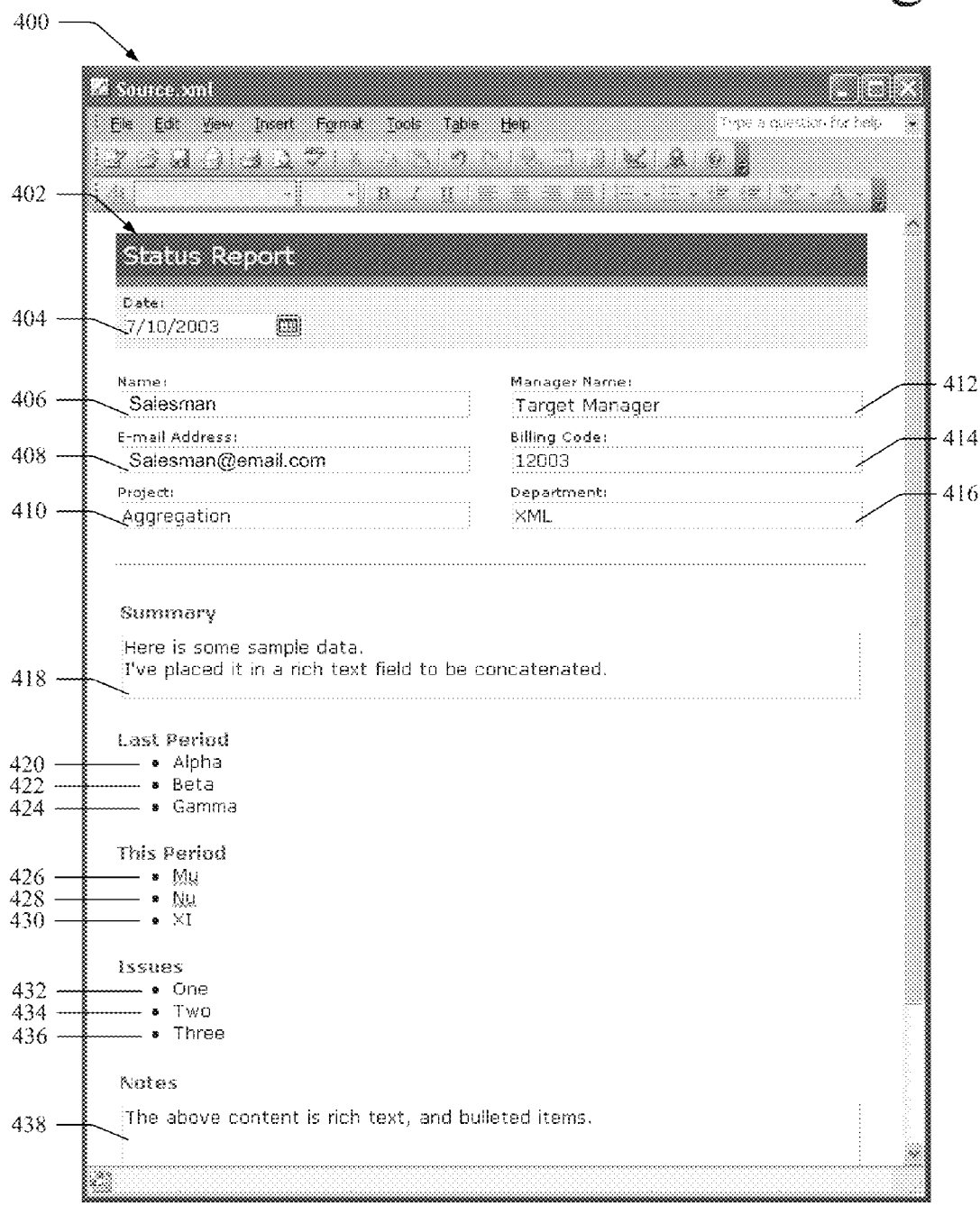
FIG. 4 illustrates a screen shot showing an exemplary electronic form from which a user can select to have data imported into another electronic form.

FIG. 4 sets forth an exemplary screen shot 400 showing an example of a source electronic form, here a salesman's status report 402. This salesman's report 402 contains data-entry fields containing data. The salesman's report 402 includes the following data-entry fields: a salesman's date field 404; a salesman's name field 406 (containing the name of the salesman, "Salesman"); a salesman's email address field 408; a salesman's project field 410; a salesman's boss's name field 412 (here the Target Manager from FIG. 1); a salesman's billing code field 414; a salesman's department field 416; a salesman's summary field 418; salesman's last period fields (an alpha field 420, a beta field 422, and a gamma field 424); salesman's this period fields (a mu field 426, a nu filed 428, and xi field 430); a salesman's issues fields (a one field 432, a two field 434, and a three field 436); and a salesman's notes field 438.

Also once this selection is made, the salesman's report 402 can be aggregated into the manager's report 102. Here certain parts of the data of the salesman's report 402 are imported into the manager's report 102.

Figure 5:
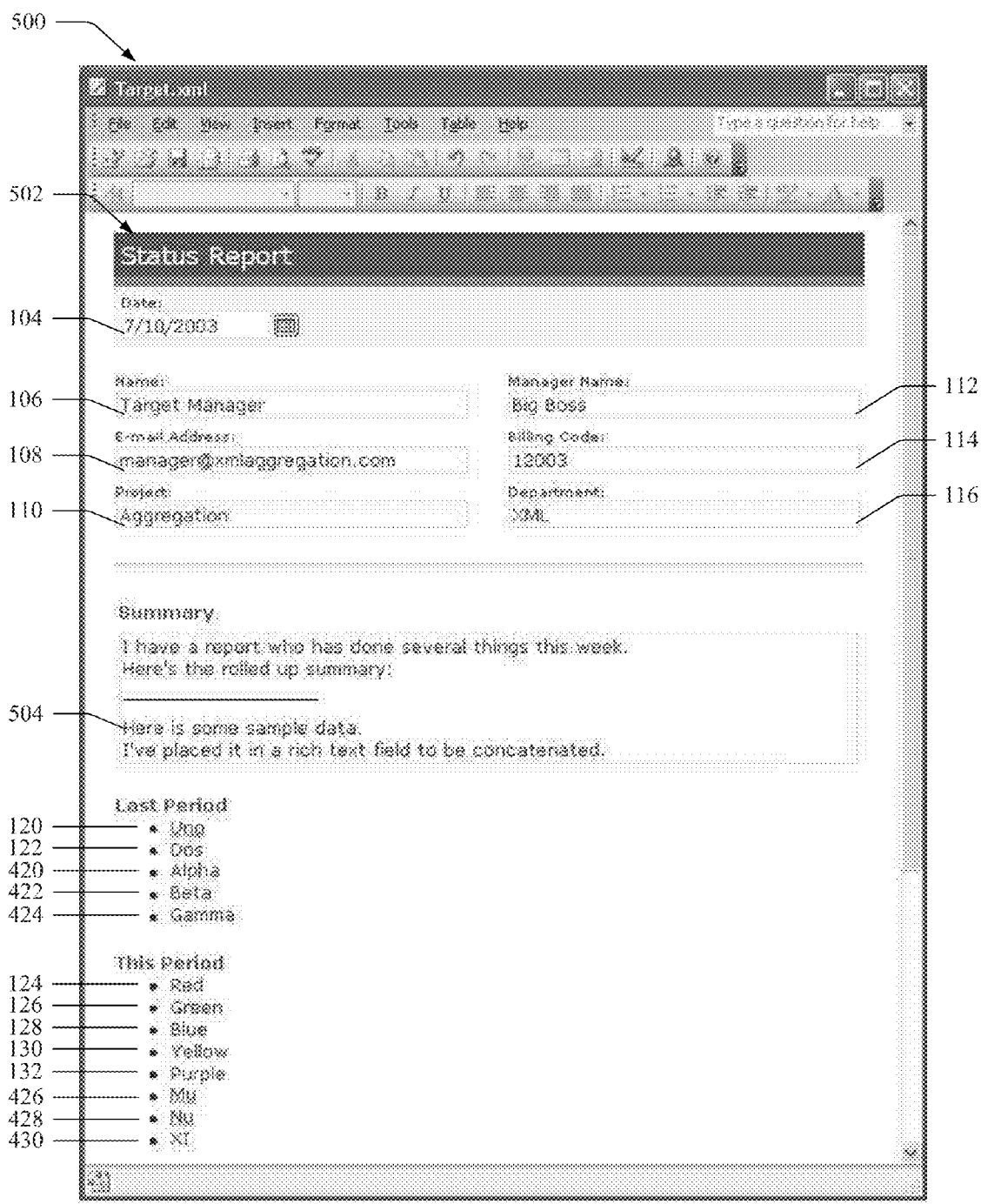
FIG. 5 illustrates a screen shot showing an exemplary electronic form having data imported into it from another electronic form.

FIG. 5 sets forth an exemplary screen shot 500 showing an example of a target electronic form after data from a source electronic form has been aggregated into the target electronic form, here an aggregate manager's status report 502. This aggregate manager's report 502 contains data-entry fields containing data (which, in one implementation, the manager can then manually edit, if desired).

The aggregate manager's report 502 includes the original data-entry fields shown in FIG. 1: the date field 104; the manager's name field 106; the manager's email address field 108; the project field 110; the manager's boss's name field 112; the billing code field 114; the department field 116; the last period fields 120 and 122; the this period fields 124, 126, 128, 130, and 132; the issues field 134 (not shown); and the notes field 136 (not shown).

The aggregate manager's report 502 also includes data imported from the salesman's report 402, either standing alone (as a new entry or data-entry field) or appended into an existing data-entry field. An example of data appended into an existing data-entry field is shown in an aggregate summary 504, which is the summary 118 only with additional, imported data. Here, the data from the salesman's summary field 418 has been aggregated with the data within the summary 118 from the manager's report 102. Thus, the aggregate summary 504 now reads: "I have a report who has done several things this week. Here's the rolled up summary: Here is some sample data. I've placed it in a rich text field to be concatenated." The summary 118 from FIG. 1, however, reads: "I have a report who has done several things this week. Here's the rolled up summary:". The salesman's summary 418 from FIG. 4 reads "Here is some sample data. I've placed it in a rich text field to be concatenated.".

Examples of data imported as a new entry or data-entry field include the data-entry fields shown in FIG. 4 that are now included in the aggregate manager's report 502: the salesman's last period fields 420, 422, and 424; the salesman's this period fields 426, 428, and 430; and the salesman's issues fields 432, 434, and 436 (not shown in FIG. 5).

By importing data from the source electronic form (here the salesman's report 402) into the target form (here the manager's report 102), a user can better see, understand, and analyze information. As shown in FIGS. 2 and 3, the user can aggregate these similar electronic forms simply and easily.

How these electronic forms can be aggregated will be covered in greater detail below. Prior to setting forth various methods for importing data, a system will be set forth in part to aid the reader in understanding the methods later set forth. For discussion purposes, the system set forth below is described in the context of a single computer, a user-input device, and a single display screen. These and other devices will be described first, followed by a discussion of the techniques in which these and other devices can be used.

Exemplary System

Figure 6:
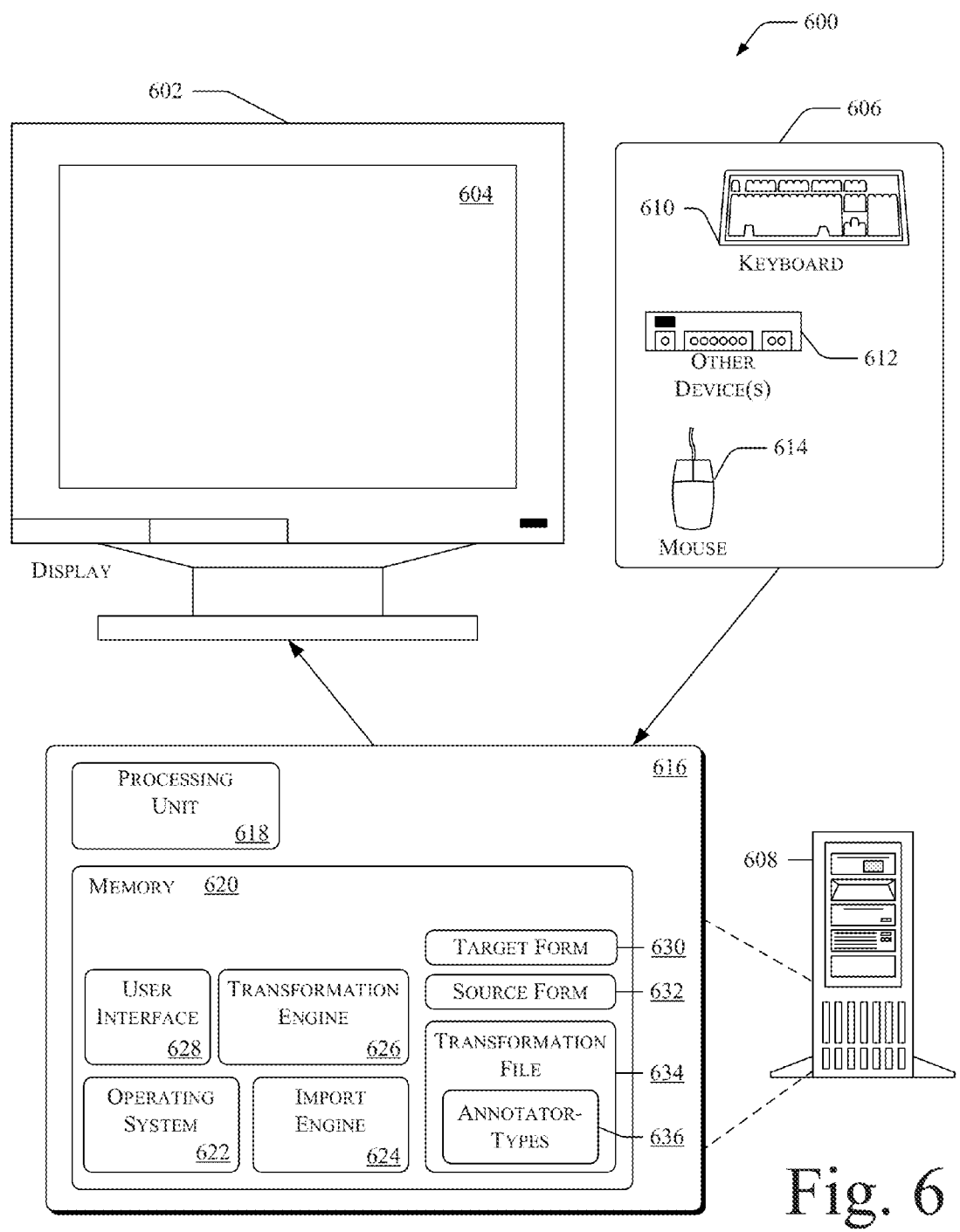
FIG. 6 illustrates a computer system capable of implementing a method for importing data from one electronic form into another electronic form.

FIG. 6 shows an exemplary system 600 to facilitate data importation between electronic forms.

The system 600 includes a display 602 having a screen 604, a user-input device 606, and a computer 608. The user-input device 606 can include any device allowing a computer to receive input from a user, such as a keyboard 610, other devices 612, and a mouse 614. The other devices 612 can include a touch screen, a voice-activated input device, a track ball, and the like. The user can send input via the user-input device 606 to the computer 608 to select an electronic form to be a source for merging into a target electronic form, for instance. The user can use the display 602 and its screen 604 to view user interfaces showing electronic forms, for example.

The computer 608 includes, within block 616, a processing unit 618 to execute applications and a memory 620 containing applications and files. The memory 620 includes volatile and non-volatile memory and applications, such as an operating system 622 and an import engine application 624. The import engine 624 is configured to analyze and import data from one electronic form to another. The import engine 624 can do so without annotations to the source electronic form (discussed below) and/or by following various instructions annotated into an electronic form (also discussed below).

The memory 620 also includes a transformation engine application 626 and a user interface 628, each of which can be part of or separate from the import engine 624.

The memory 620 also includes a target electronic form 630 and a source electronic form 632. The target form 630 and the source form 632 can be located locally in the memory 620, or can be accessed from a remote source across a communications network (not shown). In cases where the source form 632 and the target form 630 are hierarchical in nature, such as when both are written in XML, each form can be represented with nodes. These nodes can include a root node, to which all other nodes are subordinate, and these other nodes. Each node of the form can have nodes subordinate to it (each a child node with respect to that node) and so on. Thus, each node can have a parent node (except for the root node) and each node can have child nodes (though some will not).

In addition, each of these nodes can contain data, such as the data set forth in the data-entry fields (which are assumed to be a representation of some of the data within nodes related to those data-entry fields) shown in FIGS. 1, 4, and 5.

Figure 7:
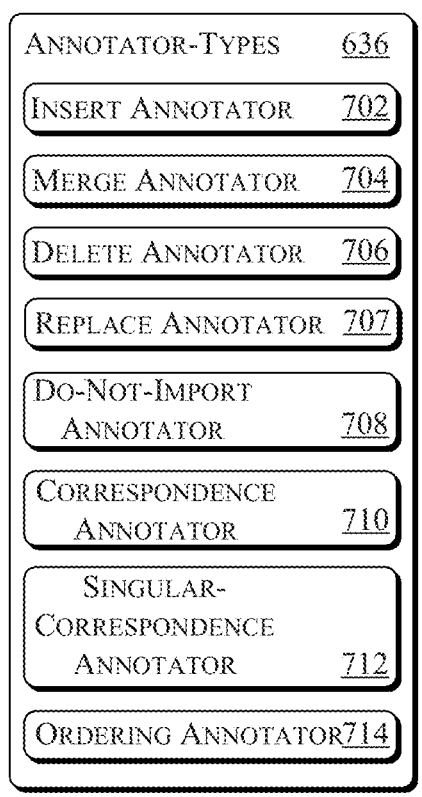
FIG. 7 illustrates an exemplary set of transformation annotator-types usable in a transformation file to annotate an electronic form with instructions.

The memory 620 can also include a transformation file 634, which can include transformation annotator-types 636 (set forth in greater detail in FIG. 7). The transformation engine application 626 is configured to apply the transformation file 634 to annotate the source form 632.

With these annotator-types 636 (or others), the transformation file 634 can annotate a particular portion of the source form 632. This transformation file 634, when applied on the source form 632, creates an annotated version of the source form 632. These annotations include instructions to the import engine 624, which the import engine 624 can use to import data from the source form 632 into the target form 630.

These annotator-types 636 can include the annotator-types set forth in FIG. 7 and described in a corresponding discussion.

Each of these annotator-types 636, when applied (as part of the transformation file 634) on the source form 632, can annotate the source form 632 with instructions relating to or including operations for the import engine 624 to perform. Thus, when the import engine 624 analyzes the source form 632 after it has been annotated, the import engine 624 can read certain instructions that have been put into the source form 632 as or within annotations. These instructions can direct the import engine 624 to import certain portions of the source form 632 into certain places within the target form 630, for instance.

In one implementation, the annotations are labeled with a tag to distinguish them from the data of the source form 632. This tag can reference a private XML namespace readable by the import engine 624.

In another implementation, each instruction associated with each of these annotator-types 636 relate to executable code that the import engine 624 executes when it reads that instruction in an annotated version of the source form 632. This executable code, when executed, can import data within a node of the source form 632 into a node of the target form 630, for instance.

FIG. 7 shows an example of the annotator-types 636, which are usable to facilitate data importation between electronic forms. The annotator-types 636 are set forth to explain various types of instructions that can be annotated into the source form 632, but are not the only types of instructions that can be used. They are instead set forth as examples to aid the reader in understanding how the transformation file 634 and annotations to the source form 632 can be used by the import engine 624 to aid the import engine 624 in importing data from the source form 632 into the target form 630.

The annotator-types 636 include an insert annotator 702, a merge annotator 704, a delete annotator 706, a replace annotator 707, a do-not-import annotator 708, a correspondence annotator 710, a singular-correspondence annotator 712, and an ordering annotator 714. These annotators are described in order below.

The insert annotator 702 can be applied, as part of the transformation file 634, on the source form 632 to annotate that form. This annotation includes instructions to insert a portion of the source form 632 (such as a data) into a portion of the target form 630. These instructions, for hierarchical forms, can direct the import engine 624 to insert a particular node of the source form 632 (or data within that node) as a child node of a particular node of the target form 630. These instructions, again for hierarchical forms, can also direct the import engine 624 to append data from the source form 632 to a node of the target form 630.

The merge annotator 704 can be applied, as part of the transformation file 634, on the source form 632 to annotate that form. This annotation includes instructions to merge a portion of the source form 632 (such as data) into a portion of the target form 630. These instructions, for hierarchical forms, can direct the import engine 624 to merge the data (or part of the data) of a particular node of the source form 632 into a node of the target form 630.

The delete annotator 706 can be applied, as part of the transformation file 634, on the source form 632 to annotate that form. This annotation includes instructions to delete a portion of the target form 630. These instructions, for hierarchical forms, can direct the import engine 624 to delete one or more nodes from the target form 630.

The replace annotator 707 can be applied, as part of the transformation file 634, on the source form 632 to annotate that form. This annotation includes instructions to replace a portion of the target form 630 (such as data) with a portion of the source form 632. These instructions, for hierarchical forms, can direct the import engine 624 to replace a node and/or its descendents (or data within the nodes) of the target form 630 with a particular node and/or its descendents (or the data within the nodes) of the source form 632.

The replace annotator 707 is not the same as annotating the source form 632 with the delete annotator 706 and the insert annotator 702. The replace annotator 707 does not instruct the system 600 to delete a node or data from the target form 630 and then insert a node or data from the source from 632. Rather, the replace annotator 707 annotates the source form 632 with instructions to replace a portion of the target form 630 with the source form 632. This is important because, in some situations, deleting part of the target form 630 can cause the target form 630 to be invalid, based on the schema governing the target form 630. In some other situations, inserting and then deleting could also cause the target form 630 to be invalid if the schema governing the target form 630 does not allow insertion of the portion of the source form 632 while the portion of the target form 630 still exists.

The do-not-import annotator 708 can be applied, as part of the transformation file 634, on the source form 632 to annotate that form. This annotation includes instructions to refrain from importing a portion of the source form 632 into a portion of the target form 630. These instructions, for hierarchical forms, can direct the import engine 624 to refrain from importing a node (or its data) of the source form 632 into a node (or any node) of the target form 630.

The correspondence annotator 710 can be applied, as part of the transformation file 634, on the source form 632 to annotate that form. This annotation includes instructions to associate or correspond a portion of the source form 632 (such as data) to a portion of the target form 630. These instructions, for hierarchical forms, can direct the import engine 624 to correspond a set of nodes of the source form 632 to one or more nodes of the target form 630. The correspondence annotator 710 can be used in conjunction with other annotations, such as the insert, merge, delete, and replace annotations 702, 704, 706, and 707. By so doing, the system 600 can learn what part of the target form 630 corresponds to the part of the source form 632 having the insert, merge, delete, and replace annotations 702, 704, 706, and 707. The instruction within the correspondence annotation informs the system 600 as to what part or data of the target form 630 to insert the source data into, replace with the source data, merge the source data into, or delete, for instance.

The singular-correspondence annotator 712 can be applied, as part of the transformation file 634, on the source form 632 to annotate that form. This annotation includes instructions to associate or correspond a portion of the source form 632 (such as data) to a portion of the target form 630. These instructions, for hierarchical forms, can direct the import engine 624 to correspond a particular node of the source form 632 to a node of the target form 630. The singular-correspondence annotator 712 can be used in conjunction with other annotations, such as the insert, merge, delete, and replace annotations 702, 704, 706, and 707. By so doing, the system 600 can learn what part of the target form 630 corresponds to the part of the source form 632 having the insert, merge, delete, or replace annotations 702, 704, 706, and 707. The instruction within the singular-correspondence annotation informs the system 600 as to what part or data of the target form 630 to insert the source data into, replace with the source data, merge the source data into, or delete, for instance.

The ordering annotator 714 can be applied, as part of the transformation file 634, on the source form 632 to annotate that form. This annotation includes instructions to associate or correspond a portion of the source form 632 (such as data) before or after a portion of the target form 630. These instructions, for hierarchical forms, can direct the import engine 624 to associate a particular node of the source form 632 before or after a particular node of the target form 630. The ordering annotator 714 can be used in conjunction with other annotations, such as the insert annotation 702. By so doing, the system 600 can learn where in the target form 630 data of the source form 632 corresponds. The instruction within the ordering annotation informs the system 600 where in the target form 630 to insert the source data, for instance.

Exemplary Methods

Importing Generally

Figure 8:
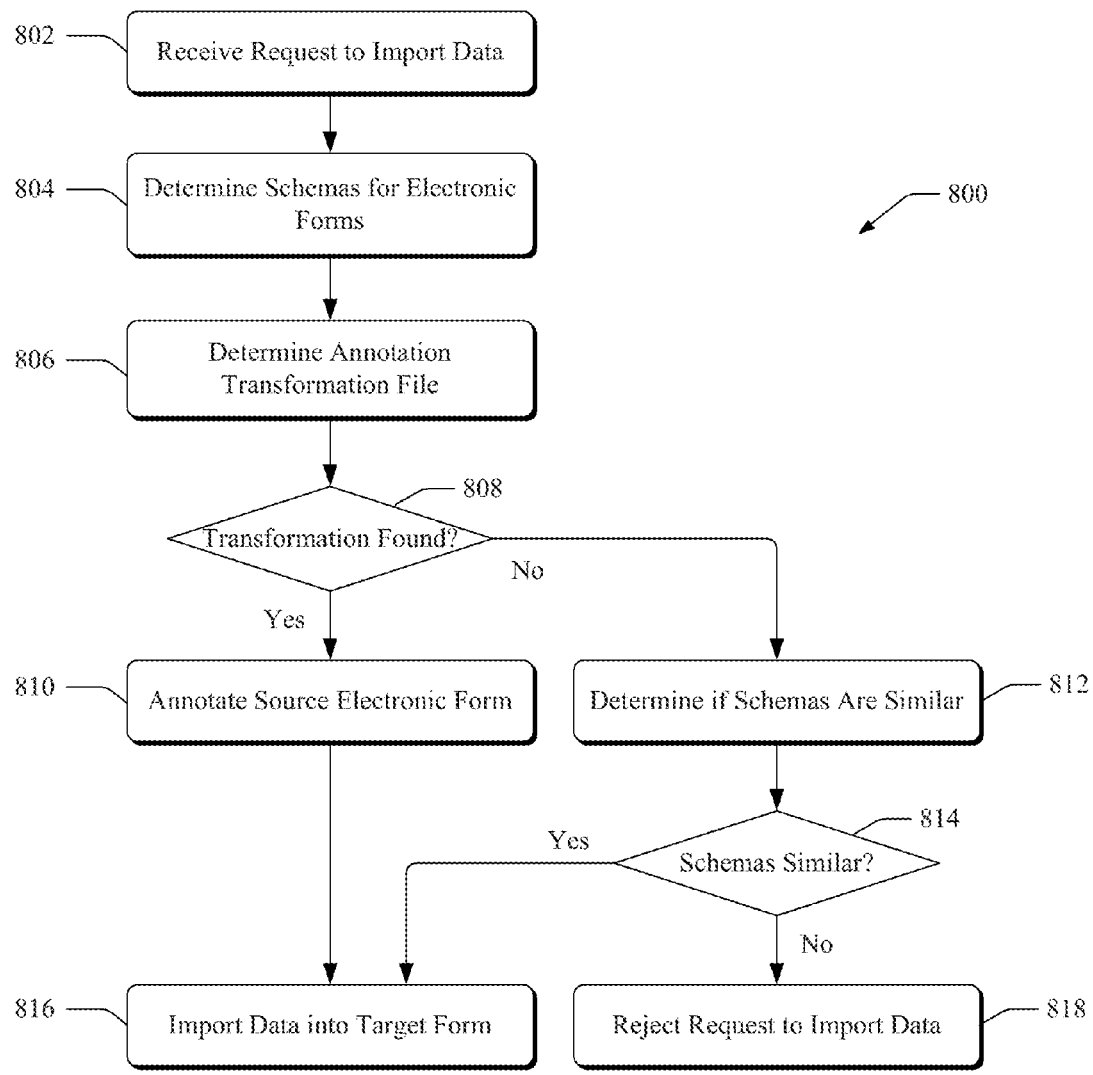
FIG. 8 is a flow diagram of an exemplary process for importing data from one electronic form into another electronic form.

FIG. 8 shows a flow diagram 800 for importing data from one electronic form into another electronic form.

This and the following flow diagrams are illustrated as series of blocks representing operations or acts performed by the system 600. These diagrams may be implemented in any suitable hardware, software, firmware, or combination thereof. In the case of software and firmware, they represent sets of operations implemented as computer-executable instructions stored in memory and executable by one or more processors.

The method set forth in the flow diagram 800 will be described in part through the example set forth in FIGS. 1 to 5. The example of FIGS. 1 to 5 cover two substantially similar electronic forms, though the flow diagram 800 can be used with forms that are not substantially similar. The example of FIGS. 1 to 5 is used to aid the reader in understanding an implementation of the method, and is not intended to limit the applicability of the method.

FIGS. 1 through 5 set forth an example of what a user selecting the forms can see on the screen 604 of the display 602. These displays can be presented in parallel with the method shown in the flow diagram 800 being performed by the system 600.

In FIG. 1, for example, the system 600 displays an example of the target form 630, here the manager's report 102, which was chosen by a user. With this form shown, the user is enabled by the system 600 to select a form to merge into the target form 630 (here the manager's report 102).

Prior to or as part of block 802, the user selected the target form 630, in this example the manager's report 102 of FIG. 1. The target form 630 does not have to be shown to the user, but doing so can aid the user by assuring the user that the target form 630 is the one that the user intended to select. In one implementation, the target form 630 is selected by someone or something other than the user, such as the computer 608 selecting it based on various events occurring. In another implementation, the target form 630 is selected by a remote computer or a remote user.

At block 802, the system 600 receives a request to import data from the source form 632 to the target form 630. The system 600 can receive this request from a user through the user interface 628 and the user-input device 606. The system 600 can also receive the request remotely, such as from a remote computer or computer system, or from the computer 608 on occurrence of an event. These events include a certain amount of time elapsing, a date arising, the source form 632 being submitted after entry of data into the source form 632, and the like.

Continuing the ongoing example, FIG. 2 shows the user selecting to aggregate forms by selecting the aggregate forms selection shown at 204 of the options menu 202. After receiving this selection to aggregate forms, the system 600 presents various forms from which the user can choose, in this case those forms on the computer's 608 desktop (part of the memory 620).

To further enable the user's selection, the system 600 presents forms, shown in FIG. 3, one of which is shown as selected by the user as the target form 630. Here the screen shot 300 shows the user selecting the "Source.xml" form (at the reference numeral 302) to be the source form 632 (here the salesman's report 402). The system 600 can then display the source form 632.

FIG. 4 sets forth an example of the source form 632, here a "status report" by a salesman. The system 600 does not have to show the source form 632 selected by the user. In this example the system 600 does so to assure the user that the source form 632 selected was the form intended to be selected by the user.

FIGS. 1 to 4 show what the user can, in one implementation, see as part of the block 802.

Once the user has selected to aggregate the source form 632 into the target form 630 (shown in FIG. 3), the system 600 proceeds to block 804.

At block 804, the system 600 determines a schema governing the source form 632 (the "source schema") and a schema governing the target form 630 (the "target schema"). This can be performed by the system 600 without user interaction.

The target schema can be determined in various ways. In one implementation, the schema of the target form 630 is known because the target form 630 is currently loaded on the computer 608 (in the memory 620). Thus, in this implementation the target schema is determined simply by loading the target form 630. In another implementation, the system 600 accesses files of or the target form 630 to determine the target schema.

The system 600 can determine the source schema in various ways. In each of these ways the system 600 can set a particular schema as being the source schema if the system 600 determines that the particular schema is capable of governing the source form 632.

In one implementation, the system 600 determines the source schema by comparing the source form 632 with the target schema. By so doing, the system 600 determines if the target schema is capable of governing the source form 632.

In another implementation, the system 600 compares the source form 632 with multiple or all schemas known by or accessible by the import engine 624. By so doing, the system 600 determines if a particular schema is capable of governing the source form 632.

In another implementation, the system 600 compares parts of the source form 632 against parts or all of various schemas known by or accessible by the import engine 624. By so doing, the system 600 determines what parts of the source form 632 are capable of being governed by one or more known or accessible schemas.

In another implementation, the system 600 determines the source schema by first comparing the source form 632 with the target schema as above and then proceeding as further described. If the source form 632 is not capable of being governed by the target schema, the system 600 then compares the source form 632 with known or accessible schemas, as above. If the source form 632 is not capable of being governed by these schemas, the system 600 then compares parts of the source form 632 with parts of all or various schemas known or accessible by the import engine 624, as above. In this way, the system 600 determines the source schema or one or more source schemas that are capable of governing parts of the source form 632.

In another implementation, the system 600 determines the source schema by analyzing the structure of the source form 632. This analysis can include determining what language the form is written in, such as XML. The system 600, by knowing the language of the form and its structure, can compare it to various schemas known to or accessible by the import engine 624. If a particular schema allows for the structure of the form, the system 600 can determine the source schema and/or the target schema. In this implementation, the import engine 624 accesses a list or other body of information that associates or otherwise maps the source schema to the transformation file 634 for later use.

In another implementation, the system 600 accesses a list of schemas associated with the target form 630. This list of schemas can include the target schema and other schemas. The system 600 compares each of these listed schemas with the source form 632. The system 600 can do so by comparing the structure of the source form 632 or by attempting to govern the source form 632 by the rules set forth in the schema. If the system 600 determines that a schema from the list is capable of governing the source form 632, the system 600 can set this schema as the source schema.

In one implementation, if the system 600 determines that more than one schema from the list is capable of governing the source form 632, the system can set the first schema found to be capable of governing the source form 632 as the source schema. The system 600 can also set the target schema as the source schema if the target schema is capable of governing the source form 632.

In yet another implementation, the system 600 accesses a file associated with the source form 632 or the target form 630. This file can include a reference to the schema, such as a hyperlink, or the schema itself.

In still another implementation, the system 600 uses information learned about the source form 632 to build a schema from available schemas or schema fragments that are capable of governing parts of the source form 632.

At block 806 the system 600 determines a transformation file. The system 600 can do so with the aid of the source schema, such as by the transformation file being associated with the source schema. The system 600, in one implementation, accesses a list of schemas and transformation files associated with each of the listed schemas. The system 600 can do so when one or more transformation files are pre-made and associated with the target form 630 and various potential source schemas.

In another implementation, the system 600 accesses a file or metadata (such as information in a header) associated with or in the source form 632 to determine the correct transformation file to use. This file or metadata can include a reference to the transformation file, such as a hyperlink, or the transformation file itself.

At block 808, if a transformation file is determined, the system 600 proceeds along the "Yes" path to block 810 and annotates the source form 632. If no transformation files are determined then the system 600 proceeds along the "No" path to block 812.

At block 812 the system 600 determines if the target form 630 and the source form 632 are similar or dissimilar. For hierarchically structured forms, the system 600 determines if the forms are similar based on the similarity of the source schema and the target schema. This can be performed by the system 600 without user interaction.

At block 814, if the source schema and the target schema are similar, the system 600 proceeds along the "Yes" path to block 816. In they are not similar, the system 600 proceeds along the "No" path to block 818.

At block 818 the system 600 rejects the request to import data.

If the system 600 proceeds to block 816 (without first performing block 810) and thus does not annotate the source form 632, the system 600 can still import data as part of block 816. This is discussed in greater detail below.

If the system 600 proceeds to block 810, the system 600 can annotate all of the source form 632, just those portions that are governed by the source schema where the source schema is dissimilar to the target schema, or somewhere in between. In one implementation, the system 600 annotates all or portions of the source schema by transforming the all or a portion by applying an appropriate transformation file (such as the transformation file 634). If the source schema is written in XML, the transformation file 634 is compatible, such as by being written in XSLT.

At block 810 the system 600, through the transformation engine 626, annotates the source form 632. The system 600 annotates the source form 632 to aid the import engine 624 in importing data.

The system 600 annotates the source form 632 to include instructions. These instructions are used by the import engine 624 to aid the import engine 624 in importing data from the source form 632 into the target form 630.

The system 600 can annotate the source form 632 without user interaction. The system 600 can also annotate the source form 632 whether or not the source schema and the target schema are substantially similar or dissimilar.

As shown in the flow diagram 800, the system 600 annotates the source form 632 when the source form 632 and the target form 630 are substantially dissimilar. When the source form 632 and the target form 630 are hierarchical, they are substantially dissimilar when the source schema and the target schema are substantially dissimilar.

The system 600, through the transformation engine 626, annotates the source form 632 by applying the transformation file 634 on the source form 632. The transformation file 634 can be pre-made and accessed as described herein.

Depending on how the transformation file 634 is built, when the transformation engine 626 applies the transformation file 634, certain portions or even all of the source form 632 is annotated. Thus, if a designer builds the transformation file 634 to annotate certain portions of the source form 632, only those portions are annotated by applying that transformation file 634. These annotations include instructions to the import engine 624, which it uses as set forth herein.

The annotations also have various effects. They can add instructions that inform the import engine 624 as to how to make data of the source form 632 compatible with the target form 630, for instance. They can also add instructions showing the import engine 624 where to import certain portions of the source form 632 into the target form 630, and the like.

In one implementation, these annotations include instructions related to the annotator-types 636 set forth in FIG. 7. The annotator-types 636 can include the insert annotator 702, the merge annotator 704, the delete annotator 706, the replace annotator 707, the do-not-import annotator 708, the correspondence annotator 710, the singular-correspondence annotator 712, and the ordering annotator 714.

In this implementation, annotations added to the source form 632 can include instructions to: insert a node or data within a node of the source form 632 as a child node to a parent node in the target form 630; merge attributes associated with data of the source form 632 with attributes associated with a node of the target form 630; replace one or more nodes of the target form 630 with a node of the source form 632; delete one or more nodes of the target form 630; not import a node, portion, or data of the source form 632 into the target form 630; associate a set of nodes of the target form 630 with one or more nodes associated with data of the source form 632; associate a particular node of a set of nodes of the target form 630 with a node or other data of the source form 632; and associate a node of the source form 632 to a particular point in an order of a set of nodes in the target form 630.

The annotators 710, 712, and 714 associate data (e.g., one or more nodes) of the source form 632 with data (e.g., one or more nodes) of or locations within the target form 630. Thus, they are used in conjunction with the insert, merge, delete, and replace annotators 702, 704, 706, and 707 when these annotators need to be associated with some node or location of the target form 630.

In one implementation, the source form 632 and the target form 630 include code written in XML. In this implementation, the transformation file 634 includes code written in XSLT.

At block 816, the importation engine 624 of the system 600 imports data from the source form 632 into the target form 630. The import engine 624 can import data from some or all of the data of the source form 632 into the target form 630. This data can include data within a node of a hierarchical source electronic form, all of the node of a hierarchical source electronic form, a portion of a hierarchical or non-hierarchical source electronic form, and the like. The data (or parts of the data) of the source form 632 can be presented to a user visually as the contents of a data-entry field, as a non-entry field, as text (including text presented with HTML), in a table, or in many other ways known in the art.

The import engine 624 can import data with or without annotations or use of a transformation file. How it imports data without annotations or use of the transformation file 634 is set forth in greater detail in FIG. 13 and its description. How it imports data with or without annotations or use of the transformation file 634 is set forth in greater detail in FIG. 9 and its description.

Importing Data

As stated above, the system 600 annotates the source form 632 at block 810 of FIG. 8. Following block 810 of FIG. 8, the system 600 (through the import engine 624) imports data from the source form 632 into the target form 630.

If the source form 632 includes annotations (as is the case when the system 600 performs the actions of block 810), the import engine 624 finds and then follows the annotations. As set forth above, these annotations include instructions that aid the import engine 624 in importing data. In one implementation, the import engine 624 imports data without user interaction, making importing data easy and simple for users.

Figure 9:
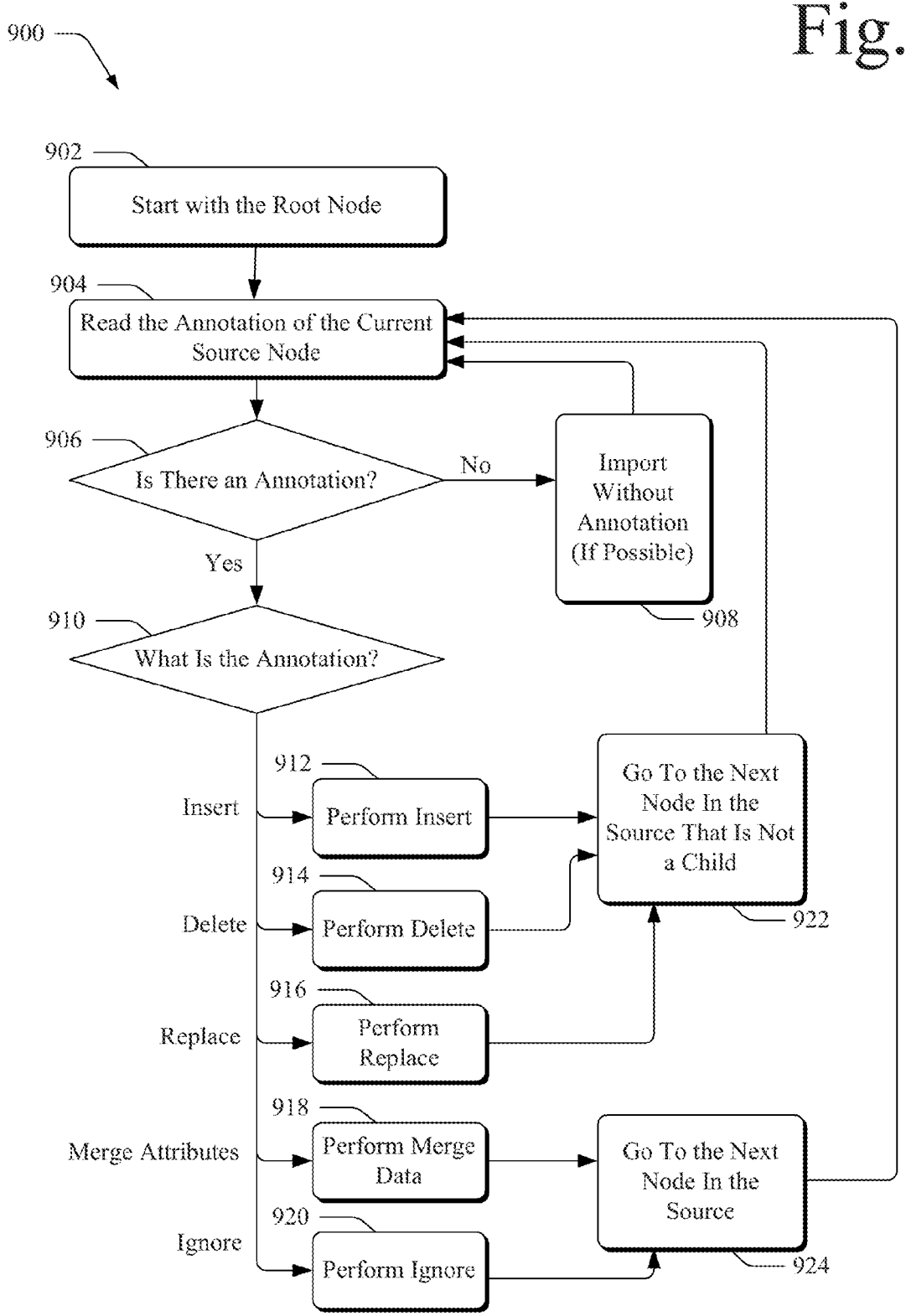
FIG. 9 is a flow diagram of an exemplary process for importing data from one electronic form into another electronic form with and without annotations.

FIG. 9 sets forth a flow diagram 900 for importing data from the source form 632 into the target form 630. The flow diagram 900 is an exemplary implementation of block 816 of FIG. 8 where the source form 632 and the target form 630 are hierarchical and arranged into nodes. The flow diagram 900 allows for importing of data with and without annotations.

As part of the flow diagram 900, the system 600 analyzes nodes of the source form 632. The system 600 can start with the first node (a root node) and proceed to analyze every node of the source form 632.

At block 902, the system 600 (primarily through the import engine 624), begins its analysis with the root node of the source form 632. As shown in the flow diagram 900, the system 600 analyzes this node and then proceeds to other nodes.

At block 904, the system 600 reads the current source node (which can be the root node or some other node) to find an annotation, if any. The system 600 can determine if the node includes an annotation by distinguishing the annotation from data in the node. In one implementation, annotations are labeled with a tag to distinguish them from the data of the source form 632. This tag can reference a private XML namespace readable by the import engine 624.

In some cases there is more than one annotation. In these cases, the system 600 reads all of the annotations before proceeding to block 906. As set forth below, some annotations, such as an annotation instructing the system to insert data, accompany another annotation instructing the system 600 as to where in the target form 630 the data should be inserted.

At block 906, if no annotation is found, the system 600 proceeds along the "No" path to block 908. If an annotation is found, the system 600 proceeds along the "Yes" path to block 910.

At block 908, the system 600 imports data (or ignores the data) based on various factors, but does so without use of annotations. Thus, while the import engine 624 can use instructions within annotations to aid it in importing data, all of the source form 632 does not have to be annotated. Some parts can be without annotations. In one implementation, the import engine 624 imports data without use of any annotations (described below). In others, the import engine 624 imports data for some parts that have annotations and some that do not, as shown in the flow diagram 900.

At block 910, the system 600 determines which annotation(s) were found in block 906.

As set forth below, the instructions that the import engine 624 follows can direct the import engine 624 as to what node of the source form 632 is to be imported, where in the target form 630 it is to be imported, and how it is to be imported. These instructions can also aid the import engine 624 in conforming the node of the source form 632 to the schema of the target form 630. They can also aid the import engine 624 in determining how much of the data of a source node is to be imported into the target form 630.

At blocks 912, 914, and 916, the system 600 follows the instructions to insert, delete, or replace data as set forth in the description of the insert annotator 702, the delete annotator 706, and the replace annotator 707 relating to FIG. 7. The system 600 follows the instructions to perform the action on the current source node.

For insertion and replacing of data, the instructions include reference to a node of the target form 630 showing where to insert or replace data in the target form 630 with data from the current source node. For both inserting and replacing data, this reference can include instructions from the correspondence annotator 710 or the singular-correspondence annotator 712, which set forth where in the target form 630 the insertion or replace is to be performed. This is set forth in greater detail as part of the discussion of FIG. 7.

For inserting data, the reference can also include instructions from the ordering annotator 714, which aids the system 600 in inserting the current source node at the beginning, end, or somewhere in the middle of a set of nodes of the target form 630. This is also described in greater detail in FIG. 7 and elsewhere herein.

Following blocks 912, 914, and 916, the system 600 proceeds to block 922.

At block 922, the system 600 continues on to perform the actions of block 904, but for a new source node of the source form 632. This new source node is the next node in the source form 632 that is not a child node of the source node just analyzed.

In one implementation, if the current source node has a child, the system 600 skips over the child and proceeds to analyze the next right sibling of the current source node. If the current source node does not have a next right sibling, the system 600 proceeds to analyze the next right sibling of the parent of the current source node, and so on. If there are no other nodes to be analyzed (some children are not analyzed as part of block 922), the system 600 stops analysis of nodes of the source form 632.

At blocks 918 and 920, the system 600 follows the instructions to merge data or ignore data. The system 600 can do so as set forth in the description of the merge annotator 704 or the do-no-import annotator 708 relating to FIG. 7. The system 600 follows the instructions to perform the action on the current source node. For merging data, the instructions include reference to a node of the target form 630 showing where to merge data in the target form 630 from the current source node. This reference can include instructions from the singular-correspondence annotator 712, as described in greater detail above.

Following blocks 918 or 920, the system 600 proceeds to block 924.

At block 924, the system 600 continues on to perform the actions of block 904, but for a new source node of the source form 632. This new source node is the next node in the source form 632, regardless of whether that node is a child of the source node just analyzed.

In one implementation, if the current source node has a child node, the system 600 proceeds to analyze the child. Otherwise, the system 600 proceeds to the next right sibling of the current source node or the next right sibling of the parent of the current source node, and so on up to the root node. If there are no other nodes to be analyzed (some children are not analyzed, based on block 922), the system 600 stops analysis of nodes of the source form 632.

Thus, by following the flow diagram 900, the system 600 can analyze and import data from (if appropriate) each node of the source form 632.

To aid in this discussion of importing data with annotations, the following exemplary forms are described.

Figure 10:
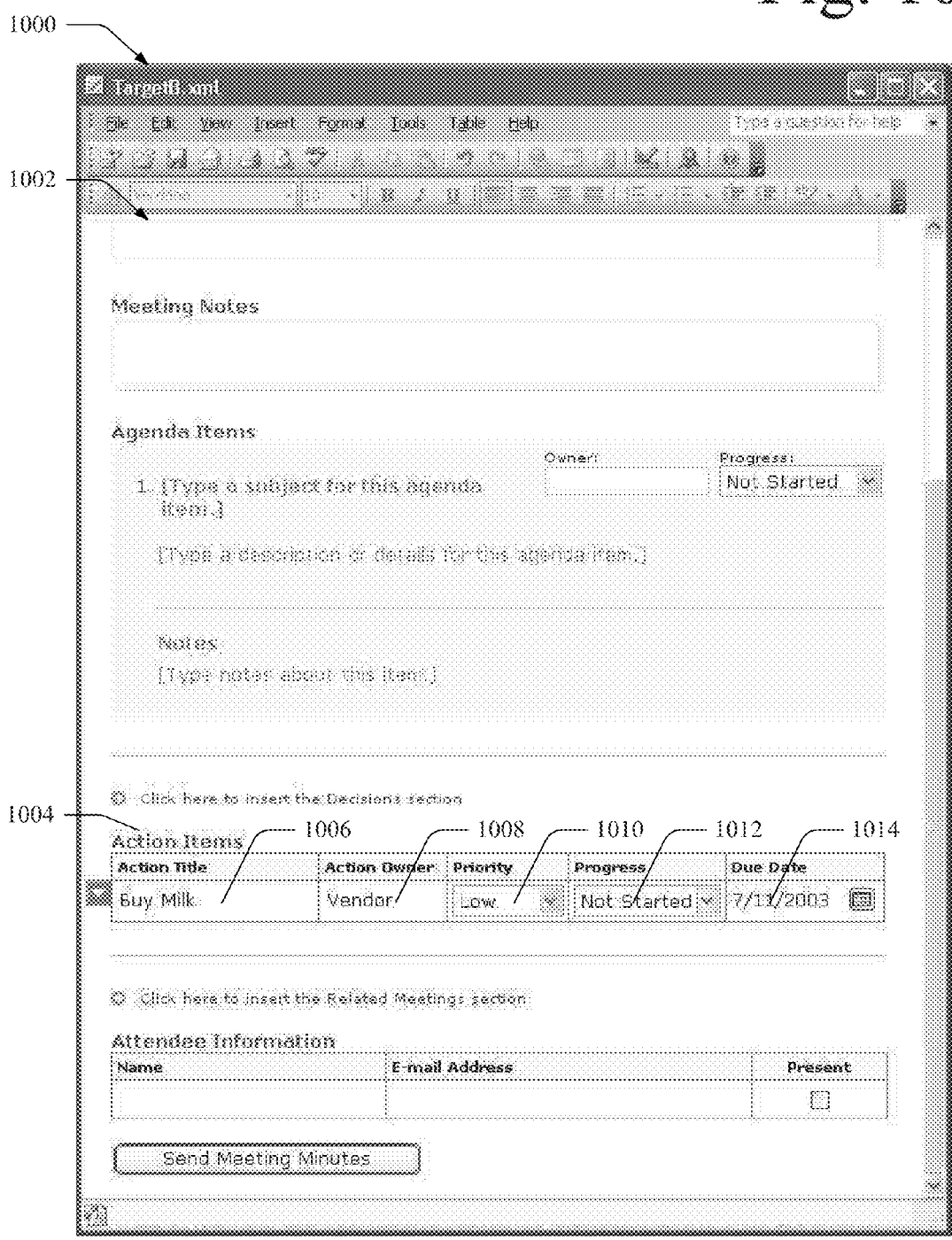
FIG. 10 illustrates a screen shot showing an exemplary target electronic form into which a user can select to have data imported from another electronic form.

FIG. 10 sets forth an exemplary screen shot 1000 showing an example of the target form 630, here an action report 1002. This action report 1002 contains data-entry fields, some of which contain data. The action report 1002 includes a reference 1004 showing that certain data-entry fields are "Action Items", which can indicate presence of a node of the action report 1002 or otherwise. Data-entry fields of interest include: an action title field 1006; an action owner field 1008; an action priority field 1010; an action progress field 1012; and an action due date field 1014. The action report 1002 has a substantially dissimilar schema to the exemplary source form 632 shown in FIG. 11.

Figure 11:
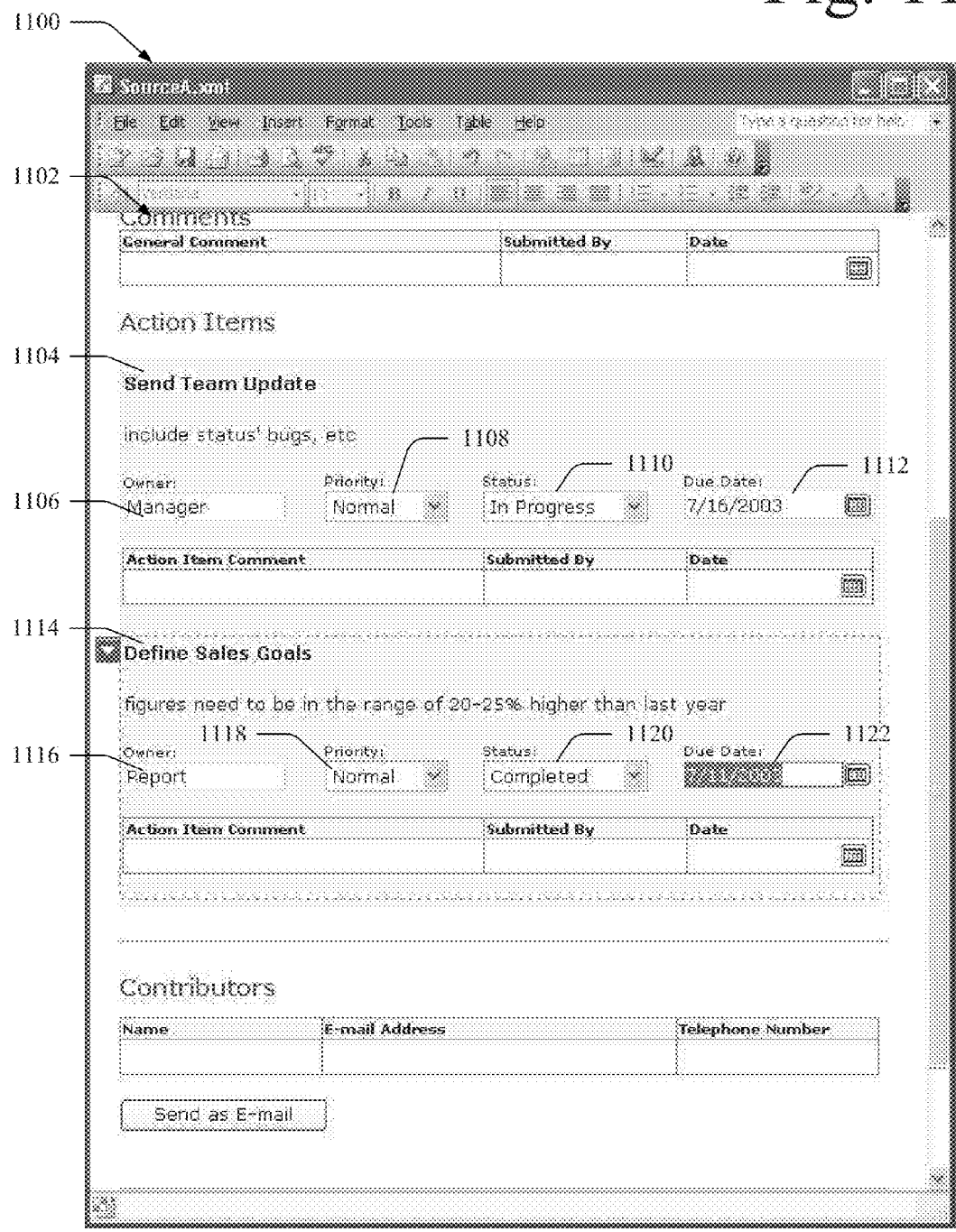
FIG. 11 illustrates a screen shot showing an exemplary electronic form from which a user can select to have data imported into another electronic form.

FIG. 11 sets forth an exemplary screen shot 1100 showing an example of the source form 632, here a team report 1102. The team report 1102 contains data-entry fields, some of which contain data. The team report 1102 includes a reference 1104 showing that certain data-entry fields are related to a "Send Team Update". Within this area of the team report 1102, certain data-entry fields are shown. These include a team update manager field 1106, a team update priority field 1108, a team update status field 1110, and a team update due date field 1112. Further, the team report 1102 includes a reference 1114 showing that certain data-entry fields are related to a "Define Sales Goals". Within this area of the team report 1102, certain data-entry fields are shown. These include a team goal owner field 1116, a team goal priority field 1118, a team goal status field 1120, and a team goal due date field 1122.

This team report 1102 is governed by a schema that is substantially dissimilar from the schema governing the action report 1002.

For the purposes of this example, the system 600 acts as shown in the blocks 802, 804, 806, 808, 810 and 816 of the flow diagram 800. At block 806, the system 600 determines that a transformation file exists for the schema of the team report 1102.

At block 810, the system 600 annotates the source form 632, here the team report 1102. The system 600 annotates the team report 1102 by applying the transformation file 634, in this case one in that is designed to annotate source electronic forms that can be governed, at least in part, by a source schema capable of governing the team report 1102. In this example, the transformation file 634 was designed to transform this source schema. At block 816, then, the system 600 imports data into the target form 630 (here the action report 1002).

Figure 12:
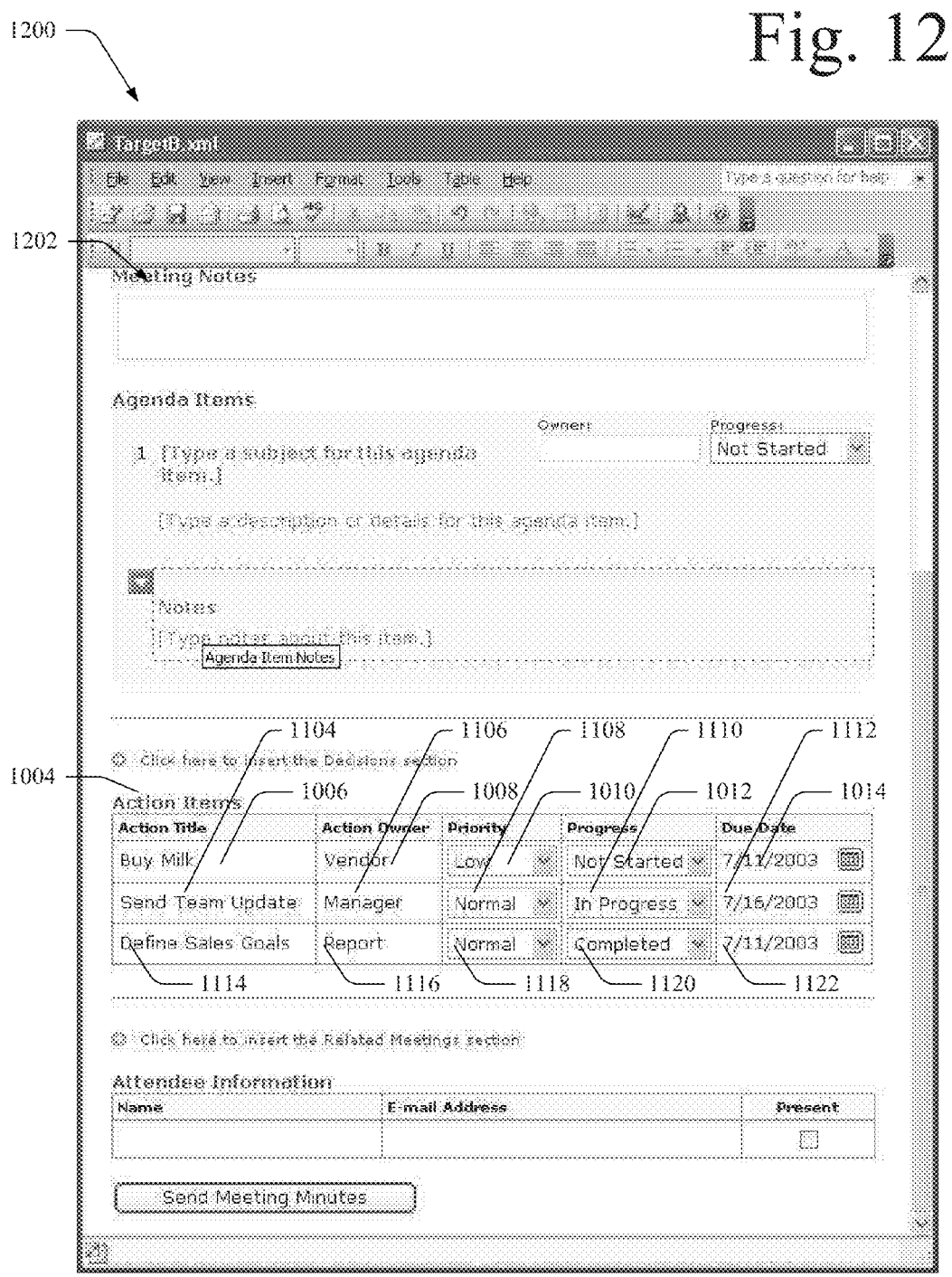
FIG. 12 illustrates a screen shot showing an exemplary electronic form having data imported into it from another, substantially different electronic form.

FIG. 12 sets forth an exemplary screen shot 1200 showing an example of the target form 630, here an aggregate action report 1202, after data from the team report 1102 has been imported into the action report 1002. As shown in FIG. 12, the aggregate action report 1202 includes the fields shown in FIG. 10 (the action title field 1006, the action owner field 1008, the action priority field 1010, the action progress field 1012, and the action due date field 1014) as well as the imported data, some of which is shown in the fields of: the team update manager field 1106; the team update priority field 1108; the team update status field 1110; the team update due date field 1112; the team goal owner field 1116; the team goal priority field 1118; the team goal status field 1120; and the team goal due date field 1122.

These examples of the source form 632 and the target form 630 show that the import engine 624, following the instructions added by the transformation file 634, can import data (such as nodes) and information within it (such as text, numbers, and the like) into an electronic form having a substantially different schema. This example also shows that parts of the source form 632 can be imported, rather than all of it, based on the transformation file 634. Thus, a designer can, by building the transformation file 634 in particular ways, have parts of a source electronic form be imported into a target electronic form, leaving other parts not of significance to the designer un-imported.

Importing Data without Annotations

As set forth in the flow diagram 900, if a current source node of the source form 632 does not include an annotation, the system 600 proceeds to block 908, as mentioned above. The system 600 can follow the flow diagram 900 as one implementation of the block 816 of FIG. 8, even in cases where the source form 632 contains no annotations. In these cases the system 600 can follow blocks 902, 904, 906, and 908, without following the other blocks. In another implementation where the source form 632 contains no annotations, the system 600 follows the flow diagram 1300 for each portion of the source form 632 until completion.

Figure 13:
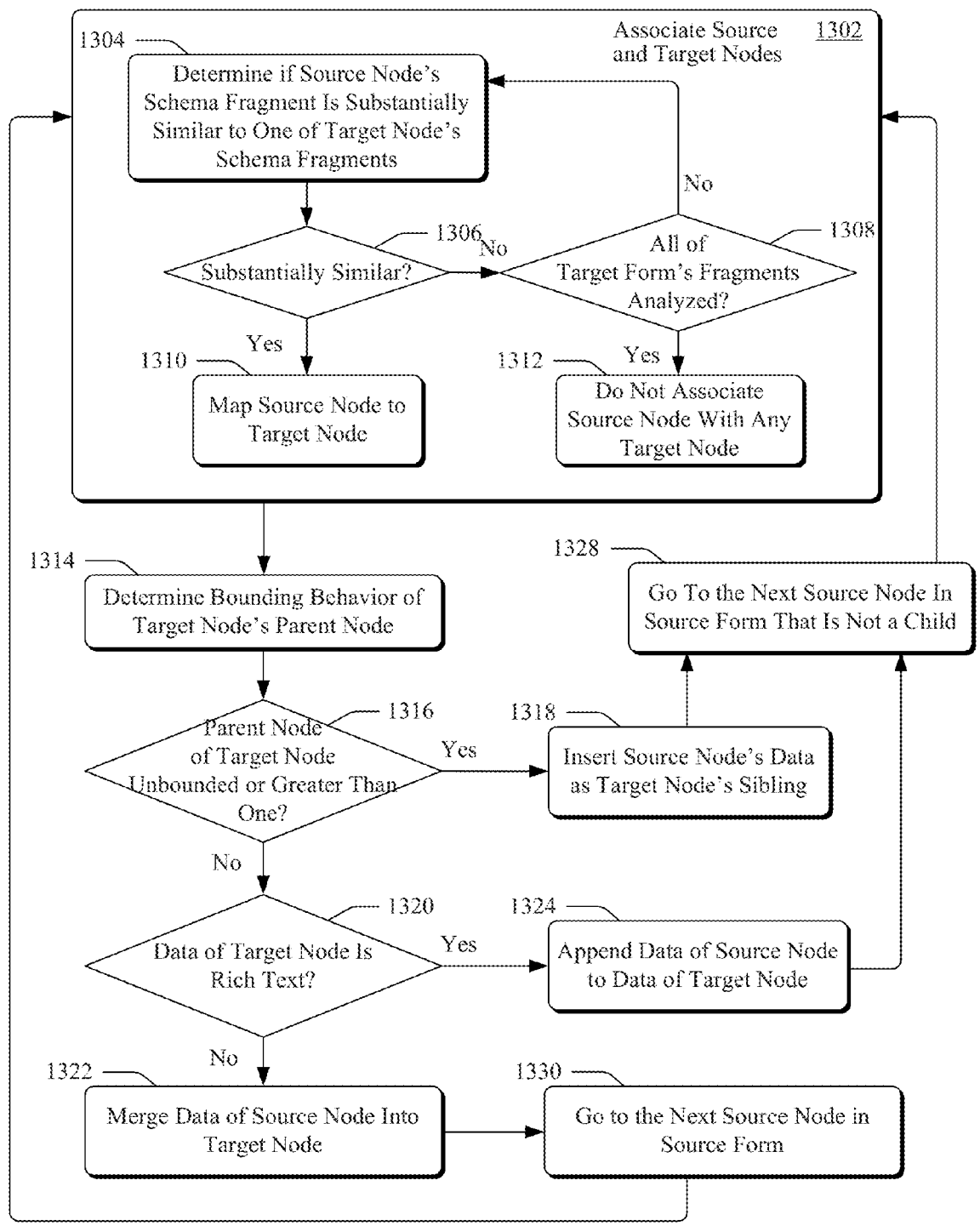
FIG. 13 is a flow diagram of an exemplary process for importing data from one electronic form into another electronic form without use of annotations or instructions.

FIG. 13 shows a flow diagram 1300 for importing data without an annotation. This flow diagram 1300 can be used by the system 600 for hierarchically arranged forms when a node of the source form 632 does not include an annotation or when no node of the source form 632 includes annotations, such as when the transformation file 634 has not been applied on the source form 632. The flow diagram 1300 is also an exemplary implementation of the block 908 of FIG. 9, though blocks 904 and 906 are performed after blocks 1330 and 1328 in this implementation.

At block 1302, the system 600 (primarily through the import engine 624) analyzes, one-at-a-time or otherwise, nodes of the source form 632 and nodes of the target form 630 in order to associate them. The system 600 can perform this analysis for electronic forms without the electronic forms containing annotations. The system 600 can also perform this analysis on un-annotated nodes of an otherwise annotated source electronic form or on nodes of a source electronic form that are similar to a target electronic form, even if parts of the source electronic form are not similar. In so doing, the system 600 can enable importing of data without a user needing to build or use the transformation file 634 for substantially similar nodes. It can do so even if many of the nodes if the source form 632 and the target form 630 are not substantially similar. In one implementation, the system 600 can associate nodes and import data without user interaction.

As part of block 1302, the system 600 can perform the actions set forth in blocks 1304, 1306, 1308, 1310, and 1312.

At block 1304, the system 600 determines if a schema fragment related to a particular node of the source form 632 (the "source node") is substantially similar to a schema fragment related to one of the target form's 630 nodes (the "target node"). In this context, a schema fragment can be any part of the form's schema that shows, or any schema that aids the system 600 in determining, how a node of the form is or can be structured or is or can be governed. Thus, a schema fragment can be a construct based on the form's entire schema, a part of the form's entire schema, or other structural or governance information about a node of the form.

An example of how this can be performed with hierarchically organized electronic forms is set forth in the context of two electronic forms shown in FIG. 14 below. The example of FIG. 14 relates to the salesman's report 402 and the manager's report 102, each having substantially similar schemas. The example of FIG. 14 is used to aid the reader in understanding an implementation of the method shown in the flow diagram 1300, and is not intended to limit the applicability of the method.

Figure 14:
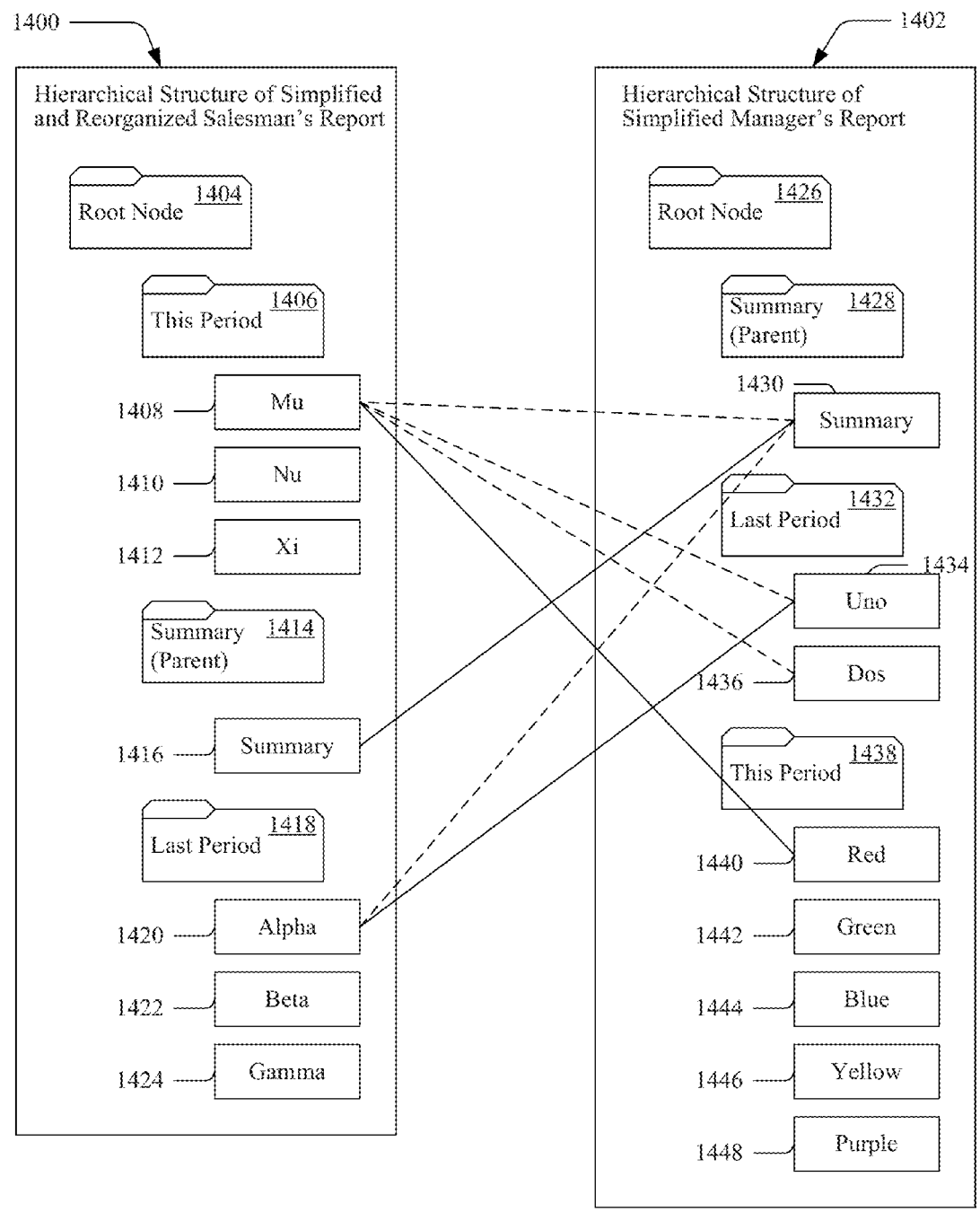
FIG. 14 illustrates two exemplary, simple, and graphical representations of two electronic forms that are hierarchically structured and organized into nodes.

FIG. 14 sets forth a simple, graphical example of how two electronic forms that are hierarchically structured can be organized into nodes. The source form 632 in this example is a hierarchically arranged, simplified, and structurally (though not, for purposes of the discussion relating to FIG. 13, schematically) reorganized version of the salesman's report 402 of FIG. 4, referenced and referred to as a salesman's structure 1400. It is reorganized by where in the salesman's report 402 the data and their corresponding nodes reside. For instance, in FIG. 4 the salesman's summary 418 is presented prior to the salesman's this period data-entry fields 426, 428, and 430 in the salesman's status report 402. In the salesman's structure 1400, however, the nodes related to the salesman's summary 418 (a source summary parent node 1414 and a source summary node 1416) are arranged after nodes related to the this period data-entry fields 426, 428, and 430.

The target form 630 in this example is a hierarchically arranged and simplified version of the manager's report 102 of FIG. 1, referenced and referred to as a manager's structure 1402.

The structure 1400 includes a source root node 1404, a source this period node 1406, a mu node 1408, a nu node

1410, a xi node 1412, the source summary parent node 1414, the source summary node 1416, a source last period node 1418, an alpha node 1420, a beta node 1422, and a gamma node 1424.

The structure 1402 includes a target root node 1426, a target summary parent node 1428, a target summary node 1430, a summary last period node 1432, an uno node 1434, a dos node 1436, a target this period node 1438, a red node 1440, a green node 1442, a blue node 1444, a yellow node 1446, and a purple node 1448.

With these structures set forth, the discussion returns to the flow diagram 1300.

At block 1306, the system 600 proceeds along the "No" path to block 1308 if the schema fragment of the source node is not substantially similar to a schema fragment of the target node that was just analyzed. If they are substantially similar, the system 600 proceeds along the "Yes" path to block 1310.

As shown by example below, if one target node is not substantially similar to the source node being analyzed, the system 600 can proceed to analyze every node of the target form 630 until the system 600 finds one that is substantially similar or until all of the nodes of the target form 630 have been analyzed.

At block 1308, if the system 600 has analyzed every target node (every node of the target form 630) against the source node (using each node's schema fragment) and has not found a target node that is substantially similar, the system 600 proceeds to block 1312, after which it proceeds to block 1304 and analyzes a new source node. If not, it proceeds directly back to block 1304.

At block 1312, the system 600 does not associate the source node with any target node. Also, at block 1312 the system 600 can ignore the source node and not import data from the source node.

Returning to the discussion of block 1302, using the structures of FIG. 14 as examples, assume that the system 600 first analyzes the mu node 1408 (through analyzing its schema fragment). Assume also that the system 600 analyzes nodes of the target form 630 that contain numerical or textual data in descending order. By so doing, the system 600 first analyzes the mu node 1408 and the target summary node 1430, shown by a dashed line. Each line, which will be discussed in turn, represents an attempt by the system 600 to determine that the nodes connected by the lines are substantially similar. The dashed lines represent a determination by the system 600 that the nodes are not substantially similar. Solid lines represent a determination by the system 600 that the nodes are substantially similar, and thus can be associated with each other.

Thus, continuing the example, the system 600, as part of block 1304, determines that the schema fragment of the mu node 1408 and the schema fragment of the target summary node 1430 are not substantially similar. The system 600 then proceeds to block 1308, where the system 600 then proceeds back to block 1304 because all of the nodes of the target form 630 have not been found to not be substantially similar to the mu node 1408.

At block 1304, the system 600 determines that the schema fragment of the mu node 1408 and the schema fragment of the uno node 1434 are not substantially similar. Thus, the system 600 again returns to block 1304.

Likewise, at block 1304 the system 600 determines that the schema fragment of the mu node 1408 and the schema fragment of the dos node 1436 are not substantially similar. Thus, the system 600 again returns to block 1304.

Again at block 1304, the system 600 determines the similarity of the schema fragment of the mu node 1408 with another node of the manager's structure 1402. Here, though, the system 600 determines that the schema fragment of the mu node 1408 and the schema fragment of the red node 1440 are substantially similar. As such, the system 600 proceeds to block 1310.

At block 1310, the system 600 maps the source node of the source form 632 to the target node of the target form 630. In cases where no node of the target form 630 was substantially similar, the system 600 can cease analysis of the source node and proceed to another source node (another node of the source form 632) until all substantially similar nodes are found before proceeding to block 1314. In another implementation, the system 600 proceeds to block 1314 and on to import data based on the current source node and then return to block 1304 later, if needed, as set forth in the flow diagram 1300 (see blocks 1328 and 1330).

In the ongoing example, the system 600 maps the mu node 1408 to the red node 1440. In one implementation, the system 600 maps nodes using XPath expressions. An XPath expression is a way of describing the location of a certain node or of a set of nodes in an XML document. The description is made by specifying the full (starting from the root) or relative (starting from a given node) path(s) to the node or the set of nodes. More on XPath expressions generally can be found at http://www.w3.org/TR/xpath.

The system 600 can then continue on to block 1314 or back to 1304 until the nodes of the source form 632 have been analyzed. In the ongoing example, the system 600 returns to block 1304.

By further way of example, assume that the system 600, once the mu node 1408 has been mapped to the red node 1440 at block 1310, proceeds to analyze the nu node 1410 and the xi node 1412 and also maps them to the red node 1440 (not shown with lines).

Continuing this example, the system 600 analyzes the source summary node 1416 and the target summary node 1430, shown by a solid line. At block 1304, the system 600 determines that the schema fragment of the source summary node 1416 and the target summary node 1430 are substantially similar. As such, the system 600 proceeds to block 1310 to map these nodes together.

Also by further way of example, assume that the system 600 then proceeds to analyze the alpha node 1420 of the structure 1400.

Thus, continuing the example, the system 600, as part of block 1304, determines that the schema fragment of the alpha node 1420 and the schema fragment of the target summary node 1430 are not substantially similar. The system 600 then proceeds to block 1308, where the system 600 then proceeds back to block 1304 because all of the nodes of the target form 630 have not been found to not be substantially similar to the alpha node 1420.

Returning to block 1304, the system 600 determines that the schema fragment of the alpha node 1420 and the schema fragment of the uno node 1434 are substantially similar. As such, the system 600 proceeds to block 1310 to map these nodes together.

At block 1314 the system 600 determines the bounding behavior of the target node's parent node. The system 600 determines the bounding behavior from the target schema or the target node's or target node's parent's schema fragment. The bounding behavior gives the system 600 information about how and what kind of importation can be appropriate.

At block 1316, if the target node's parent node is unbounded or bound to a number greater than one, the system 600 proceeds along the "Yes" path to block 1318. If not, the system 600 proceeds along the "No" path to block 1320.

At block 1318, the system 600 inserts the source node's data as a sibling node to the target node. In FIGS. 5 and 14, various examples of this can be seen. In FIG. 5, the data associated with some of the data-entry fields of the salesman's report 402 are represented to be inserted as siblings. While not shown, the nodes containing the data shown in the data-entry fields are inserted as sibling nodes. FIG. 5 shows insertion, represented as a new entry or data-entry field, of the salesman's last period fields 420, 422, and 424 and the salesman's this period fields 426, 428, and 430.

FIG. 14 shows six different nodes of the salesman's structure 1400, each of which can be represented as data-entry fields in FIG. 4 and are inserted as sibling nodes. Each of these source nodes, the mu node 1408, the nu node 1410, the xi node 1412, the alpha node 1420, the beta node 1422, and the gamma node 1424, have been mapped to a substantially similar target node. The mu node 1408, the nu node 1410, and the xi node 1412, have been mapped to the red node 1440. Thus, the target node's parent node is the manager's this period node 1438.

Assume for this example that the manager's this period node 1438 is unbounded. Thus, at block 1318, the system 600 inserts as sibling nodes to the red node 1440 the mu node 1408, the nu node 1410, and the xi node 1412. An example of insertion is shown in FIG. 5 by the additional data-entry fields with data being added to the manager's report 102 (shown in the aggregate manager's report 502).

Likewise, the alpha node 1420, the beta node 1422, and the gamma node 1424 have been mapped to the uno node 1434. Also this example assumes that the manager's last period node 1432 is unbounded, and thus can contain an unlimited number of child nodes. Thus, at block 1318, the system 600 inserts as sibling nodes to the uno node 1434 the alpha node 1420, the beta node 1422, and the gamma node 1424. An example of insertion is shown in FIG. 5 by the additional data-entry fields with data being added to the manager's report 102 (shown in the aggregate manager's report 502).

After block 1318, the system 600 proceeds to block 1328.

At block 1328, the system 600 continues on to perform the actions of block 1302, but for a new source node of the source form 632 (unless the system 600 is performing the flow diagram 1300 as an implementation of block 908 of the flow diagram 900, in which case the system 600 continues to block 904 with the new source node). This new source node is the next node in the source form 632 that is not a child node of the source node just analyzed.

In one implementation, if the current source node has a child, the system 600 skips over the child and proceeds to analyze the next right sibling of the current source node. If the current source node does not have a next right sibling, the system 600 proceeds to analyze the next right sibling of the parent of the current source node, and so on. If there are no other nodes to be analyzed (some children are not analyzed as part of block 1328), the system 600 stops analysis of the source form 632.

At block 1320, if the target node does not include rich text, the system 600 proceeds along the "No" path to block 1322. If it does, the system 600 proceeds along the "Yes" path to block 1324.

At block 1322, the system 600 merges data within the source node into the target node. This data can include attributes or top level parts of the source node's data. As set forth in the following example, this merging can include merging of attributes from the source node into the target node. Assume, for instance, that the target node is:

<element a1="a1 data" a2="a2 data">original element data</element>

And the source node is:

<element a1="new a1 data" a3="new a3 data">new element data</element>

Then, the aggregated target node will include the attributes of the source node, as shown here:

<element a1="new a1 data" a2="a2 data" a3="new a3 data">original element data</element>

At block 1330, the system 600 continues on to perform the actions of block 1302, but for a new source node of the source form 632 (unless the system 600 is performing the flow diagram 1300 as an implementation of block 908 of the flow diagram 900, in which case the system 600 continues to block 904 with the new source node). This new source node is the next node in the source form 632, regardless of whether that node is a child of the source node just analyzed.

In one implementation, if the current source node has a child node, the system 600 proceeds to analyze the child. Otherwise, the system 600 proceeds to the next right sibling of the current source node or the next right sibling of the parent of the current source node, and so on up to the root node. If there are no other nodes to be analyzed (some children are not analyzed, based on block 1328), the system 600 stops analysis of the source form 632.

At block 1324, if the target node contains rich text, the system 600 appends data of the source node to data of the target node.

FIG. 5 shows an example of data from a source node being appended to a target node. In FIG. 5, data shown in the salesman's summary field 418 is appended to summary field 118 of the manager's report 102. This appending (also called a "concatenation") is shown with rich text of the data of the source node added into the data-entry field, seen in FIG. 5 at reference 504.

Continuing the above example, the source summary node 1416 is associated with (via mapping, in this case) the target summary node 1430. Assume, for this example, that the target summary parent 1428, which is the parent of the target summary node 1430, is bounded to one occurrence of a child node. The only child node allowed is the target summary node 1430. The system 600, using this information, will not attempt to insert the source summary node 1416 into the target form 630 (such as by inserting it as a sibling node to the target summary node 1430). Instead, the system 600 appends rich text data within the source summary node 1416 into the target summary node 1430.

After completing block 1324, the system 600 proceeds to block 1328, described above.

A Computer System

Figure 15:
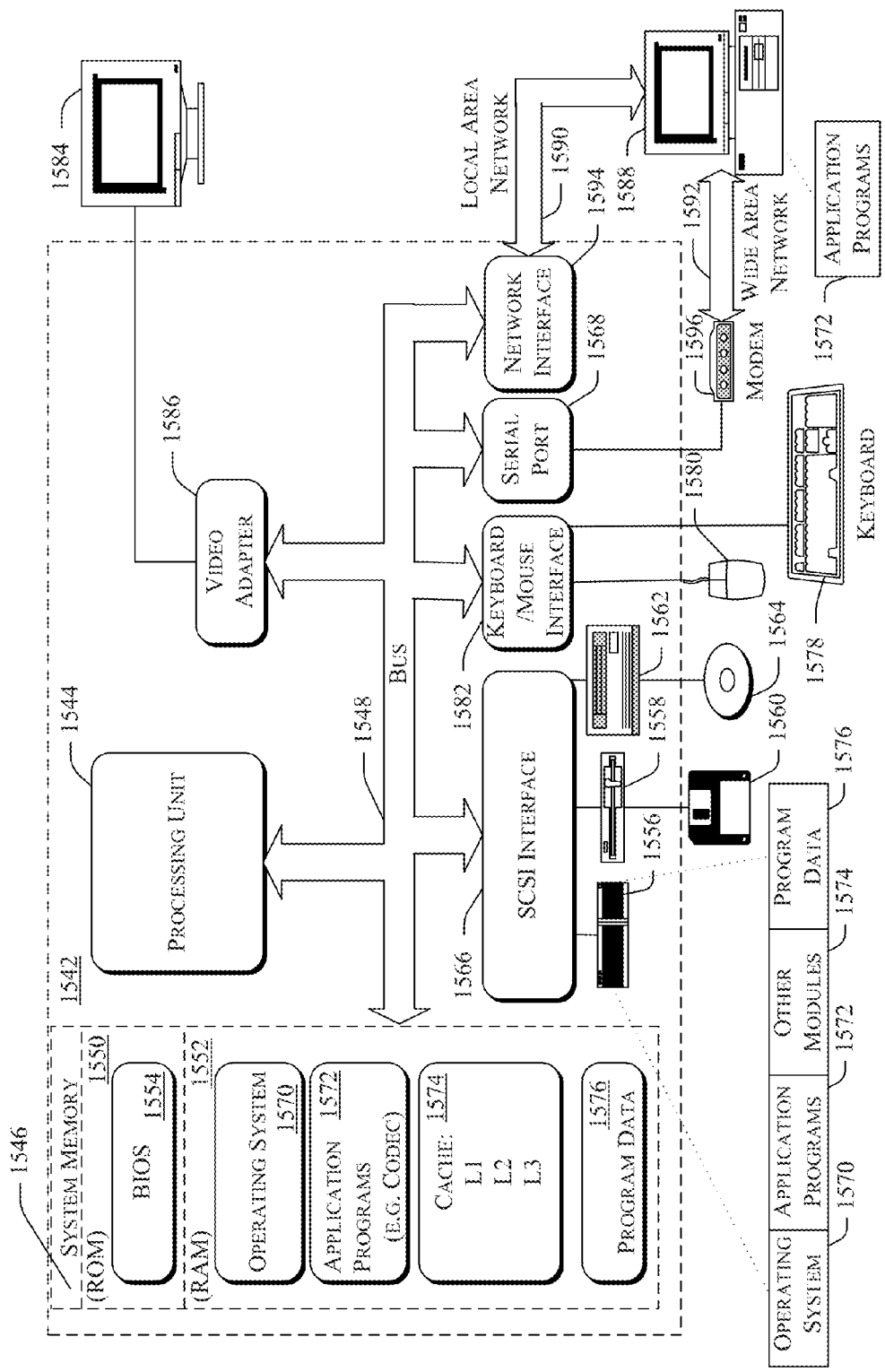
FIG. 15 is a block diagram of a computer system that is capable of supporting aggregation of electronic forms.

FIG. 15 shows an exemplary computer system that can be used to implement the processes described herein. Computer 1542 includes one or more processors or processing units 1544, a system memory 1546, and a bus 1548 that couples various system components including the system memory 1546 to processors 1544. The bus 1548 represents one or more of any of several types of bus structures, including a memory bus or memory controller, a peripheral bus, an accelerated graphics port, and a processor or local bus using any of a variety of bus architectures. The system memory 1546 includes read only memory (ROM) 1550 and random access memory (RAM) 1552. A basic input/output system (BIOS) 1554, containing the basic routines that help to transfer information between elements within computer 1542, such as during start-up, is stored in ROM 1550.

Computer 1542 further includes a hard disk drive 1556 for reading from and writing to a hard disk (not shown), a magnetic disk drive 1558 for reading from and writing to a removable magnetic disk 1560, and an optical disk drive 1562 for reading from or writing to a removable optical disk 1564 such as a CD ROM or other optical media. The hard disk drive 1556, magnetic disk drive 1558, and optical disk drive 1562 are connected to the bus 1548 by an SCSI interface 1566 or some other appropriate interface. The drives and their associated computer-readable media provide nonvolatile storage of computer-readable instructions, data structures, program modules and other data for computer 1542. Although the exemplary environment described herein employs a hard disk, a removable magnetic disk 1560 and a removable optical disk 1564, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1556, magnetic disk 1560, optical disk 1564, ROM 1550, or RAM 1552, including an operating system 1570, one or more application programs 1572 (such as the import engine 624), other program modules 1574, and program data 1576. A user may enter commands and information into computer 1542 through input devices such as a keyboard 1578 and a pointing device 1580. Other input devices (not shown) may include a microphone, joystick, game pad, satellite dish, scanner, or the like. These and other input devices are connected to the processing unit 1544 through an interface 1582 that is coupled to the bus 1548. A monitor 1584 or other type of display device is also connected to the bus 1548 via an interface, such as a video adapter 1586. In addition to the monitor, personal computers typically include other peripheral output devices (not shown) such as speakers and printers.

Computer 1542 commonly operates in a networked environment using logical connections to one or more remote computers, such as a remote computer 1588. The remote computer 1588 may be another personal computer, a server, a router, a network PC, a peer device or other common network node, and typically includes many or all of the elements described above relative to computer 1542. The logical connections depicted in FIG. 15 include a local area network (LAN) 1590 and a wide area network (WAN) 1592. Such networking environments are commonplace in offices, enterprise-wide computer networks, intranets, and the Internet.

When used in a LAN networking environment, computer 1542 is connected to the local network through a network interface or adapter 1594. When used in a WAN networking environment, computer 1542 typically includes a modem 1596 or other means for establishing communications over the wide area network 1592, such as the Internet. The modem 1596, which may be internal or external, is connected to the bus 1548 via a serial port interface 1568. In a networked environment, program modules depicted relative to the personal computer 1542, or portions thereof, may be stored in the remote memory storage device. It will be appreciated that the network connections shown are exemplary and other means of establishing a communications link between the computers may be used.

Generally, the data processors of computer 1542 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described system and method enables a user to quickly and easily import data from one electronic form into another electronic form. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
applying a transformation file on a plurality of first electronic forms written in a markup language, the plurality of first electronic forms governed by a same schema, the applying the transformation file on the plurality of first electronic forms to annotate the plurality of first electronic forms with instructions; and
importing data included within the plurality of first electronic forms into a plurality of second electronic forms, the plurality of second electronic forms written in the markup language, the importing based on the instructions, the instructions comprising instructions to insert, delete, or replace one or more nodes in the plurality of second electronic forms.

2. The method of claim 1, wherein the applying is performed without user interaction.

3. The method of claim 1, wherein the importing is performed without user interaction.

4. The method of claim 1, wherein the first electronic forms are governed by said same schema having first schema fragments and the second electronic forms are governed by a second schema that includes a second schema fragment that is capable of association with the first schema fragment.

5. The method of claim 1, wherein the first electronic forms are governed by said same schema having a first root node and the second electronic forms are governed by a second schema having a second root node, the said schema and the second schema having the first root node and the second root node capable of association but not having non-root nodes capable of association.

6. The method of claim 1, wherein the importing further comprises accessing and executing code modules associated with the instructions.

7. The method of claim 1, wherein the applying comprises annotating each of the first electronic forms with an instruction to insert the data as a child node to a parent node in each of the second electronic forms.

8. The method of claim 1, wherein the applying comprises annotating one of the first electronic forms with an instruction to merge attributes associated with the data with attributes associated with a node of a respective one of the second electronic forms.

9. The method of claim 1, wherein the applying comprises annotating one of the first electronic forms with an instruction to replace one or more nodes of a respective one of the second electronic forms with a node associated with the data.

10. The method of claim 1, wherein the applying comprises annotating one of the first electronic forms with an instruction to delete one or more nodes of a respective one of the second electronic forms.

11. The method of claim 1, wherein the applying comprises annotating one of the first electronic forms with an instruction to not import the data into a respective one of the second electronic forms.

12. The method of claim 1, wherein the applying comprises annotating one of the first electronic forms with an instruction to associate a set of nodes of a respective one of the second electronic forms with one or more nodes associated with the data of the one of the first electronic forms.

13. The method of claim 1, wherein the applying comprises annotating one of the first electronic forms with an instruction to associate a particular node of a set of nodes of a respective second electronic form of the second electronic forms with a node associated with the data of the one of the first electronic forms.

14. The method of claim 1, wherein the applying comprises annotating the one of the first electronic forms with an instruction to insert a node associated with the data at a particular point in an order of a set of nodes in a respective on of the second electronic forms.

15. The method of claim 1, wherein the data is written in XML.

16. The method of claim 1, wherein the first electronic forms and the second electronic forms are written in part in XML.

17. The method of claim 1, wherein the transformation file is written in part in XSLT.

18. A system comprising:
one or more processors; and
one or more computer-readable storage media having instructions thereon that, when executed by the one or more processors, cause the processors to perform acts comprising:
 applying a transformation file on a plurality of first electronic forms, the plurality of first electronic forms written in a markup language, the plurality of first electronic forms governed by a same schema, the applying to annotate the plurality of first electronic forms with instructions; and
 importing data included within the plurality of first electronic forms into a plurality of second electronic forms, the plurality of second electronic forms written in the markup language, the importing based on the instructions, the instructions comprising instructions to insert, delete, or replace one or more nodes in the plurality of second electronic forms.

19. The system of claim 18, wherein the applying annotating the first electronic form with an instruction comprising one or more of:
 inserting the data as a child node to a parent node in the second electronic form;
 merging attributes associated with the data with attributes associated with a node of the second electronic form;
 replacing one or more nodes of the second electronic form with a node associated with the data;
 deleting one or more nodes of the second electronic form;
 not importing the data into the second electronic form;
 associating a set of nodes of the second electronic form with one or more nodes associated with the data of the first electronic form; or
 inserting a node associated with the data at a particular point in an order of a set of nodes in the second electronic form.

20. A system comprising:
one or more processors;
one or more computer-readable storage media having instructions thereon that, when executed by the one or more processors, cause the one or more processors to perform acts comprising:
 applying a transformation file on a plurality of first electronic forms, the plurality of first electronic forms governed by a same schema, the applying to annotate the plurality of first electronic forms with instructions, the first electronic forms written in XML and the transformation file written in XSLT; and
 importing data included within the plurality of first electronic forms into a plurality of second electronic forms, the plurality of second electronic forms written in XML, the importing based on the instructions, the instructions comprising instructions to insert, delete, or replace one or more nodes in the plurality of second electronic forms.

* * * * *